US011871267B2

(12) United States Patent
Li et al.

(10) Patent No.: US 11,871,267 B2
(45) Date of Patent: Jan. 9, 2024

(54) TRANSPORT BLOCK SIZE DETERMINING METHOD AND APPARATUS

(71) Applicant: Huawei Technologies Co., Ltd., Shenzhen (CN)

(72) Inventors: Yuan Li, Bonn (DE); Lei Guan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 355 days.

(21) Appl. No.: 17/371,985

(22) Filed: Jul. 9, 2021

(65) Prior Publication Data

US 2021/0337428 A1 Oct. 28, 2021

Related U.S. Application Data

(63) Continuation of application No. PCT/CN2020/071862, filed on Jan. 13, 2020.

(30) Foreign Application Priority Data

Jan. 11, 2019 (CN) .......................... 201910028383.6
Apr. 30, 2019 (CN) .......................... 201910364011.0

(51) Int. Cl.
*H04W 28/06* (2009.01)
*H04L 5/00* (2006.01)
*H04W 72/0446* (2023.01)

(52) U.S. Cl.
CPC ........... *H04W 28/06* (2013.01); *H04L 5/0005* (2013.01); *H04W 72/0446* (2013.01)

(58) Field of Classification Search
None
See application file for complete search history.

(56) References Cited

U.S. PATENT DOCUMENTS

2013/0329661 A1  12/2013 Chen et al.
2018/0146438 A1*  5/2018 Yi ........................ H04W 52/24
(Continued)

FOREIGN PATENT DOCUMENTS

CN     104885543 A    9/2015
WO   2017153819 A1    9/2017
(Continued)

OTHER PUBLICATIONS

LG Electronics, 3GPP TSG RAN WG1 Meeting 91, R1-1719929, "Discussion on resource allocation and TBS determination," Reno, USA, Nov. 27-Dec. 1, 2017, 16 pages.
(Continued)

*Primary Examiner* — Anh Vu H Ly
(74) *Attorney, Agent, or Firm* — Slater Matsil, LLP

(57) ABSTRACT

This application relates to the field of communication technologies, and discloses a transport block size determining method and an apparatus. The method includes: A terminal device determines, based on control information sent by a network device, K transmission occasions used to transmit a first data packet, where at least two of the K transmission occasions include different quantities of valid REs. Further, the terminal device may determine, based on a target quantity of valid REs, a TBS corresponding to the first data packet, where the target quantity of valid REs may be an average quantity of valid REs of the K transmission occasions, or may be a quantity of valid REs included in a target transmission occasion in the K transmission occasions.

20 Claims, 10 Drawing Sheets

(56) References Cited

U.S. PATENT DOCUMENTS

| | | | |
|---|---|---|---|
| 2019/0053211 A1* | 2/2019 | Ying | H04W 72/044 |
| 2020/0162208 A1* | 5/2020 | Moon | H04L 1/189 |
| 2021/0314985 A1* | 10/2021 | Yang | H04L 5/0078 |
| 2021/0392648 A1* | 12/2021 | Andersson | H04L 5/0044 |
| 2022/0116144 A1* | 4/2022 | Liu | H04L 1/08 |
| 2022/0210697 A1* | 6/2022 | Andersson | H04W 72/0446 |
| 2022/0231789 A1* | 7/2022 | Ying | H04L 5/0053 |
| 2022/0322409 A1* | 10/2022 | Yokomakura | H04L 5/0094 |

FOREIGN PATENT DOCUMENTS

| | | | |
|---|---|---|---|
| WO | 2018169806 A1 | 9/2018 | |
| WO | 2018203818 A1 | 11/2018 | |

OTHER PUBLICATIONS

Oppo, 3GPP TSG RAN WG1 Meeting #92, R1-1802103, "Remaining issues on DL/UL resource allocation," Athens, Greece, Feb. 26-Mar. 2, 2018, 3 pages.

\* cited by examiner

TRANSPORT BLOCK SIZE DETERMINING METHOD AND APPARATUS

CROSS-REFERENCE TO RELATED APPLICATIONS

This application is a continuation of International Application No. PCT/CN2020/071862, filed on Jan. 13, 2020, which claims priority to Chinese Patent Application No. 201910364011.0, filed on Apr. 30, 2019, and Chinese Patent Application No. 201910028383.6, filed on Jan. 11, 2019. All of the aforementioned patent applications are hereby incorporated by reference in their entireties.

TECHNICAL FIELD

This application relates to the field of communication technologies, and in particular, to a transport block size determining method and an apparatus.

BACKGROUND

Compared with conventional mobile broadband (MBB) services such as video transmission, new services in the future, such as augmented reality/virtual reality, the Internet of vehicles, telemedicine, industrial control, and power transmission and communication, that rely on wireless communication impose higher requirements on a transmission latency and transmission reliability. To better support these low-latency and high-reliability service types, an ultra-reliable and low-latency communications (URLLC) scenario is introduced into 5th generation (5G) new radio (NR) system.

Further, a multi-repetition mechanism is further introduced into a physical uplink shared channel (PUSCH) of the 5G NR system, to enhance the transmission reliability. For example, the multi-repetition mechanism of the PUSCH may mean: A same data packet is repeatedly sent on K PUSCHs for K times, where K is a positive integer. Each of the K PUSCHs is used to perform one data transmission on the data packet. In this case, how to determine a transport block size (TBS) corresponding to the data packet needs to be further studied.

SUMMARY

In view of this, this application provides a transport block size determining method and an apparatus, to determine, when a quantity of valid REs included in at least one of a plurality of transmission occasions is different from a quantity of valid REs included in another transmission occasion, a TBS corresponding to a data packet.

According to a first aspect, an embodiment of this application provides a TBS determining method, including: receiving control information from a network device, where the control information is used to notify information about a time-frequency resource for transmitting a first data packet, the time-frequency resource includes K transmission occasions, each of the K transmission occasions is used to perform one data transmission on the first data packet, and a quantity of valid resource elements REs included in a first transmission occasion in the K transmission occasions is greater than a quantity of valid REs included in a second transmission occasion in the K transmission occasions, where K is an integer greater than 1; and determining, based on a target quantity of valid resource elements REs, a TBS corresponding to the first data packet, where the target quantity of valid REs is an average quantity of valid REs included in each of the K transmission occasions, or the target quantity of valid REs is a quantity of valid REs included in a target transmission occasion in the K transmission occasions.

In this way, in this embodiment of this application, the target quantity of valid REs is introduced, so that a terminal device may determine, based on the target quantity of valid REs, the TBS corresponding to the first data packet. For example, the terminal device may determine the TBS based on the average quantity of valid REs, to avoid an excessively large TBS that is determined based on a relatively large quantity of valid REs or an excessively small TBS that is determined based on a relatively small quantity of valid REs.

In a possible design, the target transmission occasion is the second transmission occasion.

In this way, the second transmission occasion including a relatively small quantity of valid REs is used as the target transmission occasion, so that performance deterioration caused by excessively high code rates for some transmission occasions can be avoided.

In a possible design, the second transmission occasion is a transmission occasion in the K transmission occasions that includes a smallest quantity of valid REs, or the second transmission occasion is a transmission occasion in the K transmission occasions that includes a smallest quantity of time domain symbols.

In a possible design, the target transmission occasion is the first transmission occasion.

In this way, the first transmission occasion including a larger quantity of valid REs is used as the target transmission occasion, so that transmission efficiency can be improved.

In a possible design, the first transmission occasion is a transmission occasion in the K transmission occasions that includes a largest quantity of valid REs, or the first transmission occasion is a transmission occasion in the K transmission occasions that includes a largest quantity of time domain symbols.

In a possible design, the control information is further used to notify a time domain resource length of one of the K transmission occasions, and a time domain resource length corresponding to the target transmission occasion is the time domain resource length notified by using the control information.

That is, the terminal device may calculate the TBS based on a quantity of valid REs included in a transmission occasion in the K transmission occasions that corresponds to the time domain resource length notified by using the control information, regardless of whether the K transmission occasions include another transmission occasion with a longer or shorter time domain resource. According to this method, the network device may adjust the TBS by adjusting the notified time domain resource length of one transmission occasion, to prevent the calculated TBS from being excessively large or excessively small.

In a possible design, a time domain resource length corresponding to the second transmission occasion corresponds to the time domain resource length notified by using the control information.

In a possible design, a time domain resource length corresponding to the first transmission occasion corresponds to the time domain resource length notified by using the control information.

In a possible design, if a first code rate of a first reference TBS carried on the second transmission occasion is greater than a code rate threshold, the target transmission occasion is the second transmission occasion.

The first reference TBS is a TBS calculated based on the quantity of valid REs included in the first transmission occasion.

Therefore, if the first code rate of the first reference TBS carried on the second transmission occasion is greater than the code rate threshold, it indicates that the TBS calculated based on the first transmission occasion is too large to be carried on the second transmission occasion, or may cause deterioration of transmission performance of the second transmission occasion. In this case, the second transmission occasion may be determined as the target transmission occasion, that is, the second transmission occasion is used to calculate the TBS, to ensure that reliability does not deteriorate.

In a possible design, if a first code rate of a first reference TBS carried on the second transmission occasion is greater than a code rate threshold, and a modified code rate is greater than the code rate threshold, the target transmission occasion is the second transmission occasion.

The first reference TBS is a TBS calculated based on the quantity of valid REs included in the first transmission occasion, the modified code rate is a code rate of the first reference TBS carried on the second transmission occasion and using a modified modulation order, the control information is further used to notify a modulation order for transmitting the first data packet, and the modified modulation order is higher than the modulation order notified by using the control information.

Therefore, after the terminal device adaptively increases the modulation order for the second transmission occasion, the modified code rate is still greater than the code rate threshold. It indicates that the TBS calculated based on the first transmission occasion still cannot be carried on the second transmission occasion. In this case, the second transmission occasion may be determined as the target transmission occasion, that is, the second transmission occasion is used to calculate the TBS, to ensure that reliability does not deteriorate.

In a possible design, if a first code rate of a first reference TBS carried on the second transmission occasion is not greater than a code rate threshold, the target transmission occasion is the first transmission occasion.

The first reference TBS is a TBS calculated based on the quantity of valid REs included in the first transmission occasion.

Therefore, if the first code rate of the first reference TBS carried on the second transmission occasion is not greater than the code rate threshold, it indicates that the TBS calculated based on the first transmission occasion is moderate. In this way, the code rate obtained after the TBS calculated based on the first transmission occasion is carried on the second transmission occasion is still not excessively large and the second transmission occasion can be correctly decoded by the network device with relatively high probability, although the code rate is greater than a code rate of the TBS carried on the first transmission occasion. In this case, calculating the TBS by using the first transmission occasion can improve transmission efficiency without great deterioration of reliability.

In a possible design, if a first code rate of a first reference TBS carried on the second transmission occasion is greater than a code rate threshold, and a modified code rate is not greater than the code rate threshold, the target transmission occasion is the first transmission occasion.

The first reference TBS is a TBS calculated based on the quantity of valid REs included in the first transmission occasion, the modified code rate is a code rate of the first reference TBS carried on the second transmission occasion and using a modified modulation order, the control information is further used to notify a modulation order for transmitting the first data packet, and the modified modulation order is higher than the modulation order notified by using the control information.

The method further includes: sending the first data packet on the second transmission occasion by using the modified modulation order and the modified code rate.

In this way, the terminal device adaptively increases the modulation order for the second transmission occasion to decrease a code rate for the second transmission occasion, so that a relatively large TBS can also be carried on the second transmission occasion.

In a possible design, the method further includes: if a first code rate of a first reference TBS carried on the second transmission occasion is greater than a code rate threshold, sending the first data packet on the second transmission occasion by using the modified modulation order and the modified code rate, where the modified code rate is a code rate of the TBS that corresponds to the first data packet and that is carried on the second transmission occasion and uses the modified modulation order, the control information is further used to notify a modulation order for transmitting the first data packet, and the modified modulation order is higher than the modulation order notified by using the control information.

In a possible design, the method further includes: if a first code rate of a first reference TBS carried on the second transmission occasion is greater than a code rate threshold, dropping the second transmission occasion when sending the first data packet, where the first reference TBS is a TBS calculated based on the quantity of valid REs included in the first transmission occasion.

Because sending the first data packet on the second transmission occasion by the terminal device causes relatively poor performance, the second transmission occasion may be dropped, and a time-frequency resource of the second transmission occasion is saved, and is used by the network device to schedule or indicate another terminal device to send information. This improves resource utilization.

In a possible design, the method further includes: if a first code rate of a first reference TBS carried on the second transmission occasion is greater than a code rate threshold, and a modified code rate is greater than the code rate threshold, dropping the second transmission occasion when sending the first data packet, where the first reference TBS is a TBS calculated based on the quantity of valid REs included in the first transmission occasion, the modified code rate is a code rate of the first reference TBS carried on the second transmission occasion and using a modified modulation order, the control information is further used to notify a modulation order for transmitting the first data packet, and the modified modulation order is higher than the modulation order notified by using the control information.

In a possible design, the method further includes: if a first code rate of a first reference TBS carried on the second transmission occasion is greater than a code rate threshold, sending a part of system information of the first data packet on the second transmission occasion, where the first reference TBS is a TBS calculated based on the quantity of valid REs included in the first transmission occasion.

In this way, when the first code rate exceeds the code rate threshold, the terminal device may still include the first data packet on the second transmission occasion, to ensure transmission performance. However, because the quantity of valid REs in the second transmission occasion cannot carry all encoded information of the first data packet, when mapping the information of the first data packet to the second transmission occasion, the terminal device may drop a part of information.

In a possible design, the method further includes: if a first code rate of a first reference TBS carried on the second transmission occasion is greater than a code rate threshold, and a modified code rate is greater than the code rate threshold, sending a part of system information of the first data packet on the second transmission occasion by using a modified modulation order and the modified code rate, where the first reference TBS is a TBS calculated based on the quantity of valid REs included in the first transmission occasion, the modified code rate is a code rate of the first reference TBS carried on the second transmission occasion and using the modified modulation order, the control information is further used to notify a modulation order for transmitting the first data packet, and the modified modulation order is higher than the modulation order notified by using the control information.

In a possible design, that a quantity of valid REs included in a first transmission occasion is greater than a quantity of valid REs included in a second transmission occasion includes: the first transmission occasion is a transmission occasion that does not include a demodulation reference signal DMRS, and the second transmission occasion is a transmission occasion that includes a DMRS; or the first transmission occasion is a transmission occasion that includes a DMRS, the second transmission occasion is a transmission occasion that does not include a DMRS, a time domain symbol that carries the DMRS and that is in the first transmission occasion is further used to carry data information, and a length of a time domain resource that is not used to carry the DMRS and that is in the first transmission occasion is equal to a length of a time domain resource that is not used to carry a DMRS and that is in the second transmission occasion.

In a possible design, that a quantity of valid REs included in a first transmission occasion is greater than a quantity of valid REs included in a second transmission occasion includes: a time domain resource length corresponding to the first transmission occasion is greater than a time domain resource length corresponding to the second transmission occasion.

In a possible design, the control information is further used to notify a time domain resource length of one of the K transmission occasions.

The time domain resource length corresponding to the second transmission occasion is the time domain resource length notified by using the control information, the first transmission occasion is the last transmission occasion in the K transmission occasions that is in a first slot, and a time interval between a start moment of the first transmission occasion and an end boundary of the first slot is greater than the time domain resource length notified by using the control information.

Alternatively, the time domain resource length corresponding to the first transmission occasion is the time domain resource length notified by using the control information, the second transmission occasion is the last transmission occasion in the K transmission occasions that is in a first slot, and a time interval between a start moment of the second transmission occasion and an end boundary of the first slot is less than the time domain resource length notified by using the control information.

In a possible design, the time-frequency resource that is notified by using the control information and that is used to transmit the first data packet includes a time-frequency resource crossing a slot boundary in time domain.

The first transmission occasion and the second transmission occasion are two adjacent transmission occasions in the K transmission occasions.

The first transmission occasion corresponds to a time-frequency resource that is in the time-frequency resource crossing the slot boundary and that is located before the slot boundary, and the second transmission occasion corresponds to a time-frequency resource that is in the time-frequency resource crossing the slot boundary and that is located after the slot boundary. Alternatively, the first transmission occasion corresponds to a time-frequency resource that is in the time-frequency resource crossing the slot boundary and that is located after the slot boundary, and the second transmission occasion corresponds to a time-frequency resource that is in the time-frequency resource crossing the slot boundary and that is located before the slot boundary.

In a possible design, the control information is further used to notify a time domain resource length of one of the K transmission occasions, and a total time domain resource length of the first transmission occasion and the second transmission occasion corresponds to the time domain resource length that is of one transmission occasion and that is notified by using the control information. Alternatively, the control information is further used to notify a total time domain resource length of the K transmission occasions, and a sum of time domain resource lengths of the first transmission occasion and the second transmission occasion corresponds to the total time domain resource length of the K transmission occasions that is notified by using the control information.

In a possible design, an end moment of the first transmission occasion is equal to the slot boundary, and is equal to the start moment of the second transmission occasion, or an end moment of the second transmission occasion is equal to the slot boundary, and is equal to the start moment of the first transmission occasion.

In a possible design, if a code rate of a first reference TBS carried on a first candidate transmission occasion is not greater than a code rate threshold, the second transmission occasion is the first candidate transmission occasion, where the time domain resource length corresponding to the first transmission occasion is the time domain resource length notified by using the control information, the first reference TBS is a TBS calculated based on the quantity of valid REs included in the first transmission occasion, a time interval between a start moment of the first candidate transmission occasion and the end boundary of the first slot is less than the time domain resource length notified by using the control information, and the first slot is a slot in which the first candidate transmission occasion is located.

Alternatively, if a code rate of a second reference TBS carried on a first candidate transmission occasion is greater than a code rate threshold, the first transmission occasion is a second candidate transmission occasion, and the time domain resource length corresponding to the second transmission occasion is the time domain resource length notified by using the control information, where the second reference TBS is a TBS calculated based on the quantity of valid REs included in the second transmission occasion, a time interval between a start moment of the first candidate transmission occasion and the end boundary of the first slot is less than the time domain resource length notified by using the control information, the first slot is a slot in which the first candidate transmission occasion is located, a time-frequency resource corresponding to the second candidate transmission occasion includes a time-frequency resource corresponding to the first candidate transmission occasion, and a time interval between a start moment of the second candidate transmission occasion and the end boundary of the first slot is greater than the time domain resource length notified by using the control information.

According to a second aspect, an embodiment of this application provides a transport block size TBS determining method, including: sending control information to a terminal device, where the control information is used to notify information about a time-frequency resource for transmitting a first data packet, the time-frequency resource includes K transmission occasions, each of the K transmission occasions is used to perform one data transmission on the first data packet, and a quantity of valid resource elements REs included in a first transmission occasion in the K transmission occasions is greater than a quantity of valid REs included in a second transmission occasion in the K transmission occasions, where K is an integer greater than 1; and receiving, on at least one of the K transmission occasions, the first data packet sent by the terminal device, where a TBS corresponding to the first data packet is determined based on a target quantity of valid resource elements REs, and the target quantity of valid REs is an average quantity of valid REs included in each of the K transmission occasions, or the target quantity of valid REs is a quantity of valid REs included in a target transmission occasion in the K transmission occasions.

In a possible design, the target transmission occasion is the second transmission occasion.

In a possible design, the second transmission occasion is a transmission occasion in the K transmission occasions that includes a smallest quantity of valid REs, or the second transmission occasion is a transmission occasion in the K transmission occasions that includes a smallest quantity of time domain symbols.

In a possible design, the target transmission occasion is the first transmission occasion.

In a possible design, the first transmission occasion is a transmission occasion in the K transmission occasions that includes a largest quantity of valid REs, or the first transmission occasion is a transmission occasion in the K transmission occasions that includes a largest quantity of time domain symbols.

In a possible design, the control information is further used to notify a time domain resource length of one of the K transmission occasions, and a time domain resource length corresponding to the target transmission occasion is the time domain resource length notified by using the control information.

In a possible design, a time domain resource length corresponding to the second transmission occasion is the time domain resource length notified by using the control information.

In a possible design, a time domain resource length corresponding to the first transmission occasion is the time domain resource length notified by using the control information.

In a possible design, if a first code rate of a first reference TBS carried on the second transmission occasion is greater than a code rate threshold, the target transmission occasion is the second transmission occasion.

The first reference TBS is a TBS calculated based on the quantity of valid REs included in the first transmission occasion.

In a possible design, if a first code rate of a first reference TBS carried on the second transmission occasion is greater than a code rate threshold, and a modified code rate is greater than the code rate threshold, the target transmission occasion is the second transmission occasion.

The first reference TBS is a TBS calculated based on the quantity of valid REs included in the first transmission occasion, the modified code rate is a code rate of the first reference TBS carried on the second transmission occasion and using a modified modulation order, the control information is further used to notify a modulation order for transmitting the first data packet, and the modified modulation order is higher than the modulation order notified by using the control information.

In a possible design, if a first code rate of a first reference TBS carried on the second transmission occasion is not greater than a code rate threshold, the target transmission occasion is the first transmission occasion.

The first reference TBS is a TBS calculated based on the quantity of valid REs included in the first transmission occasion.

In a possible design, if a first code rate of a first reference TBS carried on the second transmission occasion is greater than a code rate threshold, and a modified code rate is not greater than the code rate threshold, the target transmission occasion is the first transmission occasion, where the first reference TBS is a TBS calculated based on the quantity of valid REs included in the first transmission occasion, the modified code rate is a code rate of the first reference TBS carried on the second transmission occasion and using a modified modulation order, the control information is further used to notify a modulation order for transmitting the first data packet, and the modified modulation order is higher than the modulation order notified by using the control information.

The method further includes: receiving, on the second transmission occasion, the first data packet sent by the terminal device by using the modified modulation order and the modified code rate.

In a possible design, the method further includes: if a first code rate of a first reference TBS carried on the second transmission occasion is greater than a code rate threshold, receiving, on the second transmission occasion, the first data packet sent by the terminal device by using the modified modulation order and the modified code rate, where the modified code rate is a code rate of the TBS that corresponds to the first data packet and that is carried on the second transmission occasion and uses the modified modulation order, the control information is further used to notify a modulation order for transmitting the first data packet, and the modified modulation order is higher than the modulation order notified by using the control information.

In a possible design, the receiving, on at least one of the K transmission occasions, the first data packet sent by the terminal device includes: if a first code rate of a first reference TBS carried on the second transmission occasion is greater than a code rate threshold, receiving, on the at least one transmission occasion, the first data packet sent by the terminal device, where the at least one transmission occasion is a transmission occasion in the K transmission occasions that is used by the terminal device to send the first data packet, the at least one transmission occasion does not include the second transmission occasion, and the first reference TBS is a TBS calculated based on the quantity of valid REs included in the first transmission occasion. Alternatively, this is described as: If a first code rate of a first reference TBS carried on the second transmission occasion is greater than a code rate threshold, a transmission occasion in the K transmission occasions that is used by the terminal device to send the first data packet does not include the second transmission occasion, where the first reference TBS is a TBS calculated based on the quantity of valid REs included in the first transmission occasion.

In a possible design, the receiving, on at least one of the K transmission occasions, the first data packet sent by the terminal device includes: if a first code rate of a first reference TBS carried on the second transmission occasion is greater than a code rate threshold, and a modified code rate is greater than the code rate threshold, receiving, on the at least one transmission occasion, the first data packet sent by the terminal device, where the at least one transmission occasion is a transmission occasion in the K transmission occasions that is used by the terminal device to send the first data packet, the at least one transmission occasion does not include the second transmission occasion, the first reference TBS is a TBS calculated based on the quantity of valid REs included in the first transmission occasion, the modified code rate is a code rate of the first reference TBS carried on the second transmission occasion and using a modified modulation order, the control information is further used to notify a modulation order for transmitting the first data packet, and the modified modulation order is higher than the modulation order notified by using the control information.

In a possible design, the receiving, on at least one of the K transmission occasions, the first data packet sent by the terminal device includes: if a first code rate of a first reference TBS carried on the second transmission occasion is greater than a code rate threshold, receiving, on the second transmission occasion, a part of system information that is of the first data packet and that is sent by the terminal device, where the first reference TBS is a TBS calculated based on the quantity of valid REs included in the first transmission occasion.

In a possible design, the receiving, on at least one of the K transmission occasions, the first data packet sent by the terminal device includes: if a first code rate of a first reference TBS carried on the second transmission occasion is greater than a code rate threshold, and a modified code rate is greater than the code rate threshold, receiving, on the second transmission occasion, a part of system information that is of the first data packet and that is sent by the terminal device by using a modified modulation order and the modified code rate, where the first reference TBS is a TBS calculated based on the quantity of valid REs included in the first transmission occasion, the modified code rate is a code rate of the first reference TBS carried on the second transmission occasion and using the modified modulation order, the control information is further used to notify a modulation order for transmitting the first data packet, and the modified modulation order is higher than the modulation order notified by using the control information.

In a possible design, that a quantity of valid REs included in a first transmission occasion is greater than a quantity of valid REs included in a second transmission occasion includes: the first transmission occasion is a transmission occasion that does not include a demodulation reference signal DMRS, and the second transmission occasion is a transmission occasion that includes a DMRS; or the first transmission occasion is a transmission occasion that includes a DMRS, the second transmission occasion is a transmission occasion that does not include a DMRS, a time domain symbol that carries the DMRS and that is in the first transmission occasion is further used to carry data information, and a length of a time domain resource that is not used to carry the DMRS and that is in the first transmission occasion is equal to a length of a time domain resource that is not used to carry a DMRS and that is in the second transmission occasion.

In a possible design, that a quantity of valid REs included in a first transmission occasion is greater than a quantity of valid REs included in a second transmission occasion includes: a time domain resource length corresponding to the first transmission occasion is greater than a time domain resource length corresponding to the second transmission occasion.

In a possible design, the control information is further used to notify a time domain resource length of one of the K transmission occasions.

The time domain resource length corresponding to the second transmission occasion is the time domain resource length notified by using the control information, the first transmission occasion is the last transmission occasion in the K transmission occasions that is in a first slot, and a time interval between a start moment of the first transmission occasion and an end boundary of the first slot is greater than the time domain resource length notified by using the control information.

Alternatively, the time domain resource length corresponding to the first transmission occasion is the time domain resource length notified by using the control information, the second transmission occasion is the last transmission occasion in the K transmission occasions that is in a first slot, and a time interval between a start moment of the second transmission occasion and an end boundary of the first slot is less than the time domain resource length notified by using the control information.

In a possible design, the time-frequency resource that is notified by using the control information and that is used to transmit the first data packet includes a time-frequency resource crossing a slot boundary in time domain.

The first transmission occasion and the second transmission occasion are two adjacent transmission occasions in the K transmission occasions.

The first transmission occasion corresponds to a time-frequency resource that is in the time-frequency resource crossing the slot boundary and that is located before the slot boundary, and the second transmission occasion corresponds to a time-frequency resource that is in the time-frequency resource crossing the slot boundary and that is located after the slot boundary. Alternatively, the first transmission occasion corresponds to a time-frequency resource that is in the time-frequency resource crossing the slot boundary and that is located after the slot boundary, and the second transmission occasion corresponds to a time-frequency resource that is in the time-frequency resource crossing the slot boundary and that is located before the slot boundary.

In a possible design, the control information is further used to notify a time domain resource length of one of the K transmission occasions, and a total time domain resource length of the first transmission occasion and the second transmission occasion corresponds to the time domain resource length that is of the one transmission occasion and that is notified by using the control information. Alternatively, the control information is further used to notify a total time domain resource length of the K transmission occasions, and a sum of time domain resource lengths of the first transmission occasion and the second transmission occasion corresponds to the total time domain resource length of the K transmission occasions that is notified by using the control information.

In a possible design, an end moment of the first transmission occasion is equal to the slot boundary, and is equal to the start moment of the second transmission occasion, or an end moment of the second transmission occasion is equal to the slot boundary, and is equal to the start moment of the first transmission occasion.

In a possible design, if a code rate of a first reference TBS carried on a first candidate transmission occasion is not greater than a code rate threshold, the second transmission occasion is the first candidate transmission occasion, where the time domain resource length corresponding to the first transmission occasion is the time domain resource length notified by using the control information, the first reference TBS is a TBS calculated based on the quantity of valid REs included in the first transmission occasion, a time interval between a start moment of the first candidate transmission occasion and the end boundary of the first slot is less than the time domain resource length notified by using the control information, and the first slot is a slot in which the first candidate transmission occasion is located.

Alternatively, if a code rate of a second reference TBS carried on a first candidate transmission occasion is greater than a code rate threshold, the first transmission occasion is a second candidate transmission occasion, and the time domain resource length corresponding to the second transmission occasion is the time domain resource length notified by using the control information, where the second reference TBS is a TBS calculated based on the quantity of valid REs included in the second transmission occasion, a time interval between a start moment of the first candidate transmission occasion and the end boundary of the first slot is less than the time domain resource length notified by using the control information, the first slot is a slot in which the first candidate transmission occasion is located, a time-frequency resource corresponding to the second candidate transmission occasion includes a time-frequency resource corresponding to the first candidate transmission occasion, and a time interval between a start moment of the second candidate transmission occasion and the end boundary of the first slot is greater than the time domain resource length notified by using the control information.

According to a third aspect, an embodiment of this application provides an apparatus. The apparatus may be a network device or a terminal device, or may be a semiconductor chip disposed in the network device or the terminal device. The apparatus has a function of implementing various possible implementations of the first aspect or the second aspect. The function may be implemented by hardware, or may be implemented by hardware executing corresponding software. The hardware or the software includes one or more units or modules corresponding to the foregoing function.

According to a fourth aspect, an embodiment of this application provides an apparatus, including a processor and a memory, where the processor is configured to execute instructions stored in the memory; and when the instructions are executed, the apparatus is enabled to perform the method according to the first aspect or any possible design of the first aspect.

According to a fifth aspect, an embodiment of this application provides a terminal device, including the apparatus according to the fourth aspect.

According to a sixth aspect, an embodiment of this application provides an apparatus, including a processor and a memory, where the processor is configured to execute instructions stored in the memory; and when the instructions are executed, the apparatus is enabled to perform the method according to the second aspect or any possible design of the second aspect.

According to a seventh aspect, an embodiment of this application provides a network device, including the apparatus according to the sixth aspect.

According to an eighth aspect, an embodiment of this application further provides a computer-readable storage medium, including instructions. When the instructions are executed, the method according to any one of the foregoing aspects or the possible designs of the foregoing aspects is implemented.

According to a ninth aspect, an embodiment of this application further provides a computer program product, including a computer program or instructions. When the computer program or the instructions is/are executed, the method according to any one of the foregoing aspects or the possible designs of the foregoing aspects is implemented.

DETAILED DESCRIPTION OF ILLUSTRATIVE EMBODIMENTS

Figure 1:
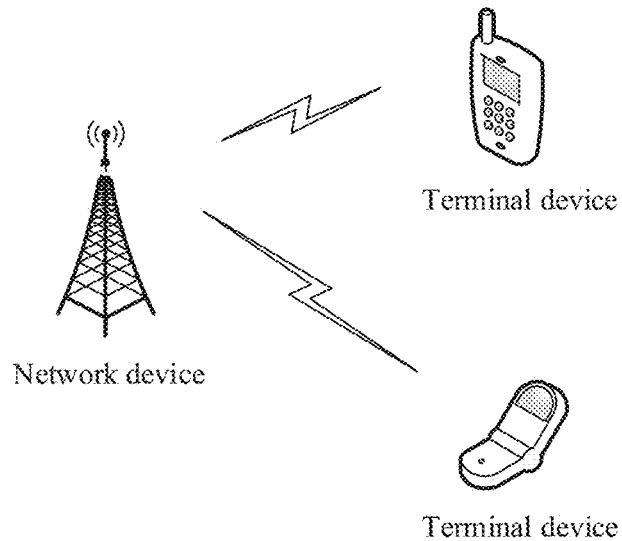
FIG. 1 is a schematic diagram of a possible architecture of a communication system to which an embodiment of this application is applicable.

To make objectives, technical solutions, and advantages of embodiments of this application clearer, the following further describes the embodiments of this application in detail with reference to the accompanying drawings.

Some terms in the embodiments of this application are first described, to help a person skilled in the art have a better understanding.

(1) A terminal device is a device having a wireless transceiver function, and may be deployed on land, where the deployment includes indoor or outdoor, handheld, wearable, or vehicle-mounted deployment; may be deployed on water (for example, on a ship); or may be deployed in air (for example, on an airplane, a balloon, and a satellite). The terminal device may be a mobile phone, a tablet computer, a computer having a wireless transceiver function, a virtual-reality terminal device, an augmented-reality terminal device, a wireless terminal in industrial control, a wireless terminal in self-driving, a wireless terminal in telemedicine, a wireless terminal in a smart grid, a wireless terminal in transportation safety, a wireless terminal in a smart city, a wireless terminal in a smart home, or the like. An application scenario is not limited in the embodiments of this application. The terminal device may also be sometimes referred to as user equipment (UE), a mobile station, a remote station, and the like. A specific technology, a device form, and a name that are used by the terminal device are not limited in the embodiments of this application.

(2) A network device is an access device through which the terminal device accesses the mobile communication system in a wireless manner, and may be a NodeB, an evolved NodeB (eNodeB), a transmission reception point (TRP), a next generation NodeB (gNB) in a 5G mobile communication system, a base station in a future mobile communication system, an access node in a wireless-fidelity (Wi-Fi) system, or the like; or may be a module or a unit that completes some functions of a base station, for example, may be a central unit (CU) or a distributed unit (DU). A specific technology and a specific device form that are used by the network device are not limited in the embodiments of this application.

(3) Various numbers such as "first" and "second" in the embodiments of this application are merely used for differentiation for ease of description, and are not used to limit the scope of the embodiments of this application or represent a sequence. The term "and/or" describes an association relationship between associated objects and represents that three relationships may exist. For example, A and/or B may represent the following three cases: Only A exists, both A and B exist, and only B exists. The term "at least one" means one or more. The term "at least two" means two or more. The term "at least one", "any one", or a similar expression thereof means any combination of these items, including a single item (piece) or any combination of a plurality of items (pieces). For example, at least one (piece or type) of a, b, or c may indicate: a, b, c, a and b, a and c, b and c, or a, b, and c, where a, b, and c may be singular or plural.

FIG. 1 is a schematic diagram of a possible architecture of a communication system to which an embodiment of this application is applicable. The communication system shown in FIG. 1 includes a network device and a terminal device.

It should be understood that FIG. 1 is merely a schematic diagram of the architecture of the communication system. Quantities of network devices and terminal devices in the communication system are not limited in this embodiment of this application. In addition, the communication system to which this embodiment of this application is applicable may further include other devices such as a core network device, a wireless relay device, and a wireless backhaul device in addition to the network device and the terminal device. This is not limited in this embodiment of this application either. In addition, the network device in the embodiments of this application may integrate all functions into one independent physical device, or may distribute functions on a plurality of independent physical devices. This is not limited in the embodiments of this application either. In addition, the terminal device in the embodiments of this application may be connected to the network device in a wireless manner.

The communication system to which the foregoing architecture is applicable may use various radio access technologies (RAT), such as code division multiple access (CDMA), time division multiple access (TDMA), frequency division multiple access (FDMA), orthogonal frequency division multiple access (OFDMA), and single-carrier frequency division multiple access (SC-FDMA). A RAT used by the communication system is not limited in this application. The terms "system" and "network" may be used interchangeably in this application. Networks may be classified into a 2G (generation) network, a 3G network, a 4G network, or a future evolved network such as a 5G network based on factors such as capacities, rates, or latencies of different networks or RATs used by the different networks. A typical 4G network includes a long term evolution (LTE) network, and a typical 5G network includes an NR network. The LTE network may also be sometimes referred to as an evolved universal terrestrial radio access network (E-UTRAN).

The system architecture and a service scenario that are described in the embodiments of this application are intended to describe the technical solutions in the embodiments of this application more clearly, and do not constitute a limitation on the technical solutions provided in the embodiments of this application. A person of ordinary skill in the art may learn that: With evolution of the communication system architecture and emergence of new service scenarios, the technical solutions provided in the embodiments of this application are also applicable to similar technical problems.

A 5G NR system is used as an example. In the 5G NR system, a resource element (RE) is a minimum resource unit used for data transmission, and corresponds to one time domain symbol in time domain and one subcarrier in frequency domain. A physical resource block (PRB) is a basic unit used for resource scheduling, and corresponds to a plurality of consecutive time domain symbols in time domain and a plurality of consecutive subcarriers in frequency domain, or corresponds to a plurality of consecutive subcarriers in frequency domain. The time domain symbol may be an orthogonal frequency division multiplexing (OFDM) symbol or an SC-FDMA symbol. A transmission time interval (TTI) is a time domain granularity used to carry data information or service information. For example, one data packet is carried on a time-frequency resource including one TTI in time domain and at least one physical resource block in frequency domain. A length of one TTI may be S time domain symbols, or may be less than S time domain symbols. Further, a TTI whose length is S time domain symbols may be referred to as a slot or a full slot, and a TTI whose length is less than S time domain symbols may be referred to as a mini slot or a non-slot. S=12 or 14. For example, for a normal cyclic prefix (normal CP), S=14, and for an extended cyclic prefix (extended CP), 5=12.

Uplink transmission in the 5G NR system is used as an example. An uplink channel used for the uplink transmission includes a PUSCH and a physical uplink control channel (PUCCH). The PUSCH may carry data information and/or uplink control information (UCI), and the PUCCH may carry the UCI. The data information may also be referred to as uplink shared channel (UL-SCH) information.

Further, uplink data transmission may include scheduling-based data transmission and grant-free (GF) data transmission. Grant-free may also be referred to as grant-less, configured grant (CG), or transmission without grant (TWG).

In the scheduling-based data transmission, if a service arrives at a terminal device and the terminal device needs to send uplink data, the terminal device needs to first send a scheduling request (SR) to a network device on a PUCCH. Correspondingly, after receiving the SR, the network device sends, to the terminal device, an uplink (UL) grant for scheduling a PUSCH. In this way, after receiving the UL grant, the terminal device may send the uplink data on a time-frequency resource scheduled by using the UL grant. It can be learned that a scheduling-based mode has advantages of high reliability and high channel usage efficiency. However, the terminal device needs to send the SR and can send the uplink data only after receiving the UL grant. This process has a specific latency. To reduce the latency, the GF data transmission is introduced into the 5G NR system. Specifically, the network device may preconfigure and/or pre-activate a time-frequency resource used for the GF data transmission (where the time-frequency resource may be referred to as a GF resource). In this way, if a service arrives at the terminal device, the terminal device may not send an SR to the network device, but directly send uplink data on the GF resource. This is referred to as performing data transmission in a GF mode. In other words, in the GF data transmission, the network device may semi-statically allocate, to the terminal device, the time-frequency resource used for the GF transmission, and the terminal device does not need to send the SR to the network device or receive, before sending the uplink data, a UL grant sent by the network device, but directly sends the uplink data on the time-frequency resource configured and/or activated by the network device.

Information used for the GF transmission, such as the time-frequency resource, a modulation and coding scheme, and pilot information, is referred to as a GF parameter, and may be configured by the network device by using higher layer signaling, or may be indicated by the network device by using a UL grant used to activate the GF transmission, namely, a semi-persistent UL grant, or may be notified to the terminal device by using a configuration using higher layer signaling and an indication using a semi-persistent UL grant.

To enhance transmission reliability, a multi-repetition mechanism is introduced into the PUSCH in the 5G NR system, that is, a same data packet is repeatedly transmitted on a plurality of PUSCHs. For example, a same data packet is repeatedly transmitted on K PUSCHs for K times. The K repetitions correspond to a same hybrid automatic repeat request (HARQ) process identifier (ID), where the HARQ process ID may be a HARQ process number. The K repetitions may be the scheduling-based data transmission, or may be the GF data transmission.

Figure 2:
FIG. 2 is a schematic diagram of possible implementations of a multi-repetition mechanism of a PUSCH according to an embodiment of this application.
Figure 2:
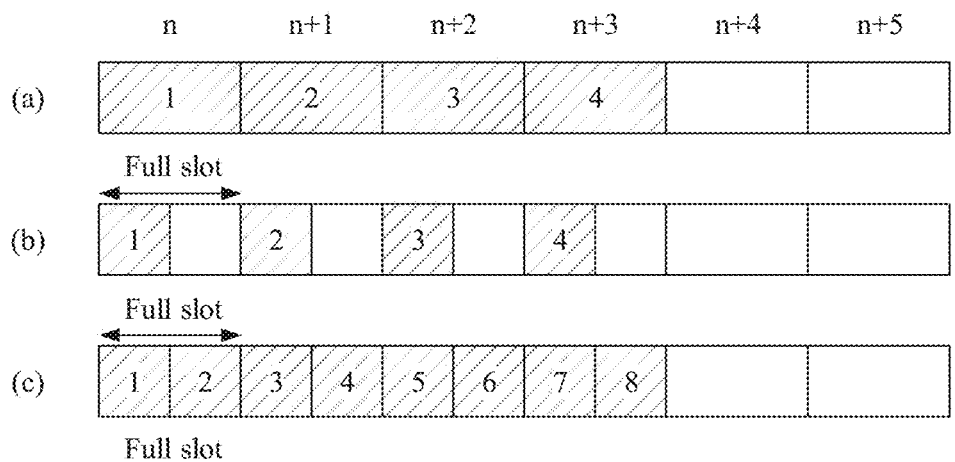

In a possible implementation (referred to as an implementation 1), the K repetitions are carried in K full slots, and each of the K repetitions is carried in one full slot. The K full slots are consecutive in time domain or have consecutive slot sequence numbers. For example, as shown in (a) in FIG. 2, K=4, and the terminal device continuously occupies slots n to n+3 to send four repetitions of a same data packet. In another possible implementation (referred to as an implementation 2), the K repetitions are carried in K full slots, but any one of the K repetitions is carried in a mini slot. That is, any two adjacent transmissions are carried in mini slots of different full slots, and two adjacent mini slots are non-consecutive in terms of time. For example, as shown in (b) in FIG. 2, K=4, the terminal device continuously occupies slots n to n+3 to send four repetitions of a same data packet, and each repetition is carried in a mini slot (corresponding to symbols 0 to 6) of a corresponding slot in the slots n to n+3. In still another possible implementation (referred to as an implementation 3), any one of the K repetitions is carried in a mini slot, at least two of the K repetitions are in one full slot, and two adjacent mini slots are consecutive, in other words, back-to-back, in terms of time. For example, as shown in (c) in FIG. 2, K=8, the terminal device continuously occupies slots n to n+3 to send eight repetitions of a same data packet, and each repetition is carried in a mini slot (corresponding to symbols 0 to 6 or symbols 7 to 13) of a corresponding slot in the slots n to n+3.

In the 5G NR system, a TBS corresponding to a data packet is calculated based on a time-frequency resource (for example, a total quantity of REs on a scheduled PUSCH), overheads on the PUSCH, and a modulation and coding scheme (MCS). The overheads on the PUSCH herein may include a quantity of REs occupied by a demodulation reference signal (DMRS) and a quantity of REs occupied by other overheads. In the multi-repetition mechanism of the PUSCH, because K PUSCHs are used to repeatedly transmit a same data packet, a TBS needs to remain unchanged. For the implementation 1 and the implementation 2, time-frequency resources corresponding to the K PUSCHs are the same. Therefore, the TBS corresponding to the data packet may be calculated based on the time-frequency resource corresponding to any one of the K PUSCHs. Specifically, using any PUSCH (for example, a PUSCH #1) in the K PUSCHs as an example, the terminal device first determines a quantity of valid REs included in each PRB in the PUSCH #1, where the quantity of valid REs is a total quantity of REs included in each PRB minus a quantity of REs occupied by a DMRS and a quantity of REs occupied by other overheads. Then, the terminal device determines a quantity of valid REs included in the PUSCH #1 based on a quantity of PRBs included in the PUSCH #1. Finally, the terminal device determines, based on a modulation scheme and a code rate that correspond to the MCS configured or indicated by the network device, a quantity of system information bits included in a data packet carried on the PUSCH #1, namely, a TBS corresponding to the data packet.

The following describes a possible method for calculating the TBS corresponding to the data packet. The method may include step a to step c.

Step a: Determine a quantity of valid REs included in one PRB of the PUSCH #1.

Specifically, the quantity of valid REs included in one PRB is determined by using the following formula:

$$N_{RE}' = N_{sc}^{RB} \cdot N_{symb}^{sh} - N_{DMRS}^{PRB} - N_{oh}^{PRB}$$

$N_{RE}'$ represents the quantity of valid REs included in one PRB. $N_{sc}^{RB}$ represents a quantity of subcarriers in one PRB in frequency domain, and may be specifically 12. $N_{symb}^{sh}$ represents a quantity of scheduled symbols of the PUSCH

1. $N_{DMRS}^{PRB}$ represents a quantity of REs in one PRB that are occupied by a DMRS (the quantity of REs may also be referred to as DMRS overheads). $N_{oh}^{PRB}$h represents a quantity of REs occupied by other overheads, and may be specifically a quantity of REs occupied by overheads on each PRB that are configured by using a parameter xOverhead in a higher layer parameter PUSCH-ServingCellConfig.

Step b: Calculate the quantity of valid REs included in the PUSCH #1.

Specifically, the quantity of valid REs included in the PUSCH #1 is calculated by using the following formula:

$$N_{RE}=\min(156,N_{RE}')\cdot n_{PRB}$$

$N_{RE}$ represents the quantity of valid REs included in the PUSCH #1, and $n_{PRB}$ represents the quantity of PRBs included in the PUSCH #1.

Step c: Determine the TBS corresponding to the data packet carried on the PUSCH #1.

Specifically, a parameter $N_{info}$ is determined by using the following formula:

$$N_{info}=N_{RE}\cdot R\cdot Q_m\cdot \upsilon$$

$Q_m$ is a modulation order, R is the code rate, and v is a quantity of layers. $Q_m$ and R may be obtained through table query by using an index number of the MCS configured or indicated by the network device.

Specifically, if $N_{info}\leq 3824$, a quantized intermediate value of the system information bits may be calculated by using a formula $$N'_{info} = \max\left(24, 2^n \left\lfloor \frac{N_{info}}{2^n} \right\rfloor\right),$$

where n=max (3, $\lfloor\log_2(N_{info})\rfloor$−6), and a value that is not less than and is nearest to $N_{info}'$ is obtained through table query and is used as the TBS corresponding to the data packet.

If $N_{info}>3824$, a quantized intermediate value of the system information bits may be calculated by using a formula $$N'_{info} = \max\left(2840, 2^n \times \text{round}\left(\frac{N_{info} - 24}{2^n}\right)\right),$$

where n=$\lfloor\log_2(N_{info}-24)\rfloor$−5. If the code rate R≤¼, $$TBS = 8\cdot C\cdot \left\lceil \frac{N'_{info} + 24}{8\cdot C} \right\rceil - 24,$$

$$\text{where } C = \left\lceil \frac{N'_{info} + 24}{3816} \right\rceil.$$

Otherwise, $$TBS = 8\cdot C\cdot \left\lceil \frac{N'_{info} + 24}{8\cdot C} \right\rceil - 24,$$

$$\text{where } C = \left\lceil \frac{N'_{info} + 24}{8424} \right\rceil.$$

In the implementation 1 and the implementation 2, there is only one PUSCH in each slot, positions and duration of time domain resources of the K PUSCHs used to repeatedly transmit the data packet are the same in the corresponding slots, and frequency domain resources and MCSs of the K PUSCHs are the same. Therefore, the PUSCHs have a same parameter (including a quantity of valid REs and an MCS) used to calculate a TBS, and the terminal device may calculate, based on a time-frequency resource, overheads, and the MCS that are configured by the network device for a single PUSCH, the TBS corresponding to the data packet.

However, for the implementation 3, at least two of the K PUSCHs correspond to different time-frequency resources. For example, different PUSCHs have different positions or different overheads in corresponding slots. The following specifically describes three possible scenarios of the implementation 3.

(1) Scenario 1: DMRS Sharing Scenario

Different PUSCHs have different DMRS overheads. Specifically, some of the K PUSCHs include a DMRS, and some of the K PUSCHs do not include a DMRS. A PUSCH not including a DMRS may be demodulated by using a channel that is estimated by using a DMRS in a PUSCH that includes a DMRS and that is located before the PUSCH not including a DMRS. For a PUSCH including a DMRS, a time domain symbol carrying the DMRS may not carry data information, or data information and the DMRS may be multiplexed on the time domain symbol in a frequency division multiplexing (FDM) manner. In this scenario, a quantity of valid REs in the PUSCH including a DMRS may be greater than a quantity of valid REs in the PUSCH not including a DMRS, or a quantity of valid REs in the PUSCH including a DMRS may be less than a quantity of valid REs in the PUSCH not including a DMRS. For example, if a time domain resource length (for example, a quantity of time domain symbols) of the PUSCH including a DMRS is the same as that of the PUSCH not including a DMRS, the quantity of valid REs in the PUSCH including a DMRS is less than the quantity of valid REs in the PUSCH not including a DMRS. If a length of a time domain resource that is of the PUSCH including a DMRS and that is not used to carry the DMRS is equal to a time domain resource length of the PUSCH not including a DMRS, and the DMRS and the data information are multiplexed in the FDM manner on the time domain symbol that carries the DMRS and that is in the PUSCH including a DMRS, the quantity of valid REs in the PUSCH including a DMRS is greater than the quantity of valid REs in the PUSCH not including a DMRS.

Figure 3:
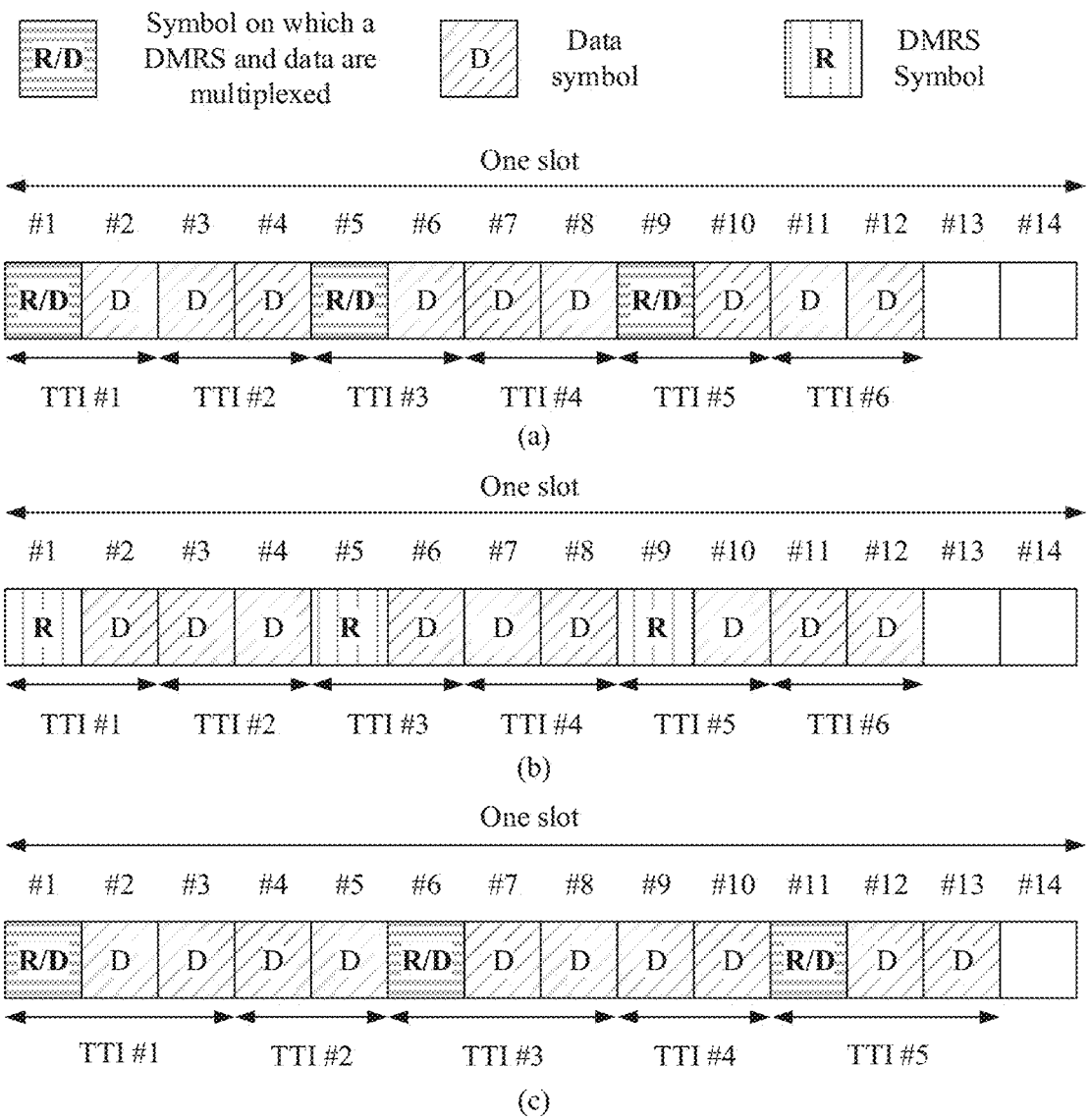
FIG. 3 is a schematic diagram of a scenario 1 according to an embodiment of this application.

For example, as shown in FIG. 3, one slot includes a plurality of PUSCHs, some PUSCHs include a DMRS, and the other PUSCHs do not include a DMRS. For (a) and (b) in FIG. 3, each PUSCH includes two time domain symbols, the 1$^{st}$ PUSCH, the 3$^{rd}$ PUSCH, and the 5$^{th}$ PUSCH each include a DMRS, and the 2$^{nd}$ PUSCH, the 4$^{th}$ PUSCH, and the 6$^{th}$ PUSCH do not include a DMRS. Because the 1$^{st}$ PUSCH, the 3$^{rd}$ PUSCH, and the 5$^{th}$ PUSCH carry DMRS overheads, quantities of valid REs of the 1$^{st}$ PUSCH, the 3$^{rd}$ PUSCH, and the 5$^{th}$ PUSCH are less than those of the 2$^{nd}$ PUSCH, the 4$^{th}$ PUSCH, and the 6$^{th}$ PUSCH. For (c) in FIG. 3, each PUSCH includes two non-DMRS time domain symbols, the 1$^{st}$ PUSCH, the 3$^{rd}$ PUSCH, and the 5$^{th}$ PUSCH each include a DMRS, and the 2$^{nd}$ PUSCH and the 4$^{th}$ PUSCH do not include a DMRS. Because symbols that carry the DMRSs and that are in the 1$^{st}$ PUSCH, the 3$^{rd}$ PUSCH, and the 5$^{th}$ PUSCH further carry a part of data information, quantities of valid REs of the 1$^{st}$ PUSCH, the 3$^{rd}$ PUSCH and the 5$^{th}$ PUSCH are greater than those of the 2$^{nd}$ PUSCH and the 4$^{th}$ PUSCH.

(2) Scenario 2: Utilization of an Orphan Symbol Before a Slot Boundary

To reduce a transmission latency on the PUSCH as much as possible, a time domain resource start point of the $1^{st}$ PUSCH (or referred to as an earliest PUSCH) in the K PUSCHs may be flexible. For example, a start symbol of the earliest PUSCH may be any symbol in a slot. In this way, once an uplink service arrives, the terminal device may send uplink service information on the PUSCH in a timely manner. However, it is considered that in a process of a plurality of repetitions, if a total time domain resource length of the K PUSCHs is relatively large, or the time domain resource start point of the earliest PUSCH is relatively late, a total time domain resource of the K PUSCHs may cross a slot boundary. In this case, due to a limitation by the time domain resource start point of the earliest PUSCH and equal time domain resource lengths of the PUSCHs, it is difficult to align an end moment of the last PUSCH in the slot with an end boundary of the slot and ensure that a time domain length of the last PUSCH is equal to that of another PUSCH having a normal length, that is, there may be some orphan symbols between the end moment of the last PUSCH in the slot and the end boundary of the slot. These orphan symbols cannot form a PUSCH having a normal length but form a gap whose length is less than the normal PUSCH length.

To use these orphan symbols as much as possible, in an example, the gap may be used to transmit a short PUSCH, where the short PUSCH has a smaller time domain resource length than other PUSCHs having a normal length, and the other PUSCHs having a normal length are equal in length. In this case, a quantity of valid REs of the short PUSCH is less than that of the PUSCH having a normal length. As shown in (a) in FIG. 4, a start symbol of the K PUSCHs is a symbol #1 in a slot #1, and a time domain resource length that is of one PUSCH and that is notified by the network device is three symbols. In this case, if the $4^{th}$ PUSCH also includes three symbols, a gap of two symbols is left before a slot boundary. For resource utilization, the two symbols may form a short PUSCH, namely, the $5^{th}$ PUSCH, and a quantity of valid REs of the $5^{th}$ PUSCH is less than that of another normal PUSCH.

"#1" in the "slot #1" in this embodiment of this application is used to identify that an index number or a sequence number of the slot is 1, in other words, is used to identify that the slot is the $1^{st}$ slot. Similarly, "#1" in the "symbol #1" is used to identify that an index number or a sequence number of the symbol is 1, in other words, is used to identify that the symbol is the $1^{st}$ symbol. The foregoing merely uses "#1" as an example, and other numbers may be understood with reference. Details are not described again. It may be understood that indexes or sequence numbers of slots may be numbered starting from 0 or 1, and indexes or sequence numbers of symbols may also be numbered starting from 0 or 1. This is not limited in this application.

In another example, a PUSCH before the gap may be lengthened to fill the gap, to form a long PUSCH, where the long PUSCH has a larger time domain resource length than other PUSCHs having a normal length, and the other PUSCHs having a normal length are equal in length. In this case, a quantity of valid REs of the long PUSCH is greater than that of the PUSCH having a normal length. As shown in (b) in FIG. 4, a start symbol of the K PUSCHs is a symbol #1 in a slot #1, and a time domain resource length that is of one PUSCH and that is notified by the network device is three symbols. In this case, if the $4^{th}$ PUSCH also includes three symbols, a gap of two symbols is left before a slot boundary. For resource utilization, the $4^{th}$ PUSCH may be lengthened to a length of five symbols. Therefore, a quantity of valid REs of the $4^{th}$ PUSCH is greater than that of another PUSCH having a normal length.

(3) Scenario 3: A Slot Boundary Divides a Long Time Domain Resource into Two PUSCHs Whose Lengths are not Equal to Each Other The network device notifies a time domain resource length, and the time domain resource length may be a time domain resource length of a single PUSCH in the K PUSCHs or a total time domain resource length of the K PUSCHs. If a time domain resource corresponding to the time domain resource length notified by the network device does not cross a slot boundary, the terminal device may send only one long PUSCH. If a time domain resource corresponding to the time domain resource length notified by the network device crosses a slot boundary, the time domain resource may be divided by the slot boundary into two PUSCHs. To ensure flexibility of a start point and the length of the time domain resource crossing the slot boundary, lengths of the two PUSCHs on two sides of the slot boundary may be not equal to each other. As shown in (a) in FIG. 5, the total time domain resource length notified by the network device is 13 symbols, and a start symbol is a symbol #12 of a slot #1. The total length crosses a slot boundary of the slot #1 and a slot #2, and therefore is divided by the slot boundary into two PUSCHs whose lengths are not equal to each other, in other words, K=2. A length of the $1^{st}$ PUSCH that is before the slot boundary is three symbols, and a length of the $2^{nd}$ PUSCH that is after the slot boundary is 10 symbols. A quantity of valid REs included in the $2^{nd}$ PUSCH is greater than a quantity of valid REs included in the $1^{st}$ PUSCH. As shown in (b) in FIG. 5, the total time domain resource length notified by the network device is 14 symbols, and a start symbol is a symbol #5 of a slot #1. The total length crosses a slot boundary of the slot #1 and a slot #2, and therefore is divided by the slot boundary into two PUSCHs whose lengths are not equal to each other, in other words, K=2. A length of the $1^{st}$ PUSCH that is before the slot boundary is 10 symbols, and a length of the $2^{nd}$ PUSCH that is after the slot boundary is four symbols. A quantity of valid REs included in the $2^{nd}$ PUSCH is less than a quantity of valid REs included in the $1^{st}$ PUSCH. As shown in (c) in FIG. 5, the network device notifies that a time domain resource length of a single PUSCH in K=7 PUSCHs is three symbols, and a TTI #1 to a TTI #4 in a slot #1 each correspond to three symbols. However, two orphan symbols are left at an end boundary of the slot #1 and are insufficient to carry a PUSCH of three symbols. Therefore, a time domain resource of three symbols is divided by the slot boundary into two PUSCHs, namely, a TTI #5 and a TTI #6, where the TTI #5 includes two symbols, and the TTI #6 includes one symbol.

Considering that in the foregoing scenario 1 to scenario 3, a quantity of valid REs included in at least one of the K PUSCHs is different from a quantity of valid REs included in another PUSCH, the foregoing method for calculating, by using a quantity of valid REs included in any one of the K PUSCHs, a TBS corresponding to a data packet cannot be used. Based on this, the embodiments of this application provide a TBS determining method, to determine, when a quantity of valid REs included in at least one of a plurality of PUSCHs is different from a quantity of valid REs included in another PUSCH, a TBS corresponding to a data packet.

Figure 6:
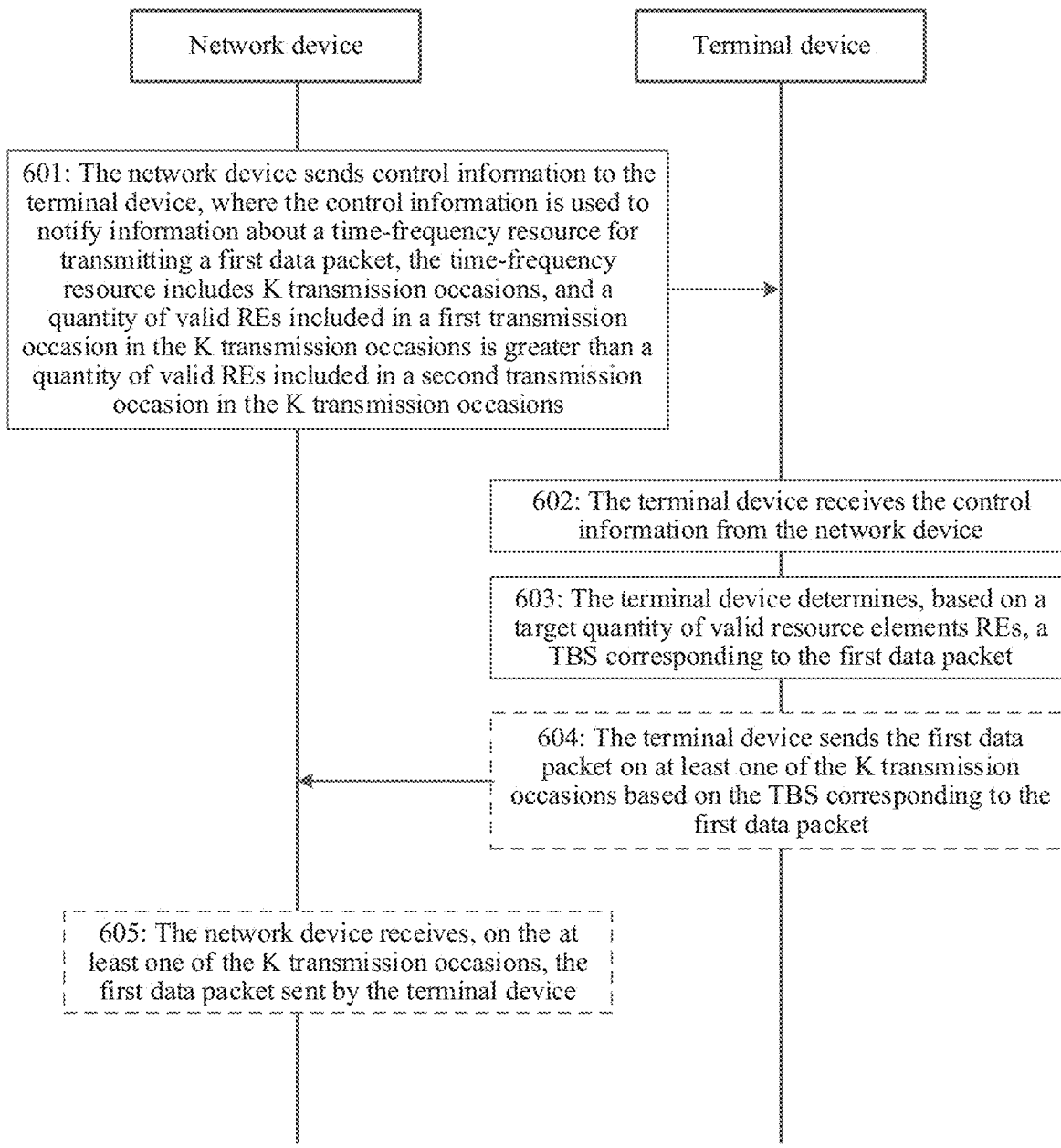
FIG. 6 is a schematic flowchart corresponding to a TBS determining method according to an embodiment of this application.

FIG. 6 is a schematic flowchart corresponding to a TBS determining method according to an embodiment of this application. As shown in FIG. 6, the method includes the following steps.

Step 601: A network device sends control information to a terminal device. Correspondingly, step 602: The terminal device receives the control information from the network device. The control information is used to notify information about a time-frequency resource for transmitting a first data packet, the time-frequency resource includes K transmission occasions, and a quantity of valid REs included in a first transmission occasion in the K transmission occasions is greater than a quantity of valid REs included in a second transmission occasion in the K transmission occasions.

In this embodiment of this application, a transmission occasion (TO) may be understood as a time-frequency resource used to transmit information. When the transmission occasion is used to transmit uplink information (including data information and/or control information), the transmission occasion may alternatively be a PUSCH. Further, the following transmission occasion and PUSCH have equivalent concepts, and may be interchangeably used. For example, any data transmission on the K transmission occasions is a PUSCH or corresponds to a PUSCH.

Herein, each of the K transmission occasions may be used to perform one data transmission on the first data packet, in other words, the K transmission occasions are used to perform K data transmissions on the first data packet. That one transmission occasion is used to perform one data transmission on the first data packet may be understood as: From a perspective of the terminal device, one transmission occasion is used to send the first data packet once. From a perspective of the network device, one transmission occasion is used to receive the first data packet once.

A value of K is not specifically limited in this embodiment of this application. For example, K may be an integer greater than 1. In another possible embodiment, K may alternatively be equal to 1. In this case, the K=1 transmission occasion (referred to as the transmission occasion) is the following target transmission occasion, and a target quantity of valid REs is a quantity of valid REs included in the transmission occasion. That is, the K transmission occasions do not include two transmission occasions (namely, the first transmission occasion and the second transmission occasion) corresponding to different quantities of valid REs.

In a possible implementation, that the control information is used to notify information about a time-frequency resource for transmitting a first data packet means that the control information is used to schedule the terminal device to perform K data transmissions on the K transmission occasions. In this case, the network device may send the control information by using a dynamic UL grant, in other words, the control information includes a dynamic UL grant, where the dynamic UL grant may be a UL grant scrambled by using a user-specific radio network temporary identifier (RNTI), for example, a cell radio network temporary identifier (C-RNTI).

In another possible implementation, that the control information is used to notify information about a time-frequency resource for transmitting a first data packet means that the control information is used to configure the terminal device to perform K data transmissions on the K transmission occasions, in other words, the control information is used to configure the terminal device to perform data transmission on the K transmission occasions in a GF mode. In this case, the network device may send the control information by using higher layer signaling and/or a semi-persistent UL grant, in other words, the control information includes higher layer signaling and/or a semi-persistent UL grant, where the higher layer signaling may be radio resource control (RRC) signaling, and the semi-persistent UL grant may be a UL grant scrambled by using a configured scheduling radio network temporary identifier (CS-RNTI).

In still another possible implementation, a part of the K data transmissions are data transmissions that the network device schedules the terminal device to perform, and the other part of the K data transmissions are data transmissions that the network device configures the terminal device to perform in the GF mode. In this case, the control information includes configuration information for configuring the terminal device to perform data transmission in the GF mode, and also includes scheduling information for scheduling the terminal device to perform data transmission.

It should be noted that the K transmission occasions are configured or indicated by the network device by using one piece of control information, instead of being configured or indicated by the network device through a plurality of configurations or indications using a plurality of pieces of control information. For example, if the control information is a UL grant (for example, a dynamic UL grant or a semi-persistent UL grant), the UL grant is one UL grant. In other words, the K transmission occasions are scheduled or configured by using a same UL grant, instead of being separately scheduled or configured by using a plurality of different UL grants. For another example, if the control information is higher layer signaling, the K transmission occasions are configured by using a same piece of higher layer signaling, instead of being separately configured by using a plurality of different pieces of higher layer signaling or configured through a plurality of configurations using a same field of higher layer signaling.

In this embodiment of this application, the K transmission occasions may be carried in K time units that are consecutive in terms of time, and in a one-to-one correspondence with the K time units. The K time units that are consecutive in terms of time may mean that the K time units are consecutive in time domain, that is, there is no gap between any two adjacent time units in the K time units; or the K time units have consecutive sequence numbers.

Specifically, the time unit is a time unit used to carry one transmission occasion (for example, one of the K transmission occasions). This may be referred to as that the time unit corresponds to the transmission occasion. That the K transmission occasions are in a one-to-one correspondence with the K time units may alternatively be described as that each of the K time units is used to carry one of the K transmission occasions, and different time units carry different transmission occasions.

On the one hand, that the time unit corresponds to the transmission occasion, in other words, the time unit is a time unit used to carry the transmission occasion, may be understood as: A time domain resource occupied by the transmission occasion is the time unit, in other words, the transmission occasion corresponds to the time unit in time domain. That is, all time domain resources in the time unit are used for a current data transmission. For example, as shown in (a) in FIG. 2, each of a slot n to a slot n+3 includes 14 time domain symbols, symbol numbers are 0 to 13, and a time domain resource corresponding to a $k^{th}$ (k=1, . . . , or K) transmission occasion in the K transmission occasions is a time domain symbol 0 to a time domain symbol 13 in a slot n+k−1, that is, all time domain resources included in a $k^{th}$ time unit are used for a $k^{th}$ data transmission.

On the other hand, that the time unit corresponds to the transmission occasion, in other words, the time unit is a time unit used to carry the transmission occasion, may alternatively be understood as: The time unit includes a time domain resource corresponding to the transmission occasion. That is, the time unit may further include a time domain resource other than the time domain resource corresponding to the transmission occasion. For example, the time unit includes the time domain resource corresponding to the transmission occasion and a gap that is between the transmission occasion and a next transmission occasion adjacent to the transmission occasion and that is not used by the terminal device to perform data transmission. The gap may be an idle time domain resource, or may be a time domain resource used for communication between another terminal device and the network device. This is not limited in this embodiment of this application. For example, as shown in (b) in FIG. 2, each of a slot n to a slot n+3 includes 14 time domain symbols, symbol numbers are 0 to 13, a time unit corresponding to a $k^{th}$ transmission occasion in the K transmission occasions is a time domain symbol 0 to a time domain symbol 6 in a slot n+k−1, namely, a time domain resource corresponding to the $k^{th}$ transmission occasion, and a $k^{th}$ time unit in the K time units is all time domain symbols in the slot n+k−1, and includes but is larger than the time domain resource corresponding to the $k^{th}$ transmission occasion.

It should be understood that the time domain symbol in this embodiment of this application may also be referred to as a symbol.

It should be understood that, that the K transmission occasions are used to perform K data transmissions on the first data packet means that the K transmission occasions are in a one-to-one correspondence with the K transmissions, and each of the K transmission occasions is used to perform one data transmission on the first data packet (in other words, is used to carry one data transmission of the first data packet). Herein, for any one of the K transmission occasions, that the transmission occasion is used to perform data transmission on the first data packet means that the transmission occasion is a potential transmission occasion used to send the first data packet. That is, actually, the terminal device may send the first data packet on the transmission occasion, or may not send the first data packet on the transmission occasion. For example, the terminal device drops the transmission occasion due to a collision occurring on the transmission occasion. The collision herein includes a collision between the transmission occasion and a time domain symbol that is not used to send uplink data information and that is notified by the network device, or a collision between the transmission occasion and another channel that the network device indicates the terminal device to send, as described below. For another example, when a code rate of the first data packet carried on the transmission occasion exceeds a code rate threshold, the terminal device drops the transmission occasion, as described below.

Specifically, the first data packet in this embodiment of this application is an original information-element data packet that is not modulated or encoded, and is also referred to as a transport block (TB), a medium access control protocol data unit (MAC PDU), or a UL-SCH.

It should be noted that, that the K transmission occasions are used to perform K data transmissions on the first data packet may also be referred to as that the K transmission occasions are used by the terminal device to perform K repetitions on the first data packet. Specifically, data packets carried on different transmission occasions in the K transmission occasions (or different data transmissions in the K data transmissions) have same original information-element information, or have same valid data information that is not modulated or encoded. However, whether information that is modulated and encoded and then is sent on different transmission occasions in the K transmission occasions is the same is not limited. In other words, the network device may indicate the terminal device to use a same redundancy version number or different redundancy version numbers, or use a same DMRS sequence or different DMRS sequences, or perform scrambling by using a same scrambling code or different scrambling codes, when the terminal device sends the first data packet on different transmission occasions in the K transmission occasions. To be specific, even if the network device configures or indicates the terminal device to use different redundancy version numbers or different DMRS sequences, or perform scrambling by using different scrambling codes, when the terminal device sends the first data packet on different transmission occasions in the K transmission occasions, the first data packets carried on different transmission occasions in the K transmission occasions (in other words, different data transmissions in the K data transmissions) all correspond to the same original information-element information, that is, correspond to the same MAC PDU, the same TB, or the same UL-SCH.

It should be understood that repetition of the first data packet may also be referred to as aggregation or slot aggregation of the first data packet.

Optionally, the K transmission occasions are all transmission occasions on which the terminal device performs, as scheduled by the network device by using one piece of control information (for example, one UL grant), a plurality of repeat data transmissions on the first data packet.

Optionally, the K transmission occasions are all transmission occasions on which the terminal device performs, as configured by the network device by using the control information, a plurality of repeat data transmissions on the first data packet.

Optionally, the K transmission occasions are a part of all transmission occasions on which the terminal device performs, as scheduled by the network device by using one piece of control information (for example, one dynamic UL grant), a plurality of repeat data transmissions on the first data packet.

Optionally, the K transmission occasions are a part of all transmission occasions on which the terminal device performs, as configured by the network device by using the control information, a plurality of repeat data transmissions on the first data packet.

In this embodiment of this application, the information about the time-frequency resource for transmitting the first data packet may include the value of K and/or time domain resources corresponding to the K transmission occasions. The following separately describes the value of K and the time domain resources corresponding to the K transmission occasions.

(1) Value of K

In an example, the value of K may be explicitly notified by the network device. For example, the control information includes the value of K.

In another example, the value of K may be implicitly notified by the network device. For example, the control information sent by the network device includes time domain resource information for transmitting the first data packet and/or a value of H (H is a positive integer). The time domain resource information for transmitting the first data packet may include a time domain resource start point for transmitting the first data packet (namely, a time domain resource start point of the K transmission occasions) and/or a time domain resource length for transmitting the first data packet (for example, a total time domain resource length for transmitting the first data packet or a time domain resource length of one transmission occasion, a single transmission occasion, or each transmission occasion in the K transmission occasions). H is a quantity of transmission occasions that is notified by using the control information. Correspondingly, the terminal device may determine the value of K based on the time domain resource information for transmitting the first data packet. Specifically, the terminal device may determine the value of K based on the time domain resource information for transmitting the first data packet and/or the value of H, and slot boundary information and/or a predefined criterion. For example, the control information sent by the network device includes the notified time domain resource start point for transmitting the first data packet and the notified total time domain resource length for transmitting the first data packet (namely, the total time domain resource length of the K transmission occasions). Correspondingly, if determining, based on the time domain resource start point for transmitting the first data packet, the total time domain resource length for transmitting the first data packet, and the slot boundary information, that a total time domain resource for transmitting the first data packet crosses Q slot boundaries, the terminal device may determine that K=Q+1, that is, the total time domain resource for transmitting the first data packet is divided by the slot boundaries into Q+1 transmission occasions, where Q is an integer greater than 0, as shown in (b) in FIG. 5. For another example, the control information sent by the network device includes the time domain resource start point for transmitting the first data packet, the value of H, and the time domain resource length of one of the K transmission occasions. Correspondingly, if the K transmission occasions cross h slot boundaries, and a time interval between a specific slot boundary and a start moment of the last transmission occasion in the K transmission occasions that is located before the slot boundary is less than the time domain resource length that is of one transmission occasion and that is notified by using the control information, the terminal device may additionally send the last transmission occasion (a short transmission occasion). In this case, the quantity K that is determined by the terminal device and that is of transmission occasions actually used for repetition is H+h, as shown in (a) in FIG. 4 or (c) in FIG. 5.

Specifically, the value of K or H may be obtained through a configuration using a higher layer parameter aggregationFactorUL or repK.

(2) Time domain resources corresponding to the K transmission occasions.

In an example, the time domain resources notified by using the control information that correspond to the K transmission occasions may include: a time domain resource (for example, a time domain resource start point and a time domain resource length) that corresponds to one of the K transmission occasions and that is notified by using the control information. For example, the control information sent by the network device may be used to notify a time domain resource corresponding to a specific transmission occasion in the K transmission occasions (for example, the $1^{st}$ transmission occasion in the K transmission occasions). Correspondingly, the terminal device may determine, based on the time domain resource corresponding to the specific transmission occasion, a time domain resource corresponding to the remaining transmission occasion in the K transmission occasions. In this embodiment of this application, the K transmission occasions are carried in the K time units that are consecutive in terms of time. Therefore, for any remaining transmission occasion in the K transmission occasions other than the specific transmission occasion, a time domain resource start point or a time domain resource end point of the remaining transmission occasion may be obtained by using a time domain resource start point or a time domain resource end point of the specific transmission occasion. Further, a time domain resource length of the remaining transmission occasion may be obtained by using a time domain resource length that is of the specific transmission occasion and that is notified by using the control information. For example, the time domain resource length of the remaining transmission occasion is the same as the time domain resource length of the specific transmission occasion, or a quantity of non-DMRS symbols included in the remaining transmission occasion is the same as a quantity of non-DMRS symbols included in the specific transmission occasion. Further, the time domain resource length of the remaining transmission occasion may alternatively be determined by using the slot boundary information and/or a predefined transmission occasion division criterion. For example, an orphan symbol before a slot boundary enables the time domain resource length of the remaining transmission occasion to be greater than or less than the time domain resource length of the specific transmission occasion, as described in the foregoing scenario 2 or scenario 3.

In another example, the time domain resources notified by using the control information that correspond to the K transmission occasions include: a total time domain resource (for example, a time domain resource start point and a time domain resource length) corresponding to the K transmission occasions that is notified by using the control information. For example, the control information sent by the network device may be used to notify the total time domain resource corresponding to the K transmission occasions. Correspondingly, the terminal device may determine, based on other information such as the slot boundary information and/or a predefined transmission occasion division criterion, a time domain resource corresponding to each of the K transmission occasions, as described in the foregoing scenario 3.

In this embodiment of this application, the K transmission occasions include at least two transmission occasions, and quantities of valid REs included in the at least two transmission occasions are different. That is, the K transmission occasions include the first transmission occasion and the second transmission occasion, and the quantity of valid REs included in the first transmission occasion is greater than the quantity of valid REs included in the second transmission occasion, or a quantity of time domain symbols included in the first transmission occasion is greater than a quantity of time domain symbols included in the second transmission occasion.

In an example, the K transmission occasions correspond to two quantities of valid REs, for example, a first quantity of valid REs and a second quantity of valid REs. At least one transmission occasion including the first transmission occasion corresponds to the first quantity of valid REs, at least one transmission occasion including the second transmission occasion corresponds to the second quantity of valid REs, and the first quantity of valid REs is greater than the second quantity of valid REs. A quantity of valid REs that corresponds to any one of the K transmission occasions is the first quantity of valid REs or the second quantity of valid REs, in other words, a quantity of valid REs included in any one of the K transmission occasions is the first quantity of valid REs or the second quantity of valid REs.

In another example, the K transmission occasions correspond to more than two quantities of valid REs. For example, the K transmission occasions further include another transmission occasion in addition to the first transmission occasion corresponding to the first quantity of valid REs and the second transmission occasion corresponding to the second quantity of valid REs, and a quantity of valid REs that corresponds to the another transmission occasion is neither equal to the first quantity of valid REs nor equal to the second quantity of valid REs.

It should be noted: (1) For any one of the K transmission occasions (for example, the first transmission occasion, the second transmission occasion, or a third transmission occasion or a fourth transmission occasion below), a quantity of valid REs included in the transmission occasion is a quantity of REs in the transmission occasion that are used to carry valid information. Specifically, the valid information is information carried on a modulation symbol in the transmission occasion. For example, the valid information may be data information, or may be data information and control information (UCI).

(2) The valid REs in the transmission occasion do not include an RE notified by the network device as an overhead RE. Optionally, the overhead RE includes an RE used to carry a DMRS. Optionally, the overhead RE includes an overhead RE notified by using higher layer signaling xOverhead. Optionally, the overhead RE includes an RE used to carry a sounding reference signal (SRS).

In an example, the valid REs in the transmission occasion include an RE that is in the transmission occasion and that is used to carry the UCI, in other words, the valid information carried on the transmission occasion includes the uplink control information (UCI). In this case, the quantity of valid REs included in the transmission occasion is a quantity of all REs included in the transmission occasion minus a quantity of overhead REs included in the transmission occasion. For example, the quantity of valid REs included in the transmission occasion is $N_{RE}=\min(156, N_{RE}') \cdot n_{PRB}$, where $N_{RE}'=N_{sc}^{RB} \cdot N_{symb}^{sh} - N_{DMRS}^{PRB} - N_{oh}^{PRB}$, B N $N_{oh}^{PRB}$ is a quantity of overhead REs included in each PRB that are notified by using the higher layer signaling, $N_{DMRS}^{PRB}$ is a quantity of REs in each PRB that are used to carry a DMRS, $N_{symb}^{sh}$ is a quantity of symbols included in the transmission occasion, $n_{PRB}$ is a quantity of PRBs included in the transmission occasion, and $N_{sc}^{RB}$ is a quantity of subcarriers included in any PRB in the transmission occasion.

In another example, the valid REs in the transmission occasion do not include an RE that is in the transmission occasion and that is used to carry the UCI, in other words, the valid information carried on the transmission occasion includes UL-SCH information but does not include the UCI. In this case, the quantity of valid REs included in the transmission occasion is a quantity of all REs included in the transmission occasion minus a quantity of overhead REs included in the transmission occasion and a quantity of REs in the transmission occasion that are used to carry the UCI. The UCI and the UL-SCH information on the transmission occasion are independently encoded and mapped, the RE occupied by the UCI is determined based on a quantity of UCI bits that need to be carried on the current transmission occasion, and the RE used to map the UCI is not used to map the UL-SCH information. If a TBS is calculated based on total REs used to map the UCI and the UL-SCH information, the calculated TBS is excessively large. When an information amount of the UCI is relatively large (a corresponding quantity of REs used to map the UL-SCH information is relatively small), the TBS cannot be carried on the REs used to map the UL-SCH information. Therefore, valid REs for calculating the TBS may exclude the RE used to map the UCI (that is, the valid REs do not include the RE used to carry the UCI), so that the calculated TBS of the first data packet matches a resource used to carry the UL-SCH information of the first data packet, and a result is more accurate.

The UCI may include any one of the following: (1) a HARQ-acknowledgement (acknowledgement, ACK); (2) SR information; (3) channel state information (channel state information, CSI); (4) a HARQ-ACK and SR information; (5) a HARQ-ACK and CSI; (6) SR information and CSI; and (7) a HARQ-ACK, SR information, and CSI.

In this embodiment of this application, optionally, the K transmission occasions do not include a transmission occasion that is dropped due to a collision. The dropped transmission occasion may be a transmission occasion that is dropped due to a collision with the time domain symbol that is notified by the network device and that is not used to send the uplink data information. The dropped transmission occasion is also a transmission occasion that the terminal device is notified by using the control information to use to send the first data packet, but is dropped by the terminal device due to a lower priority when colliding with a time domain symbol that is notified by the network device by using other control information and that is not used for uplink data transmission. More specifically, the time domain symbol that is notified by the network device and that is not used to send the uplink data information includes: a downlink symbol notified by the network device, a flexible symbol notified by the network device, or a symbol that carries an SRS and that is notified by the network device. Alternatively, the dropped transmission occasion may be a transmission occasion that is dropped due to a collision with another channel (for example, a PUCCH or another transmission occasion with a higher priority) that the network device indicates the terminal device to send.

For example, the terminal device is scheduled or configured by using the control information to repeatedly transmit the first data packet on M transmission occasions, where M>K, but M-K transmission occasions are dropped due to a collision with a symbol notified by the network device as "downlink". In this case, when the terminal device calculates the TBS of the first data packet, the target quantity of valid REs is obtained based on quantities of valid REs included in the K transmission occasions that are not dropped or a quantity of valid REs included in one target transmission occasion in the K transmission occasions that are not dropped, without participation of a quantity of valid REs in any one of the M-K transmission occasions that need to be dropped.

Optionally, the M transmission occasions are all transmission occasions on which the terminal device performs, as scheduled by the network device by using one piece of control information (for example, one UL grant), a plurality of repeat data transmissions on the first data packet.

Optionally, the M transmission occasions are all transmission occasions on which the terminal device performs, as configured by the network device by using the control information, a plurality of repeat data transmissions on the first data packet. For example, the control information is a semi-persistent UL grant. Alternatively, the M transmission occasions are all transmission occasions in a same GF periodicity.

The GF periodicity is a time domain resource used by the terminal device to perform data transmission in a GF mode. A time domain resource that is configured by the network device for the terminal device by using the control information and that is used for GF data transmission periodically appears, and a time interval between two adjacent periodicities is the GF periodicity. In any two GF periodicities, time domain resources used for GF data transmission are repeated.

It should be understood that, for any one of the M transmission occasions, that the any transmission occasion collides with the time domain symbol that is notified by the network device and that is not used to send the uplink data information specifically means that a time domain resource corresponding to the any transmission occasion overlaps, in time domain, the time domain symbol that is notified by the network device and that is not used to send the uplink data information. For example, at least one time domain symbol included in the any transmission occasion is the time domain symbol that is notified by the network device and that is not used to send the uplink data information.

Correspondingly, that the dropped transmission occasion may be a transmission occasion that is dropped due to a collision with the time domain symbol that is notified by the network device and that is not used to send the uplink data information means that the dropped transmission occasion is a transmission occasion that is dropped due to overlapping, in time domain, with the time domain symbol that is notified by the network device and that is not used to send the uplink data information. For example, at least one time domain symbol in the dropped transmission occasion is the time domain symbol that is notified by the network device and that is not used to send the uplink data information, and therefore the terminal device drops the transmission occasion.

Optionally, that the target quantity of valid REs is obtained based on quantities of valid REs included in the K transmission occasions that are not dropped means that the target quantity of valid REs is a sum of the quantities of valid REs included in all the K transmission occasions that are not dropped, or that the target quantity of valid REs is an average quantity of valid REs in the K transmission occasions that are not dropped. A definition of the quantity of valid REs included in any one of the K transmission occasions is described above, and details are not described again.

Optionally, that the target quantity of valid REs is obtained based on quantities of valid REs included in the K transmission occasions that are not dropped means that the target quantity of valid REs is a sum of quantities of valid REs included in P transmission occasions in the K transmission occasions that are not dropped, or that the target quantity of valid REs is an average quantity of valid REs in P transmission occasions in the K transmission occasions that are not dropped, where P is a positive integer less than K (or M).

Further, the dropped transmission occasion is dropped by the terminal device due to a collision with a time domain symbol that is notified by the network device by using other control information and that is not used for uplink data transmission, and the time domain symbol that is not used for the uplink data transmission is a time domain symbol that is semi-statically configured by the network device not to be used for the uplink data transmission. In this case, the other control information is higher layer signaling. Specifically, the other control information is TDD-UL-DL-ConfigurationCommon or TDD-UL-DL-ConfigDedicated. For example, the network device notifies, by using the higher layer signaling, that some time domain symbols are "downlink" symbols or "flexible" symbols, and these time domain symbols overlap the M–K transmission occasions in the M transmission occasions in time domain. Therefore, the terminal device drops the M–K transmission occasions, and the terminal device determines, based on the quantities of valid REs included in the K transmission occasions that are not dropped, the TBS corresponding to the first data packet.

In this case, K may be equal to 1, or may be an integer greater than 1.

It should be understood that, that the K transmission occasions do not include a transmission occasion that is dropped due to a collision may also be referred to as that the K transmission occasions do not include a transmission occasion that is dropped by the terminal device, or referred to as that the K transmission occasions are transmission occasions that are not dropped in the transmission occasions (namely, the M transmission occasions) notified by using the control information that are used to transmit the first data packet. The dropped transmission occasion may be a transmission occasion that is dropped due to a collision with the time domain symbol that is notified by the network device and that is not used to send the uplink data information, or may be a transmission occasion that is dropped due to a power limitation. The transmission occasion that is not dropped is a transmission occasion other than the dropped transmission occasion in the transmission occasions notified by using the control information that are used to transmit the first data packet.

It is considered that when the M transmission occasions notified by using the control information include both a transmission occasion including a larger quantity of valid REs (referred to as a larger transmission occasion) and a transmission occasion including a smaller quantity of valid REs (referred to as a smaller transmission occasion), the larger transmission occasion may be dropped by the terminal device due to a collision with the time domain symbol that is notified by the network device and that is not used to send the uplink data information. If the larger transmission occasion is still used to calculate the TBS of the first data packet, the calculated TBS may be excessively large and not match a resource included in the smaller transmission occasion. Consequently, transmission reliability deteriorates, and the system information bits are even lost due to an excessively high equivalent code rate. Therefore, an advantage of determining, by using the transmission occasion that is not dropped, the TBS corresponding to the first data packet is: It can be ensured that the calculated TBS matches a transmission occasion that is actually occupied and used by the terminal device to send information, to ensure data transmission reliability.

Figure 16:
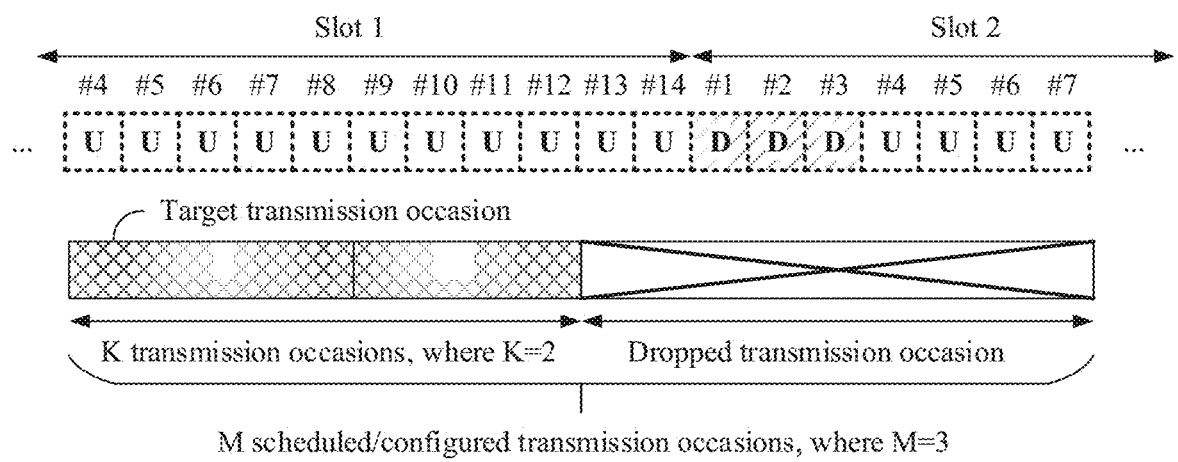
FIG. 16 is a schematic diagram in which a collision occurs on a transmission occasion according to an embodiment of this application.

For example, as shown in FIG. 16, the K transmission occasions are notified by using the control information to be used to perform data transmission on the first data packet, M=3, a time domain resource length of the $1^{st}$ transmission occasion is five symbols, a time domain resource length of the $2^{nd}$ transmission occasion is four symbols, a time domain resource length of the $3^{rd}$ transmission occasion is nine symbols, and some time domain symbols included in the $3^{rd}$ transmission occasion are time domain symbols semi-statically configured as "downlink" by the network device, and therefore collide with the $3^{rd}$ transmission occasion. The terminal device drops the $3^{rd}$ transmission occasion, determines a target transmission occasion from the $1^{st}$ transmission occasion and the $2^{nd}$ transmission occasion that are not dropped, and determines, based on a target quantity of valid REs included in the target transmission occasion, the TBS corresponding to the first data packet.

In this embodiment of this application, optionally, the K transmission occasions include a transmission occasion that is dropped due to a collision. A definition of the collision is described above, and details are not described again.

It should be understood that, that the K transmission occasions include a transmission occasion that is dropped due to a collision may also be referred to as that the K transmission occasions include a transmission occasion that is dropped by the terminal device. The dropped transmission occasion may be a transmission occasion that is dropped due to a collision with the time domain symbol that is notified by the network device and that is not used to send the uplink data information, or may be a transmission occasion that is dropped due to a power limitation.

Further, the dropped transmission occasion is dropped due to a collision with a time domain symbol that is notified by the network device by using other control information and that is not used for uplink data transmission, and the time domain symbol that is not used for the uplink data transmission is a time domain symbol dynamically indicated by the network device. In this case, the other control information is physical layer signaling. Specifically, the other control information is downlink control information (DCI). More specifically, the DCI is DCI corresponding to a format 2_0.

Further, the K transmission occasions include the first transmission occasion and the second transmission occasion. If a first code rate of a first reference TBS carried on the second transmission occasion is greater than a code rate threshold, the second transmission occasion is dropped when the first data packet is sent. The first reference TBS is a TBS calculated based on the quantity of valid REs included in the first transmission occasion, and the first transmission occasion is the foregoing dropped transmission occasion. For descriptions about that the first code rate of the first reference TBS carried on the second transmission occasion is greater than the code rate threshold, refer to the following descriptions.

Step 603: The terminal device determines, based on the target quantity of valid resource elements REs, the TBS corresponding to the first data packet.

Optionally, after step 603, the method may further include: Step 604: The terminal device performs data transmission on the first data packet on at least one of the K transmission occasions based on the TBS corresponding to the first data packet. In this embodiment of this application, that the terminal device performs data transmission on the first data packet on the at least one transmission occasion may be understood as: The terminal device sends the first data packet on the at least one transmission occasion. Correspondingly, step 605: The network device receives, on the at least one of the K transmission occasions, the first data packet sent by the terminal device. The at least one transmission occasion may be the K transmission occasions, or may be a part of the K transmission occasions. For example, in some cases, the terminal device drops the other part of the K transmission occasions, and does not perform data transmission on the dropped transmission occasions, and a transmission occasion that is actually used for data transmission is the part of the K transmission occasions. For example, if the K transmission occasions include a transmission occasion that is dropped due to a collision, a quantity of transmission occasions actually used for sending is less than K.

To more accurately calculate the TBS, the target quantity of valid REs is introduced in this embodiment of this application, so that the terminal device may determine, based on the target quantity of valid REs, the transport block size TBS corresponding to the first data packet. Specifically, the control information sent by the network device may be further used to notify an MCS. In this way, the terminal device may determine the TBS of the first data packet based on the MCS notified by using the control information and the target quantity of valid REs. For a specific process, refer to the foregoing descriptions about calculating the TBS. The target quantity of valid REs in this embodiment of this application may replace $N_{RE}$ above.

In this embodiment of this application, there may be a plurality of methods for determining the target quantity of valid REs. In an embodiment, there may be three possible methods. The following specifically describes the three possible methods.

(1) Method 1

In an example, the target quantity of valid REs is the average quantity of valid REs included in each of the K transmission occasions. For example, if a quantity of valid REs included in a $k^{th}$ (k is greater than or equal to 1, and k is less than or equal to K) transmission occasion in the K transmission occasions is $N_k$, the average quantity of valid REs included in each of the K transmission occasions is obtained by using $$\sum_{k=1}^{K} N_k / K,$$

and for example, is $$\left\lfloor \sum_{k=1}^{K} N_k / K \right\rfloor \text{ or } \left\lceil \sum_{k=1}^{K} N_k / K \right\rceil,$$

where $\lfloor \ \rfloor$ represents rounding down, and $\lceil \ \rceil$ represents rounding up.

Figure 7:
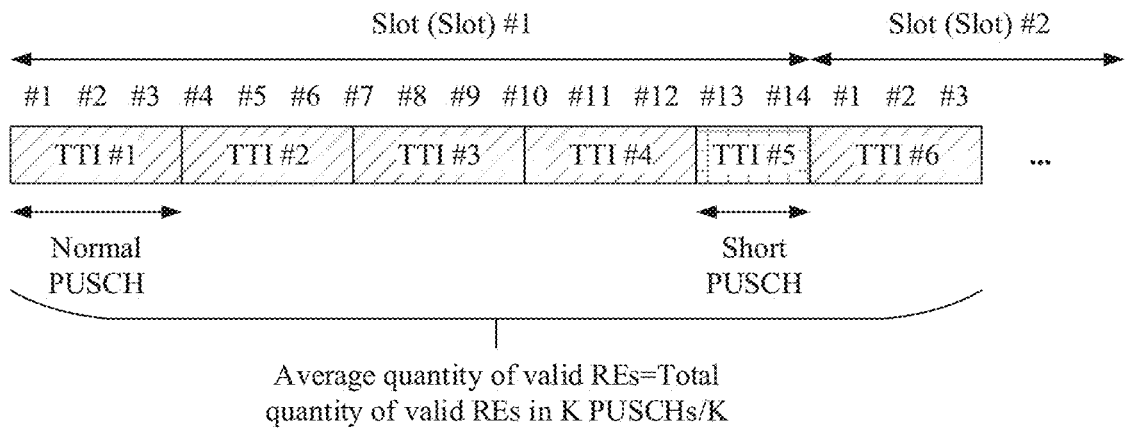
FIG. 7 is a schematic diagram of determining an average quantity of valid REs according to an embodiment of this application.

For example, as shown in FIG. 7, a start symbol of the K transmission occasions is a symbol #1 in a slot #1, and the time domain resource length that is of one transmission occasion and that is notified by the network device is three symbols. In this case, a gap of two symbols is left after the first four transmission occasions and before a slot boundary. The terminal device may use the two symbols as a short transmission occasion, namely, the second transmission occasion, and a quantity of valid REs in the short transmission occasion is less than a quantity of valid REs in another transmission occasion, namely, the first transmission occasion. Assuming that the quantity of valid REs in the first transmission occasion is $N_1$, and the quantity of valid REs in the second transmission occasion is $N_2$, the average quantity of valid REs=$(5*N_1+N_1)/6$, where $N_1$ and $N_2$ are positive integers.

In other words, the target quantity of valid REs is the average quantity of valid REs included in each of the K transmission occasions. Assuming that a total quantity of valid REs included in the K transmission occasions is N, the target quantity of valid REs may be obtained according to N/K. For example, N/K is rounded up or rounded down to obtain the target quantity of valid REs.

In another example, the target quantity of valid REs is obtained based on an average quantity of symbols included in each of the K transmission occasions. For example, if a quantity of symbols included in a $k^{th}$ (k is greater than or equal to 1, and k is less than or equal to K) transmission occasion in the K transmission occasions is $S_k$, the average quantity of valid REs included in each of the K transmission occasions may be obtained by using the average quantity $$\sum_{k=1}^{K} S_k / K$$

of symbols.

A compromise may be achieved in the foregoing manner in which the TBS is calculated by using the average quantity of valid REs, to effectively avoid a problem that a TBS calculated based on the transmission occasion including a relatively large quantity of valid REs is excessively large or a TBS calculated based on the transmission occasion including a relatively small quantity of valid REs is excessively small.

In still another example, the target quantity of valid REs is a quantity of all valid REs included in the K transmission occasions (namely, the sum of the quantities of valid REs). Alternatively, the target quantity of valid REs is obtained based on a quantity of all valid REs included in the K transmission occasions. For example, if a quantity of valid REs included in a $k^{th}$ (k is greater than or equal to 1, and k is less than or equal to K) transmission occasion in the K transmission occasions is $N_k$, the quantity of all valid REs included in the K transmission occasions is $$\sum_{k=1}^{K} N_k.$$

In yet another example, the target quantity of valid REs is a quantity of all valid REs included in the P transmission occasions in the K transmission occasions (namely, the sum of the quantities of valid REs), where P is a positive integer, and P is less than K. Alternatively, the target quantity of valid REs is obtained based on a quantity of all valid REs included in the P transmission occasions. For example, if a quantity of valid REs included in a $p^{th}$ (p is greater than or equal to 1, and p is less than or equal to P) transmission occasion in the P transmission occasions is $N_p$, the quantity of all valid REs included in the K transmission occasions is $$\sum_{p=1}^{P} N_p.$$

The P transmission occasions may be notified by the network device to the terminal device, or may be determined based on a predefined criterion.

(2) Method 2

The target quantity of valid REs is the quantity of valid REs included in the target transmission occasion in the K transmission occasions, and the target transmission occasion is the second transmission occasion.

It is considered that when some of a plurality of transmission occasions include a larger quantity of valid REs, and some of the plurality of transmission occasions include a smaller quantity of valid REs, if the TBS is calculated based on the transmission occasion including a larger quantity of valid REs, a larger TBS is calculated. If the larger TBS is carried on the transmission occasion including a smaller quantity of valid REs, transmission reliability of the transmission occasion including a smaller quantity of valid REs may deteriorate. For example, because resources used to map data information are quite insufficient, a code rate for coding is excessively high, and even system bits are lost. Therefore, to ensure the transmission reliability, the second transmission occasion including a smaller quantity of valid REs may be used as the target transmission occasion, so that performance deterioration caused by excessively high code rates for some transmission occasions is avoided. For example, as shown in (b) in FIG. 4, most transmission occasions (TTIs #1/2/3/5) include a smaller quantity of valid REs. If the TBS is calculated based on the transmission occasion having a larger quantity of valid REs, namely, a transmission occasion corresponding to a TTI #4, code rates for the other transmission occasions are excessively high, causing deterioration of transmission reliability of the K repetitions as a whole.

In an example, the second transmission occasion may be a transmission occasion in the K transmission occasions that includes a smallest quantity of valid REs, or the second transmission occasion may be a transmission occasion in the K transmission occasions that includes a smallest quantity of time domain symbols. For example, as shown in (a) or (b) in FIG. 3, the second transmission occasion is a transmission occasion corresponding to a TTI #1. As shown in (c) in FIG. 3, the second transmission occasion is a transmission occasion corresponding to a TTI #2. For another example, as shown in (a) or (b) in FIG. 4, the second transmission occasion is a transmission occasion corresponding to the TTI #5. For another example, as shown in (a) in FIG. 5, the second transmission occasion is a transmission occasion corresponding to a TTI #1.

In another example, the K transmission occasions correspond to more than two quantities of valid REs. In this case, the K transmission occasions further include a third transmission occasion, and a quantity of valid REs included in the third transmission occasion is less than the quantity of valid REs included in the second transmission occasion, that is, the quantity of valid REs included in the second transmission occasion is less than the quantity of valid REs included in the first transmission occasion but greater than the quantity of valid REs included in the third transmission occasion. If the second transmission occasion is determined as the target transmission occasion, a TBS with a moderate size may be determined, so that the TBS is neither too large to damage reliability nor too small to reduce transmission efficiency. In this way, a relatively good compromise is achieved between the reliability and the transmission efficiency.

In still another example, a time domain resource length of the second transmission occasion is (or corresponds to) the time domain resource length that is of one transmission occasion and that is notified by using the control information. Alternatively, this may be understood as: If a time domain resource length of the second transmission occasion is equal to or corresponds to the time domain resource length that is of one transmission occasion and that is notified by using the control information, the target transmission occasion is the second transmission occasion. In this case, the K transmission occasions further include the first transmission occasion, and the quantity of valid REs included in the first transmission occasion is greater than a quantity of valid REs that corresponds to the time domain resource length that is of one transmission occasion and that is notified by using the control information.

Further, the time domain resource length that is of one transmission occasion (or a single transmission occasion or each transmission occasion) and that is notified by using the control information is a time domain resource length corresponding to one of the K transmission occasions. The one transmission occasion herein may be the $1^{st}$ transmission occasion or the $2^{nd}$ transmission occasion in the K transmission occasions, or may be any one of the K transmission occasions. For example, as shown in (c) in FIG. 3, if the network device notifies that the time domain resource length of one transmission occasion is two time domain symbols, the quantity of valid REs is a quantity of valid REs included in a transmission occasion whose length is two symbols (for example, the transmission occasion of the TTI #2). For another example, as shown in (a) or (b) in FIG. 4, if the network device notifies that the time domain resource length of one transmission occasion is three time domain symbols, the quantity of valid REs is a quantity of valid REs included in a transmission occasion whose length is three symbols (for example, a transmission occasion of a TTI #1).

That is, the quantity of valid REs is the quantity of valid REs included in the target transmission occasion, and a time domain resource length of the target transmission occasion is equal to or corresponds to the time domain resource length that is of one transmission occasion and that is notified by using the control information. In other words, the terminal device calculates the TBS based on the quantity of valid REs included in the transmission occasion in the K transmission occasions that corresponds to the time domain resource length notified by using the control information, regardless of whether the K transmission occasions include another transmission occasion with a longer or shorter time domain resource. According to this method, the network device may adjust the TBS by adjusting the notified time domain resource length of one transmission occasion, to prevent the calculated TBS from being excessively large or excessively small.

That the control information is used to notify the time domain resource length (for example, the time domain resource length is the time domain resource length of one transmission occasion or the total time domain resource length of the K transmission occasions) includes: The control information is used to notify a time domain resource information index number, where the index number is used to obtain, through index, one piece of time domain resource information from a plurality of pieces of time domain resource information that are predefined or preconfigured. Each of the plurality of pieces of time domain resource information corresponds to a specific time domain resource position, where the time domain resource position includes a time domain resource start moment (for example, a start symbol) and a time domain resource length. The length included in the specific time domain resource position is the time domain resource length corresponding to one of the K transmission occasions, or the total time domain resource length corresponding to the K transmission occasions.

Specifically, the time domain resource length is notified by using a start and length indicator value (SLIV) field in the control information, and the field is used to notify a sequence number S of a start symbol of a time domain resource and a quantity L of consecutive time domain symbols. More specifically, there is a time domain resource table that is configured by the network device or is predefined. The time domain resource table includes a plurality of pieces of time domain resource information, and each piece of time domain resource information corresponds to a combination of a time domain resource start symbol and a time domain resource length. The SLIV field is used to notify an SLIV index number (namely, the time domain resource information index number), and the SLIV index number is used to indicate one of the foregoing plurality of pieces of time domain resource information. Therefore, after receiving the SLIV index number, the terminal device may obtain a specific position (a start moment and a length) of the time domain resource from the plurality of pieces of time domain resource information through index. For example, if the control information includes a UL grant, the SLIV field corresponds to a Time domain resource assignment field in the UL grant. For another example, if the control information includes higher layer signaling, the SLIV field corresponds to a time Domain Allocation field in the higher layer signaling.

It should be noted that the time domain resource length (for example, a time domain resource length corresponding to the first transmission occasion, the time domain resource length corresponding to the second transmission occasion, a time domain resource length corresponding to the following fourth transmission occasion, the time domain resource length that is of one transmission occasion and that is notified by using the control information, or the total time domain resource length of the K transmission occasions that is notified by using the control information) in this embodiment of this application may also be referred to as a quantity of time domain symbols.

(3) Method 3

The target quantity of valid REs is the quantity of valid REs included in the target transmission occasion in the K transmission occasions, and the target transmission occasion is the first transmission occasion.

It is considered that when some of a plurality of transmission occasions include a larger quantity of valid REs, and some of the plurality of transmission occasions include a smaller quantity of valid REs, if the TBS is calculated based on the transmission occasion including a smaller quantity of valid REs, a smaller TBS is calculated. If the smaller TBS is carried on the transmission occasion including a larger quantity of valid REs, a code rate may be lower than a code rate corresponding to the MCS notified by using the control information. Although reliability is higher, transmission efficiency is lower because a quantity of transmitted information bits is smaller. Therefore, to ensure the transmission reliability, the first transmission occasion including a larger quantity of valid REs may be used as the target transmission occasion. In this case, although performance of the second transmission occasion having a smaller quantity of valid REs may deteriorate because the second transmission occasion carries an excessively large TBS, the deterioration may be compensated for through the K repetitions. For example, as shown in (a) in FIG. 4, most transmission occasions (TTIs #1/2/3/4/6) include a larger quantity of valid REs. If the TBS is calculated based on the transmission occasion having a smaller quantity of valid REs, namely, the transmission occasion corresponding to the TTI #5, the calculated TBS is excessively small. Consequently, transmission efficiency of other transmission occasions is relatively low, and transmission efficiency of the K repetitions is reduced.

In an example, the first transmission occasion may be a transmission occasion in the K transmission occasions that includes a largest quantity of valid REs, or the first transmission occasion may be a transmission occasion in the K transmission occasions that includes a largest quantity of time domain symbols. For example, as shown in (a) or (b) in FIG. 3, the first transmission occasion is a transmission occasion corresponding to a TTI #2. As shown in (c) in FIG. 3, the first transmission occasion is a transmission occasion corresponding to a TTI #1. For another example, as shown in (a) in FIG. 4, the first transmission occasion is the transmission occasion corresponding to the TTI #1. For another example, as shown in (a) in FIG. 5, the first transmission occasion is a transmission occasion corresponding to a TTI #2.

In another example, a time domain resource length of the first transmission occasion is (or corresponds to) the time domain resource length that is of one transmission occasion and that is notified by using the control information. Alternatively, this may be understood as: If a time domain resource length of the first transmission occasion is equal to the time domain resource length that is of one transmission occasion and that is notified by using the control information, the target transmission occasion is the first transmission occasion. In this case, the K transmission occasions further include the second transmission occasion, and the quantity of valid REs included in the second transmission occasion is less than a quantity of valid REs that corresponds to the time domain resource length that is of one transmission occasion and that is notified by using the control information. Descriptions herein are similar to the descriptions in the method 2 about that the time domain resource length of the second transmission occasion is the time domain resource length that is of one transmission occasion and that is notified by using the control information, and details are not described again.

After the TBS corresponding to the first data packet is obtained by using the foregoing method 3, because the quantity of valid REs included in the second transmission occasion is relatively small, the second transmission occasion may fail to carry all information obtained after the TBS corresponding to the first data packet is modulated and encoded based on the MCS notified by using the control information. To resolve this problem, this embodiment of this application provides three possible solutions. The following separately describes the three possible solutions in detail.

Solution 1: Drop the Second Transmission Occasion.

If the first code rate (CR) corresponding to the first reference TBS carried on the second transmission occasion is greater than the code rate threshold (which may be represented as CR_th), where the first reference TBS is the TBS calculated based on the quantity of valid REs included in the first transmission occasion, that the terminal device performs data transmission on the first data packet on at least one of the K transmission occasions includes: The terminal device drops the second transmission occasion when performing data transmission on the first data packet. That is, if the TBS corresponding to the first data packet is calculated according to the method 3, and if the code rate is excessively high when the first data packet is carried on the second transmission occasion, the terminal device may drop the second transmission occasion when sending the first data packet. Considering that performance is relatively poor even if the terminal device sends the first data packet on the second transmission occasion, if the second transmission occasion is dropped, a time-frequency resource of the second transmission occasion may be saved, and is used by the network device to schedule or indicate another terminal device to send information.

Correspondingly, the network device receives, on the at least one of the K transmission occasions, the first data packet sent by the terminal device, where the at least one transmission occasion is the transmission occasion in the K transmission occasions that is used by the terminal device to send the first data packet, and the at least one transmission occasion not include the second transmission occasion. In other words, the transmission occasion on which the network device receives the first data packet sent by the terminal device does not include the second transmission occasion.

Figure 8:
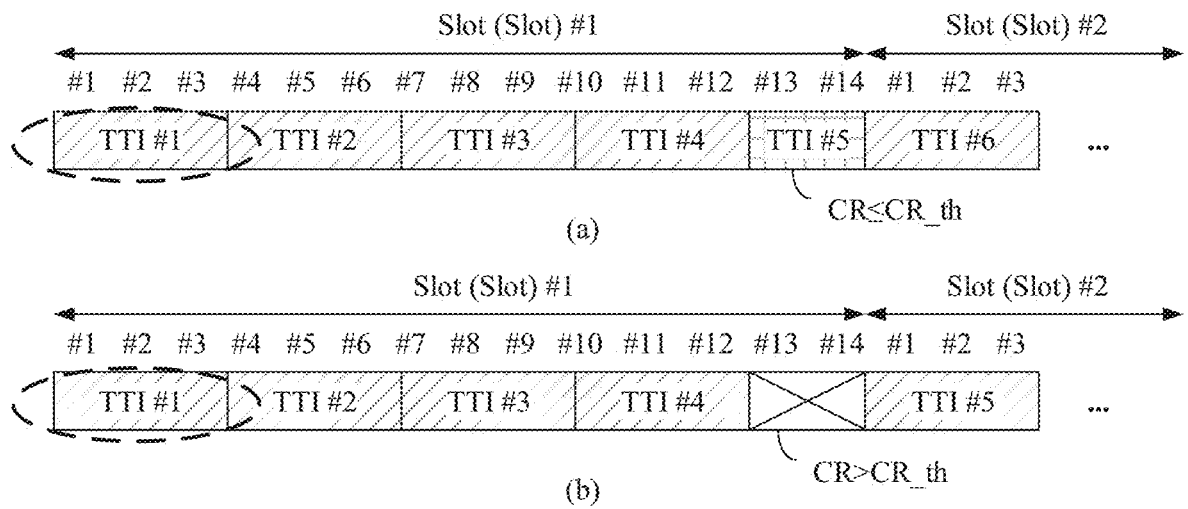
FIG. 8 is a schematic diagram of determining whether to drop a second transmission occasion according to an embodiment of this application.

For example, referring to FIG. 8, a start symbol of the K transmission occasions is a symbol #1 in a slot #1, and the time domain resource length that is of one transmission occasion and that is notified by the network device is three symbols. In this case, a gap of two symbols is left after the first four transmission occasions and before a slot boundary. The terminal device may use the two symbols as a short transmission occasion, namely, the second transmission occasion, and a quantity of valid REs in the short transmission occasion is less than a quantity of valid REs in another transmission occasion, for example, the first transmission occasion corresponding to a TTI #1. In this case, the first reference TBS (namely, the TBS of the first data packet) is calculated based on the quantity of valid REs included in the first transmission occasion. If the corresponding first code rate when the first reference TBS is carried on the second transmission occasion corresponding to a TTI #5 does not exceed the code rate threshold (namely, CR≤CR_th), as shown in (a) in FIG. 8, the first data packet may be carried and sent in the TTI #5. If the corresponding first code rate when the first reference TBS is carried on the second transmission occasion corresponding to a TTI #5 exceeds the code rate threshold (namely, CR>CR_th), as shown in (b) in FIG. 8, the second transmission occasion corresponding to the TTI #5 is dropped, and is not used for data sending.

It should be noted that: (1) The term "drop" in this embodiment of this application may also be referred to as "stop", "cancel", "omit", or "interrupt".

(2) That the terminal device drops the second transmission occasion when sending the first data packet may alternatively be described as follows: The transmission occasion in the K transmission occasions that is used by the terminal device to send the first data packet does not include the second transmission occasion. In other words, the terminal device sends the first data packet on the at least one of the K transmission occasions, where the at least one transmission occasion is the transmission occasion in the K transmission occasions that is used by the terminal device to send the first data packet, and the at least one transmission occasion does not include the second transmission occasion. In other words, the transmission occasion in the K transmission occasions that is used by the terminal device to send the first data packet does not include the second transmission occasion.

(3) That the first reference TBS is the TBS calculated based on the quantity of valid REs included in the first transmission occasion may alternatively be described as that the first reference TBS is a TBS corresponding to the quantity of valid REs included in the first transmission occasion, or described as that the first reference TBS is a TBS corresponding to the quantity of valid REs included in the first transmission occasion and the MCS notified by using the control information. The MCS notified by using the control information is also referred to as a modulation order and a code rate that are notified by using the control information, and the modulation order and the code rate that are notified by using the control information may alternatively be described as a modulation order notified by using the control information and a code rate notified by using the control information. For example, a UL grant for scheduling K data transmissions includes a bit field indicating an MCS to be used by the terminal device to send information on a PUSCH.

(4) That the first reference TBS is the TBS calculated based on the quantity of valid REs included in the first transmission occasion may mean that the first reference TBS is a TBS calculated based on the quantity of valid REs included in the first transmission occasion, and the modulation order and the code rate that are notified by using the control information. Specifically, the first reference TBS may be obtained by multiplying the quantity of valid REs included in the first transmission occasion by a quantity of system information bits on each valid RE. The quantity of system information bits on each valid RE is obtained by multiplying the modulation order notified by using the control information by the code rate notified by using the control information. For example, if the quantity of valid REs in the first transmission occasion is $N\_1$, the modulation order notified by using the control information is Q, and the code rate notified by using the control information is R, the first reference TBS may be obtained according to $N\_1*Q*R$.

(5) The modulation order notified by using the control information is a modulation order corresponding to the MCS notified by using the control information, and the code rate notified by using the control information is a code rate corresponding to the MCS notified by using the control information. The MCS notified by using the control information is an MCS for one of the K transmission occasions, for example, an MCS for the $1^{st}$ transmission occasion in the K transmission occasions or an MCS for any one of the K transmission occasions. The modulation order in this embodiment of this application is a quantity of bits (not modulated) included in each modulation symbol. For example, when a modulation scheme is quadrature phase shift keying (QPSK), the modulation order=2. When a modulation scheme is 16 quadrature amplitude modulation (QAM), the modulation order is 4. When a modulation scheme is 64QAM, the modulation order=6. When a modulation scheme is 256QAM, the modulation order=8.

(6) The code rate threshold is predefined, for example, specified in a protocol or a regulation. Alternatively, the code rate threshold is determined by the network device and notified to the terminal device, for example, is configured by the network device for the terminal device by using higher layer signaling. In a possible implementation, the code rate threshold is a code rate corresponding to a predefined highest-level MCS that can be used for transmission on a transmission occasion. Specifically, "predefined" herein is "predefined in a standard protocol or regulation". For example, the code rate threshold is a code rate corresponding to an MCS with a largest index number (for example, an index number I_MCS=27) in an MCS table in the 3GPP protocol 38.214. For example, the code rate threshold is 948/1024 or 772/1024. In another possible implementation, the code rate threshold is a highest code rate that can be used when no system information bit is lost in a transmission process on a transmission occasion. For example, the code rate threshold is 1, 4/3 (namely, 1.33), or 22/17 (namely, 1.29).

(7) The first code rate of the first reference TBS carried on the second transmission occasion is specifically a code rate of the first reference TBS carried on the second transmission occasion and using the modulation order notified by using the control information. That is, although the first code rate is different from the code rate notified by using the control information, a modulation order used when the first code rate is calculated is still the modulation order notified by using the control information. For example, if the quantity of valid REs on the second transmission occasion is $N\_2$, the first reference TBS is T bits, and the modulation order notified by using the control information is Q, the first code rate is $T/(Q*N\_2)$. Further, because the first reference TBS is determined based on the modulation order Q notified by using the control information, the code rate notified by using the control information, and the quantity $N\_1$ of valid REs in the first transmission occasion, and $N\_2$ is less than $N\_1$, the first code rate is higher than the code rate notified by using the control information.

"A code rate (for example, the first code rate or a second code rate) corresponding to a TBS (for example, the first reference TBS or a second reference TBS) carried on a transmission occasion (for example, the second transmission occasion, the first transmission occasion, a first candidate transmission occasion, or a second candidate transmission occasion)" in this embodiment of this application may alternatively be described as the code rate of a data packet that corresponds to the TBS and that is carried on the transmission occasion, for example, the first code rate of a data packet that corresponds to the first reference TBS and that is carried on the second transmission occasion. The data packet corresponding to the first reference TBS may be the first data packet, or may not be an actually generated data packet, but is used to calculate the first code rate.

Alternatively, "a code rate (for example, the first code rate or a second code rate) corresponding to a TBS (for example, the first reference TBS or a second reference TBS) carried on a transmission occasion (for example, the second transmission occasion, the first transmission occasion, a first candidate transmission occasion, or a second candidate transmission occasion)" may alternatively be described as the code rate of the TBS applying to the transmission occasion.

(8) That the first code rate is greater than the code rate threshold may alternatively be described as that the first code rate is not less than the code rate threshold. That the first code rate is not greater than the code rate threshold may alternatively be described as that the first code rate is less than the code rate threshold.

Solution 2: Send Only a Part of Information of the First Data Packet on the Second Transmission Occasion.

If the first code rate of the first reference TBS carried on the second transmission occasion is greater than the code rate threshold, that the terminal device performs data transmission on the first data packet on at least one of the K transmission occasions includes: The terminal device performs data transmission on a part of information of the first data packet on the second transmission occasion by using a modulation order notified by using the control information. Further, the terminal device performs data transmission on the part of information of the first data packet on the second transmission occasion by using the first code rate. That is, to ensure transmission performance, even if the first code rate exceeds the code rate threshold, the terminal device still includes the first data packet on the second transmission occasion. Because the quantity of valid REs in the second transmission occasion cannot carry all encoded information of the first data packet, when mapping the information of the first data packet to the second transmission occasion, the terminal device drops a part of information. Considering a case in which the first data packet is repeatedly transmitted for a plurality of times, even if independent-decoding performance of the second transmission occasion is poor, the second transmission occasion may be combined with information transmitted on another transmission occasion, and then decoded, to help improve the decoding performance.

Correspondingly, the network device receives, on the second transmission occasion, the part of information that is of the first data packet and that is sent by the terminal device by using the modulation order notified by using the control information.

Specifically, in an example, the part of information of the first data packet may be a part of the encoded information of the first data packet, and the other part of the encoded information of the first data packet is not carried on (or mapped to) the second transmission occasion. More specifically, the encoded information of the first data packet is encoded information obtained after the first data packet is encoded based on the code rate notified by using the control information. For example, the TBS that corresponds to the first data packet and that is calculated based on the first transmission occasion is excessively large, and a quantity of encoded bits that corresponds to the code rate threshold plus a quantity of information bits of the TBS exceeds a quantity of (encoded) bits that can be carried on a resource of the second transmission occasion. Therefore, in a process of performing rate matching on a code block (CB), an encoded sequence that is to be actually sent may be cut from a mother code sequence ($d_0, d_1, d_2, \ldots, d_{N-1}$), and an actual code rate corresponding to the encoded sequence that is to be actually sent is greater than the code rate threshold. The actual code rate herein is a ratio of a quantity of information bits of the first data packet to a quantity of bits in the encoded sequence that is to be actually sent. It should be understood that the information bits of the first data packet are also referred to as the system information bits, and the information bits of the first data packet may include a corresponding cyclic redundancy check (CRC) bit, or may not include the corresponding CRC bit.

For example, assuming that in the rate matching process, complete encoded information (which may be referred to as a reference encoded sequence) of the first data packet is a part of sequence cut from the mother code sequence ($d_0, d_1, d_2, \ldots, d_{N-1}$) of the first data packet, the part of information of the first data packet means that a length of the encoded sequence to be actually sent on the second transmission occasion is less than that of the reference encoded sequence, in other words, the encoded sequence to be actually sent is a part of the reference encoded sequence, and the other part of the reference encoded sequence is dropped. For example, at least one bit at the end (in other words, at the tail) of the reference encoded sequence is dropped. Specifically, the complete encoded information of the first data packet corresponds to a sequence cut from the mother code sequence based on the code rate notified by using the control information (namely, the encoded information that is of the first data packet and that is mapped to or carried on the first transmission occasion), or corresponds to a sequence cut from the mother code sequence based on the code rate threshold. Specifically, the part of information of the first data packet is a part of sequence cut from the mother code sequence ($d_0, d_1, d_2, \ldots, d_{N-1}$) of the first data packet in front-to-back order starting from a start sequence number corresponding to a redundancy version (RV) corresponding to the second transmission occasion. A length of the part of sequence is less than a length of a sequence obtained through cutting based on a redundancy version corresponding to the first transmission occasion on which the first data packet is carried. For example, start sequence numbers corresponding to both the redundancy version corresponding to the first transmission occasion and the redundancy version corresponding to the second transmission occasion are n, where n is greater than or equal to 0, and n is less than or equal to N−1, a length of complete encoded information that is of the first data packet and that is obtained through cutting for the first transmission occasion is E_1, and a length of the part of information that is of the first data packet and that corresponds to the second transmission occasion is E_2, the complete encoded information of the first data packet is $d_n, d_{n+1}, d_{n+2}, \ldots, d_{E\_1\ mod(N-1)}$, and the part of information that is of the first data packet and that corresponds to the second transmission occasion is $d_n, d_{n+1}, d_{n+2}, \ldots, d_{E\_2\ mod(N-1)}$. A mod B indicates A modulo B.

In another example, the part of information of the first data packet may be a part of information of the system information bits (systematic bits) (also referred to as system information or a system information bit sequence) of the first data packet, and the other part of information of the system information bits of the first data packet is not carried on the second transmission occasion. Further, the second transmission occasion carries the part of information of the system information bits of the first data packet, and does not carry coded information bits (parity bits) of the first data packet. For example, a length of an encoded sequence to be actually sent on the second transmission occasion is less than a length of the system information bit sequence of the first data packet, in other words, the encoded sequence to be actually sent on the second transmission occasion is a part of information of the system information bit sequence of the first data packet, and the other part of information of the system information bit sequence of the first data packet is dropped. Optionally, at least one bit at the end (in other words, at the tail) of the system information bit sequence of the first data packet is dropped, in other words, the part of information that is of the system information bit sequence of the first data packet and that is carried on the second transmission occasion is a part that is of the system information bit sequence and that is obtained through cutting in front-to-back order starting from the first sequence number of the system information bit sequence. For example, if the system information bit sequence of the first data packet is $c_0, c_1, c_2, c_3, \ldots, c_{K'-1}$ (K' represents the length of the system information bit sequence or a TBS size), the sequence carried on the second transmission occasion is $c_0, c_1, c_2, c_3, \ldots, c_{K'-X-1}$, where X is a positive integer less than K. Optionally, at least one bit at the beginning (in other words, at the head) of the system information bit sequence of the first data packet is dropped, in other words, the part of information that is of the system information bit sequence of the first data packet and that is carried on the second transmission occasion is obtained through cutting in front-to-back order starting from an $X^{th}$ sequence number of the system information bit sequence to the last sequence number of the system information bit sequence. For example, if the system information bit sequence of the first data packet is $c_0, c_1, c_2, c_3, \ldots, c_{K'-1}$, the sequence carried on the second transmission occasion is $c_0, c_1, c_2, c_3, \ldots, c_{K'-1}$.

Figure 9:
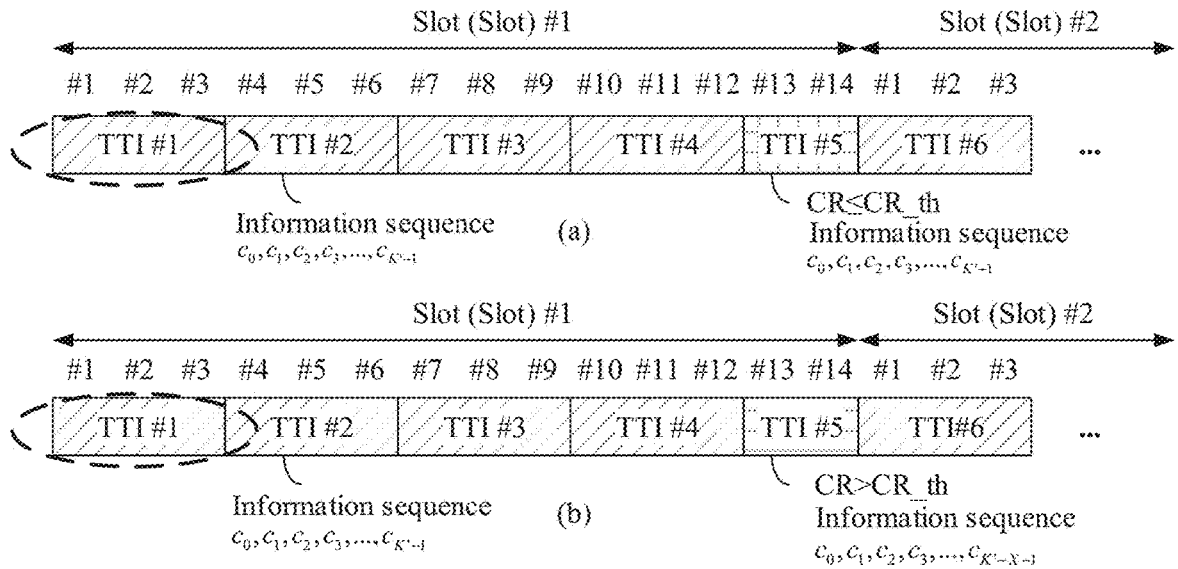
FIG. 9 is a schematic diagram of determining whether to send a part of information of a first data packet on a second transmission occasion according to an embodiment of this application.

For example, as shown in FIG. 9, a start symbol of the K transmission occasions is a symbol #1 in a slot #1, and the time domain resource length that is of one transmission occasion and that is notified by the network device is three symbols. In this case, a gap of two symbols is left after the first four transmission occasions and before a slot boundary. The terminal device may use the two symbols as a short transmission occasion, namely, the second transmission occasion, and a quantity of valid REs in the short transmission occasion is less than a quantity of valid REs in another transmission occasion, for example, the first transmission occasion corresponding to a TTI #1. In this case, the first reference TBS (namely, the TBS of the first data packet) is calculated based on the quantity of valid REs included in the first transmission occasion, and a corresponding system information bit sequence is $c_0, c_1, c_2, c_3, \ldots, c_{K'-1}$, including K' bits. If the first code rate of the first reference TBS carried on the second transmission occasion corresponding to a TTI #5 does not exceed the code rate threshold, as shown in (a) in FIG. 9, the complete system information bit sequence of the first data packet may be carried and sent on the second transmission occasion corresponding to the TTI #5. If the first code rate of the first reference TBS carried on the second transmission occasion corresponding to a TTI #5 exceeds the code rate threshold, as shown in (b) in FIG. 9, K'-X bits (namely, a sequence $c_0, c_1, c_2, c_3, \ldots, c_{K'-X-1}$) in the system information bit sequence of the first data packet are carried and sent on the second transmission occasion corresponding to the TTI #5, and information of the other X bits is dropped, that is, is not mapped to the second transmission occasion.

Solution 3: Increase a Modulation Order of the Second Transmission Occasion.

On the one hand, in an example, if the first code rate of the first reference TBS carried on the second transmission occasion is greater than the code rate threshold, and a modified code rate is not greater than the code rate threshold, the terminal device performs data transmission on the first data packet on the second transmission occasion by using a modified modulation order and the modified code rate. In addition, the terminal device performs data transmission on the first data packet on the first transmission occasion by using a modulation order and a code rate that are notified by using the control information. The modified code rate is a code rate of the first reference TBS carried on the second transmission occasion and using the modified modulation order, and the modified modulation order is higher than the modulation order notified by using the control information.

Correspondingly, the network device receives, on the second transmission occasion, the first data packet sent by the terminal device by using the modified modulation order and the modified code rate; and/or the network device receives, on the first transmission occasion, the first data packet sent by the terminal device by using the modulation order and the code rate that are notified by using the control information.

In another example, if the first code rate of the first reference TBS carried on the second transmission occasion is greater than the code rate threshold, the terminal device performs data transmission on the first data packet on the second transmission occasion by using a modified modulation order and a modified code rate. In addition, the terminal device performs data transmission on the first data packet on the first transmission occasion by using a modulation order and a code rate that are notified by using the control information. In other words, if the first code rate of the first reference TBS carried on the second transmission occasion is greater than the code rate threshold, the terminal device may directly send the first data packet on the second transmission occasion by using the modified modulation order and the modified code rate.

Correspondingly, the network device receives, on the second transmission occasion, the first data packet sent by the terminal device by using the modified modulation order and the modified code rate; and/or the network device receives, on the first transmission occasion, the first data packet sent by the terminal device by using the modulation order and the code rate that are notified by using the control information.

In still another example, if the first code rate of the first reference TBS carried on the second transmission occasion is not greater than the code rate threshold, the terminal device sends the first data packet on the second transmission occasion by using the first code rate and a modulation order that is notified by using the control information. In addition, the terminal device sends the first data packet on the first transmission occasion by using the modulation order and a code rate that are notified by using the control information.

Correspondingly, the network device receives, on the second transmission occasion, the first data packet sent by the terminal device by using the first code rate and the modulation order that is notified by using the control information; and/or the network device receives, on the first transmission occasion, the first data packet sent by the terminal device by using the modulation order and the code rate that are notified by using the control information.

Specifically, it is considered that directly determining the first code rate of the second transmission occasion based on the first reference TBS and the modulation order that is notified by using the control information may cause the first code rate to exceed the code rate threshold, and consequently case performance deterioration when the first data packet is transmitted on the second transmission occasion. To avoid an excessively high code rate, the terminal device may increase the modulation order of the second transmission occasion (referred to as the modified modulation order, which is higher than the modulation order notified by using the control information) when including the first data packet on the second transmission occasion. In this way, the corresponding code rate is decreased, and a decreased code rate (referred to as the modified code rate) may not exceed the code rate threshold, so that a relatively large first reference TBS may also be carried on the second transmission occasion, to achieve a balance between the transmission efficiency and reliability.

For example, if the modulation order notified by using the control information is 2, the code rate threshold is 1, and the first code rate of the first reference TBS carried on the second transmission occasion is 1.2 and exceeds the code rate threshold, the terminal device may increase the modulation order by one level to 4, namely, the modified modulation order. In this case, because the modulation order is increased, the corresponding code rate is decreased. When the first reference TBS is carried on the second transmission occasion and the modulation order is 4, the corresponding code rate is decreased to 0.6 and does not exceed the code rate threshold. Therefore, the first reference TBS can be carried on the second transmission occasion, with acceptable performance. That is, the terminal device sends the first data packet on the second transmission occasion by using the modified modulation order and the modified code rate, where the modified code rate is the code rate of the TBS that corresponds to the first data packet and that is carried on the second transmission occasion and uses the modified modulation order, and the modified modulation order is higher than the modulation order notified by using the control information. Herein, that the modified modulation order is higher than the modulation order notified by using the control information may alternatively be described as: The terminal device determines the modified modulation order to be used to send the first data packet on the second transmission occasion, where the modified modulation order is higher than the modulation order notified by using the control information.

On the other hand, if the first code rate of the first reference TBS carried on the second transmission occasion is greater than the code rate threshold, and a modified code rate is greater than the code rate threshold, that the terminal device performs data transmission on the first data packet on at least one of the K transmission occasions includes: The terminal device drops the second transmission occasion when performing data transmission on the first data packet; or the terminal device performs data transmission on a part of information of the first data packet on the second transmission occasion by using a modified modulation order and the modified code rate, where the modified code rate is a code rate of the first reference TBS carried on the second transmission occasion and using the modified modulation order, and the modified modulation order is higher than a modulation order notified by using the control information. The part of information of the first data packet is a part of encoded information of the first data packet, or the part of information of the first data packet is a part of information of the system information bits of the first data packet. For details, refer to the foregoing descriptions. In other words, if the code rate of the first reference TBS carried on the second transmission occasion still exceeds the code rate threshold after the modulation order is increased, the second transmission occasion is dropped, or only the part of information of the first data packet is transmitted on the second transmission occasion. In addition, the terminal device performs data transmission on the first data packet on the first transmission occasion by using the modulation order and a code rate that are notified by using the control information.

Correspondingly, the transmission occasion on which the network device receives the first data packet sent by the terminal device does not include the second transmission occasion, or the network device receives, on the second transmission occasion, the part of information that is of the first data packet and that is sent by the terminal device by using the modified modulation order and the modified code rate; and/or the network device receives, on the first transmission occasion, the first data packet sent by the terminal device by using the modulation order and the code rate that are notified by using the control information.

It should be noted that, that the modified code rate is not greater than the code rate threshold may alternatively be described as that the modified code rate is less than the code rate threshold. That the modified code rate is greater than the code rate threshold may alternatively be described as that the modified code rate is not less than the code rate threshold.

The modified modulation order in this embodiment of this application is specifically described herein.

The modified modulation order in this embodiment of this application may be a modulation order determined based on the modulation order notified by using the control information. Further, the modified modulation order determined by the terminal device is one or two levels higher than the modulation order notified by using the control information. For example, if the modulation order notified by using the control information is 2, the modified modulation order is 4 or 6. Alternatively, if the modulation order notified by using the control information is 4, the modified modulation order is 6. Optionally, the modified modulation order is a lowest modulation order that can enable the modified code rate to be not greater than the code rate threshold. Optionally, the modified modulation order is not higher than a modulation order corresponding to a predefined highest-level MCS that can be used for data information transmission, and for example, the modulation order is 6 or 8. That is, if a corresponding modified code rate still exceeds the code rate threshold when the modified modulation order has reached a highest available modulation order, the second transmission occasion is dropped, or only a part of information of the first data packet is transmitted on the second transmission occasion, or the second transmission occasion is determined as the target transmission occasion (refer to the following descriptions).

For example, the modified modulation order may be determined in the following manner: Increase the modulation order level by level starting from the modulation order notified by using the control information, until a code rate of the first reference TBS carried on the second transmission occasion and using an adjusted modulation order is not greater than the code rate threshold. In this case, the adjusted modulation order is the modified modulation order. That is, if a code rate of the first reference TBS carried on the second transmission occasion and using an adjusted modulation order is still greater than the code rate threshold, the modulation order continues to be increased level by level. In addition, if a code rate of the first reference TBS carried on the second transmission occasion and using an adjusted modulation order is still greater than the code rate threshold when the adjusted modulation order has reached the highest available modulation order, the highest available modulation order is the modified modulation order. "Increase level by level" herein means that an increased modulation order is one level higher than a modulation order not increased, and "increase by one level" herein means an increase to a next modulation order that is higher in an available MCS table defined in the standard protocol (36.214). For example, the modulation order is increased from 2 to 4, from 4 to 6, or from 6 to 8.

It should be noted that only three possible methods are described as examples in the foregoing embodiment, and this embodiment of this application may further include another method, for example, a method 4:

The terminal device determines a time domain resource (for example, a time domain resource start point and a time domain resource length) or a quantity of valid REs that corresponds to each of the K transmission occasions, and may determine the target quantity of valid REs based on the time domain resource length or the quantity of valid REs of each of the K transmission occasions. Specifically, the K transmission occasions correspond to at least two time domain resource lengths, and the target transmission occasion determined by the terminal device corresponds to a target time domain resource length, where the target time domain resource length is a time domain resource length corresponding to a largest quantity of transmission occasions with a same time domain resource length in the K transmission occasions. Alternatively, the K transmission occasions correspond to at least two quantities of valid REs, and the target transmission occasion determined by the terminal device corresponds to the target quantity of valid REs, where the target quantity of valid REs is a quantity of valid REs that corresponds to a largest quantity of transmission occasions with a same quantity of valid REs in the K transmission occasions. For example, as shown in (a) in FIG. 4, a time domain resource length of the transmission occasion corresponding to the TTI #5 is two symbols, and a time domain resource length of the transmission occasion corresponding to the TTI #1 (or the TTI #2, the TTI #3, the TTI #4, or the TTI #6) is three symbols. Because a quantity of transmission occasions whose time domain resource lengths are three symbols is larger, any transmission occasion (the transmission occasion corresponding to the TTI #1, the TTI #2, the TTI #3, the TTI #4, or the TTI #6) whose time domain resource length is three symbols may be determined as the target transmission occasion, and the target quantity of valid REs is further determined.

In another embodiment, it is considered that when the first transmission occasion including a larger quantity of valid REs is used to calculate the TBS corresponding to the data packet, if resources included in the first transmission occasion and the second transmission occasion have a relatively great difference, the calculated TBS may be too large to be carried on the second transmission occasion, or may cause deterioration of transmission performance of the second transmission occasion. Specifically, this is embodied as: The first code rate obtained after the TBS calculated based on the first transmission occasion is carried on the second transmission occasion is excessively large, and for example, exceeds the code rate threshold, and consequently, the system information bits are lost. In this case, calculating the TBS by using the second transmission occasion can avoid deterioration of reliability. Conversely, if the TBS calculated based on the first transmission occasion is moderate, and the code rate obtained after the TBS calculated based on the first transmission occasion is carried on the second transmission occasion is not excessively large and the second transmission occasion can be correctly decoded by the network device with relatively high probability, although the code rate is greater than a code rate of the TBS carried on the first transmission occasion, calculating the TBS by using the first transmission occasion can improve transmission efficiency without great deterioration of reliability. Therefore, the target transmission occasion may be determined based on a relationship between the first code rate and the code rate threshold, or whether the TBS is calculated by using the quantity of valid REs included in the first transmission occasion (the method 3) or by using the quantity of valid REs included in the second transmission occasion (the method 2) may be adaptively determined based on the first code rate.

Specifically, on the one hand, if the first code rate of the first reference TBS carried on the second transmission occasion is greater than the code rate threshold, the target transmission occasion is the second transmission occasion. This may be understood as adaptively determining to use the method 2.

Further, when the target transmission occasion is the second transmission occasion, that the terminal device performs data transmission on the first data packet on at least one of the K transmission occasions includes: The terminal device performs data transmission on the first data packet on the first transmission occasion by using a second code rate and the modulation order that is notified by using the control information. In addition, the terminal device performs data transmission on the first data packet on the second transmission occasion by using the modulation order and the code rate that are notified by using the control information. The second code rate is a code rate of a TBS that is of the first data packet (namely, a TBS calculated based on the quantity of valid REs in the second transmission occasion) and that is carried on the first transmission occasion and uses the modulation order notified by using the control information. Further, the second code rate is lower than the code rate notified by using the control information.

Correspondingly, the network device receives, on the first transmission occasion, the first data packet sent by the terminal device by using the second code rate and the modulation order that is notified by using the control information; and/or the network device receives, on the second transmission occasion, the first data packet sent by the terminal device by using the modulation order and the code rate that are notified by using the control information.

On the other hand, if the first code rate of the first reference TBS carried on the second transmission occasion is not greater than the code rate threshold, the target transmission occasion is the first transmission occasion. This may be understood as adaptively determining to use the method 3.

It should be noted that if the target transmission occasion is the first transmission occasion, the first reference TBS is equal to a TBS corresponding to a case in which the terminal device actually sends the first data packet on the K transmission occasions.

Further, when the target transmission occasion is the first transmission occasion, that the terminal device performs data transmission on the first data packet on at least one of the K transmission occasions includes: The terminal device performs data transmission on the first data packet on the second transmission occasion by using the first code rate and the modulation order that is notified by using the control information. In addition, the terminal device performs data transmission on the first data packet on the first transmission occasion by using the modulation order and the code rate that are notified by using the control information.

Correspondingly, the network device receives, on the second transmission occasion, the first data packet sent by the terminal device by using the first code rate and the modulation order that is notified by using the control information; and/or the network device receives, on the first transmission occasion, the first data packet sent by the terminal device by using the modulation order and the code rate that are notified by using the control information.

Figure 10:
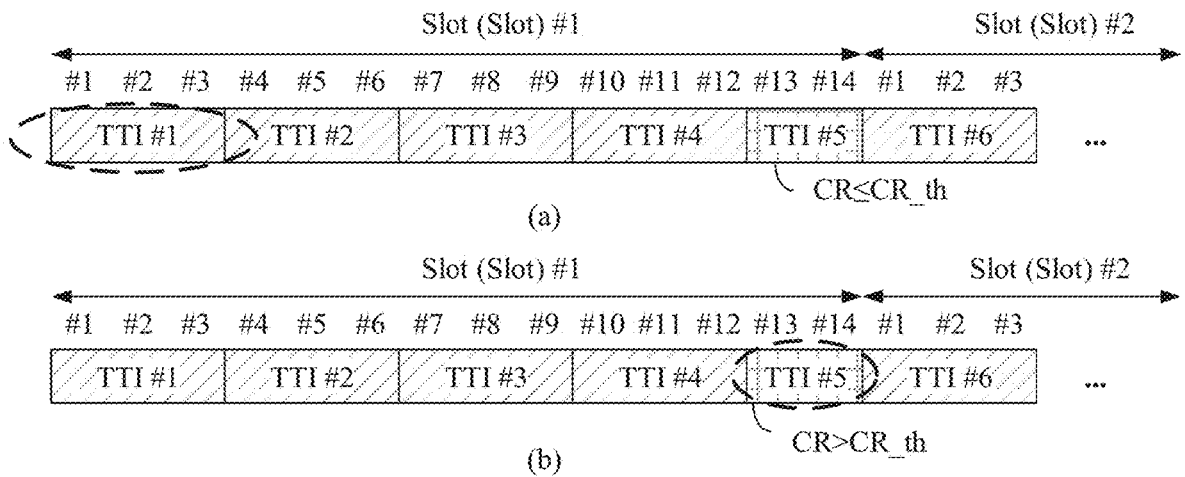
FIG. 10 is a schematic diagram of determining a first transmission occasion or a second transmission occasion as a target transmission occasion according to an embodiment of this application.

For example, as shown in FIG. 10, a start symbol of the K transmission occasions is a symbol #1 in a slot #1, and the time domain resource length that is of one transmission occasion and that is notified by the network device is three symbols. In this case, a gap of two symbols is left after the first four transmission occasions and before a slot boundary. The terminal device may use the two symbols as a short transmission occasion, namely, the second transmission occasion, and a quantity of valid REs included in the short transmission occasion is less than a quantity of valid REs included in another transmission occasion, for example, the first transmission occasion corresponding to a TTI #1. If a corresponding code rate when the first reference TBS calculated based on the quantity of valid REs included in the first transmission occasion is carried on the second transmission occasion corresponding to a TTI #5 does not exceed the code rate threshold, as shown in (a) in FIG. 10, the first transmission occasion may be used as the target transmission occasion, and the first data packet is carried and sent on the second transmission occasion corresponding to the TTI #5. In this case, the TBS corresponding to the first data packet is the first reference TBS. If a corresponding code rate when the first reference TBS is carried on the second transmission occasion corresponding to a TTI #5 exceeds the code rate threshold, as shown in (b) in FIG. 10, the second transmission occasion may be used as the target transmission occasion to calculate the TBS corresponding to the first data packet. In this case, a corresponding code rate when the first data packet is carried on the first transmission occasion is lower than the code rate notified by using the control information.

In still another embodiment, in addition to adaptively determining the target transmission occasion based on the relationship between the first code rate and the code rate threshold, the terminal device may further adaptively increase the modulation order for the second transmission occasion (to enable the modulation order to be higher than the modulation order notified by using the control information), to decrease the code rate for the second transmission occasion, so that a relatively large TBS may also be carried on the second transmission occasion (in this case, the target transmission occasion is the first transmission occasion). If the code rate of the first reference TBS carried on the second transmission occasion still exceeds the code rate threshold after the modulation order is increased, the target transmission occasion is the second transmission occasion.

Specifically, on the one hand, if the first code rate of the first reference TBS carried on the second transmission occasion is greater than the code rate threshold, and a modified code rate is greater than the code rate threshold, the target transmission occasion is the second transmission occasion. This may be understood as adaptively determining to use the method 2. The modified code rate is a code rate of the first reference TBS carried on the second transmission occasion and using a modified modulation order, and the modified modulation order is higher than the modulation order notified by using the control information.

Further, when the target transmission occasion is the second transmission occasion, that the terminal device performs data transmission on the first data packet on at least one of the K transmission occasions includes: The terminal device performs data transmission on the first data packet on the first transmission occasion by using a second code rate and the modulation order that is notified by using the control information. In addition, the terminal device performs data transmission on the first data packet on the second transmission occasion by using the modulation order and the code rate that are notified by using the control information. Correspondingly, the network device receives, on the first transmission occasion, the first data packet sent by the terminal device by using the second code rate and the modulation order that is notified by using the control information; and/or the network device receives, on the second transmission occasion, the first data packet sent by the terminal device by using the modulation order and the code rate that are notified by using the control information.

On the other hand, if the first code rate of the first reference TBS carried on the second transmission occasion is greater than the code rate threshold, and a modified code rate is not greater than the code rate threshold, the target transmission occasion is the first transmission occasion. This may be understood as adaptively determining to use the method 3. The modified code rate is a code rate of the first reference TBS carried on the second transmission occasion and using a modified modulation order, and the modified modulation order is higher than the modulation order notified by using the control information.

Further, when the target transmission occasion is the first transmission occasion, that the terminal device performs data transmission on the first data packet on at least one of the K transmission occasions includes: The terminal device performs data transmission on the first data packet on the second transmission occasion by using the modified modulation order and the modified code rate. In addition, the terminal device performs data transmission on the first data packet on the first transmission occasion by using the modulation order and the code rate that are notified by using the control information. It should be understood that, that the modified modulation order is higher than the modulation order notified by using the control information may alternatively be described as: The modified modulation order is higher than a modulation order corresponding to the first transmission occasion. In other words, the modified modulation order used by the terminal device to send the first data packet on the second transmission occasion is higher than the modulation order used by the terminal device to send the first data packet on the first transmission occasion. Correspondingly, the network device receives, on the second transmission occasion, the first data packet sent by the terminal device by using the modified modulation order and the modified code rate; and/or the network device receives, on the first transmission occasion, the first data packet sent by the terminal device by using the modulation order and the code rate that are notified by using the control information.

It can be learned from the foregoing descriptions that, in all the scenario 1 to the scenario 3, quantities of valid REs included in at least two of the K transmission occasions may be different. The following specifically describes, with reference to the scenario 1 to the scenario 3, a case in which the quantity of valid REs included in the first transmission occasion is greater than the quantity of valid REs included in the second transmission occasion.

(1) In correspondence to the scenario 1, one of the first transmission occasion and the second transmission occasion includes a DMRS, and the other transmission occasion does not include a DMRS. In other words, in the scenario 1, the K transmission occasions include at least one transmission occasion that includes a DMRS and at least one transmission occasion that does not include a DMRS.

In an example, the second transmission occasion is the transmission occasion that includes a DMRS, and the first transmission occasion is the transmission occasion that does not include a DMRS. The target transmission occasion is the transmission occasion in the K transmission occasions that includes a DMRS. For example, as shown in (a) or (b) in FIG. 3, a quantity of valid REs in the transmission occasion that does not include a DMRS is greater than a quantity of valid REs in the transmission occasion that includes a DMRS.

Further, a quantity of time domain symbols in the first transmission occasion is the same as that in the second transmission occasion.

Still further, the quantities of time domain symbols in the first transmission occasion and the second transmission occasion are equal to a quantity of time domain symbols that corresponds to one transmission occasion and that is notified by using the control information.

In another example, the second transmission occasion is the transmission occasion that does not include a DMRS, and the first transmission occasion is the transmission occasion that includes a DMRS. In other words, the target transmission occasion is the transmission occasion in the K transmission occasions that does not include a DMRS. For example, as shown in (c) in FIG. 3, a quantity of valid REs in the transmission occasion that includes a DMRS is greater than a quantity of valid REs in the transmission occasion that does not include a DMRS.

Further, a length of a time domain resource that is not used to carry the DMRS and that is in the first transmission occasion is equal to a length of a time domain resource that is not used to carry a DMRS and that is in the second transmission occasion. The length of the time domain resource not used to carry the DMRS specifically refers to a quantity of time domain symbols used to carry the DMRS (namely, symbols used to carry other uplink information instead of the DMRS), which is also referred to as a quantity of non-DMRS time domain symbols. In other words, a quantity of non-DMRS symbols in the first transmission occasion is the same as that in the second transmission occasion.

Further, the quantities of non-DMRS symbols in the first transmission occasion and the second transmission occasion are equal to a quantity of time domain symbols that is of one transmission occasion and that is notified by using the control information.

Still further, a time domain symbol that carries the DMRS and that is in the first transmission occasion is further used to carry data information, in other words, a part of data information carried on the first transmission occasion and the DMRS on the first transmission occasion are multiplexed on the time domain symbol, for example, in an FDM manner, in other words, the time domain symbol that carries the DMRS and that is in the first transmission occasion further includes a valid RE. The data information carried on the time domain symbol is a part of information of the first data packet. For example, a DMRS and data information are multiplexed on a symbol #1 in (c) in FIG. 3 in an FDM manner. Therefore, compared with the TTI #2 (the second transmission occasion), the TI #1 (the first transmission occasion) additionally has a part of valid REs, namely, an RE that is on the symbol #1 and that is used to carry the data information.

In still another example, a quantity of non-DMRS symbols in the first transmission occasion is greater than a quantity of non-DMRS symbols in the second transmission occasion.

(2) In correspondence to the scenario 2, the time domain resource length of the first transmission occasion is greater than the time domain resource length of the second transmission occasion.

In an embodiment, an orphan symbol may independently form a short transmission occasion, or may form a long transmission occasion together with a previous time domain resource. The following separately provides specific descriptions with reference to the following two examples.

In an example (referred to as an example 1), the control information is further used to notify the time domain resource length of one of the K transmission occasions, and the time domain resource length of the second transmission occasion is the time domain resource length that is of one transmission occasion and that is notified by using the control information. The first transmission occasion is the last transmission occasion in the K transmission occasions that is in a first slot, and a time interval between a start moment of the first transmission occasion and an end boundary of the first slot is greater than the time domain resource length that is of one transmission occasion and that is notified by using the control information. This may be understood as: An orphan symbol forms a long transmission occasion together with a previous time domain resource. The first slot is a slot in which the first transmission occasion is located.

Figure 4:
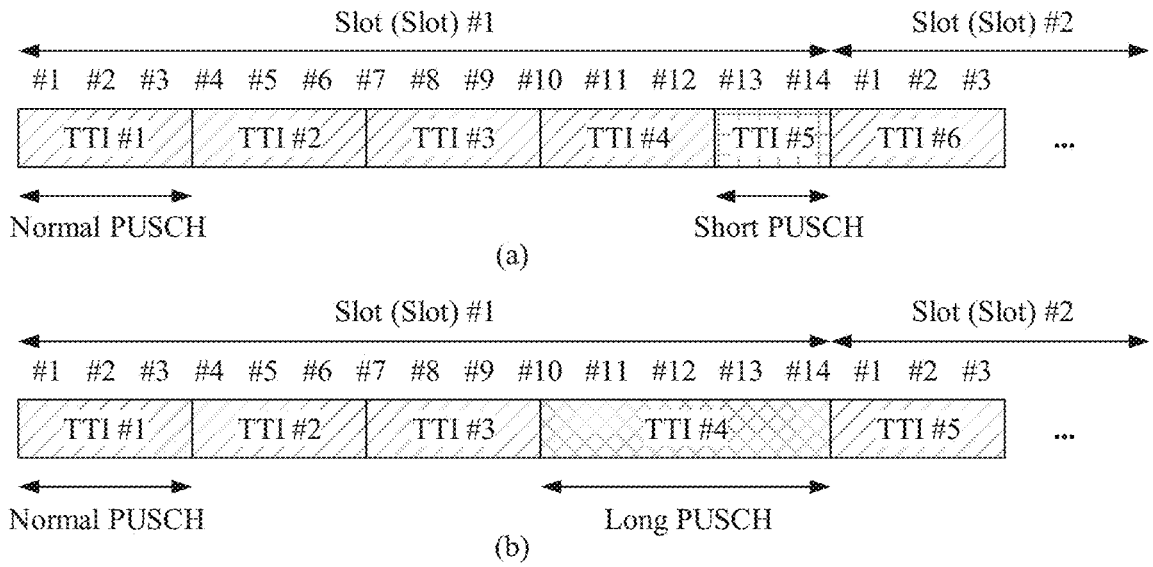
FIG. 4 is a schematic diagram of a scenario 2 according to an embodiment of this application.

For example, as shown in (b) in FIG. 4, the time domain resource length that is of one transmission occasion and that is notified by using the control information is three symbols, and the start moment is the 1$^{st}$ symbol of a slot #1 (namely, the first slot). Transmission occasions corresponding to the TTI #1 to the TTI #3 and the TTI #5 that is of a slot #2 (where any one of the transmission occasions is the second transmission occasion) all have a length of three symbols, and may be understood as normal transmission occasions. In this case, a symbol #13 and a symbol #14 are orphan, and the two orphan symbols and the previous TTI #4 formed by three symbols carry a long transmission occasion of five symbols, namely, the first transmission occasion.

Further, an end moment of the first transmission occasion is equal to the end boundary of the first slot.

Further, the time interval between the start moment of the first transmission occasion and the end boundary of the first slot is less than twice the time domain resource length that is of one transmission occasion and that is notified by using the control information. That is, if a time domain resource between the start moment of the first transmission occasion and the end boundary of the first slot can accommodate a transmission occasion corresponding to the time domain resource length that is of one transmission occasion and that is notified by using the control information, but cannot accommodate two transmission occasions corresponding to the time domain resource length that is of one transmission occasion and that is notified by using the control information, the time domain resource between the start moment of the first transmission occasion and the end boundary of the first slot forms a long transmission occasion.

Further, if the first transmission occasion is the 1$^{th}$ transmission occasion in the K transmission occasions, the start moment of the first transmission occasion is a start moment of the K transmission occasions that is notified by using the control information, for example, a start moment determined based on a start symbol that corresponds to the SLIV field and that is notified by using the control information. If the first transmission occasion is not the 1$^{st}$ transmission occasion in the K transmission occasions, the start moment of the first transmission occasion is determined based on an end moment of a previous transmission occasion of the first transmission occasion in the K transmission occasions. For example, the start moment of the first transmission occasion is the end moment of the previous transmission occasion of the first transmission occasion in the K transmission occasions. Alternatively, the start moment of the first transmission occasion is later than the end moment of the previous transmission occasion of the first transmission occasion, and has a time offset with the end moment of the previous transmission occasion, where the time offset is configured or indicated by the network device or is predefined, or is determined based on slot boundary information or information that is about a time domain symbol not used to send the uplink data information and that is notified by the network device. For example, in the K transmission occasions, a start symbol of the 1$^{st}$ transmission occasion located in the first slot is a symbol i, and a total of J transmission occasions in the K transmission occasions are located in the first slot, where a time domain resource length of a j$^{th}$ (j=1, . . . , or J−1) transmission occasion is L_j. In this case, a start symbol of the first transmission occasion (namely, a J$^{th}$ transmission occasion) is $$i + \sum_{j=1}^{J-1} L\_j.$$

The symbol i may be a start symbol of the K data transmissions that is indicated by the SLIV field, or a start symbol of the 1$^{st}$ transmission occasion in the J transmission occasions that is in the first slot, for example, the 1$^{st}$ symbol in the first slot. Further, time domain resource lengths L_j of J−1 transmission occasions other than the first transmission occasion are the same, or quantities of non-DMRS time domain symbols included in the J−1 transmission occasions are the same.

Further, in the K transmission occasions (or the transmission occasions in the first slot that are in the K transmission occasions), a time domain resource length corresponding to a transmission occasion other than a transmission occasion (referred to as a long transmission occasion) whose time domain resource length is greater than the time domain resource length that is of one transmission occasion and that is notified by using the control information is the time domain resource length that is of one transmission occasion and that is notified by using the control information. A time interval between a start moment of the long transmission occasion and an end boundary of a slot in which the long transmission occasion is located is greater than the time domain resource length that is of one transmission occasion and that is notified by using the control information, and the long transmission occasion includes the first transmission occasion.

For example, for a transmission occasion, if a time interval between a start moment of the transmission occasion and the end boundary of the first slot is not less than twice the time domain resource length that is of one transmission occasion and that is notified by using the control information, a length of the transmission occasion is equal to the time domain resource length that is of one transmission occasion and that is notified by using the control information, and the transmission occasion is the second transmission occasion; or if a time interval between a start moment of the transmission occasion and the end boundary of the first slot is less than twice the time domain resource length that corresponds to one transmission occasion and that is notified by using the control information, and is greater than the time domain resource length that corresponds to one transmission occasion and that is notified by using the control information, a length of the transmission occasion is equal to the time interval between the start moment of the transmission occasion and the end boundary of the first slot, and the transmission occasion is the first transmission occasion.

In another example (referred to as an example 2), the control information is further used to notify the time domain resource length of one of the K transmission occasions, and the time domain resource length corresponding to the first transmission occasion is the time domain resource length that is of one transmission occasion and that is notified by using the control information. The second transmission occasion is the last transmission occasion in the K transmission occasions that is in a first slot, and a time interval between a start moment of the second transmission occasion and an end boundary of the first slot is less than the time domain resource length that is of one transmission occasion and that is notified by using the control information. This may be understood as: An orphan symbol independently forms a short transmission occasion. The first slot is a slot in which the second transmission occasion is located.

For example, as shown in (a) in FIG. 4, the time domain resource length that is of one transmission occasion and that is notified by using the control information is three symbols, and the start moment is the $1^{st}$ symbol of a slot #1 (namely, the first slot). Transmission occasions corresponding to the TTI #1 to the TTI #4 and the TTI #6 that is of a slot #2 (where any one of the transmission occasions is the first transmission occasion) all have a length of three symbols, and may be understood as normal transmission occasions. In this case, a symbol #13 and a symbol #14 are orphan, and the TTI #5 formed by the two orphan symbols carries a short transmission occasion of two symbols, namely, the second transmission occasion.

Further, an end moment of the second transmission occasion is equal to the end boundary of the first slot. That is, if a time domain resource between the start moment of the second transmission occasion and the end boundary of the first slot cannot accommodate a transmission occasion corresponding to the time domain resource length that is of one transmission occasion and that is notified by using the control information, the time domain resource between the start moment of the second transmission occasion and the end boundary of the first slot forms a short transmission occasion.

Further, if the second transmission occasion is the $1^{st}$ transmission occasion in the K transmission occasions, the start moment of the second transmission occasion is a start moment of the K transmission occasions that is notified by using the control information, for example, a start moment determined based on a start symbol that corresponds to the SLIV field and that is notified by using the control information. If the second transmission occasion is not the $1^{st}$ transmission occasion in the K transmission occasions, the start moment of the second transmission occasion is determined based on an end moment of a previous transmission occasion of the second transmission occasion in the K transmission occasions. For example, the start moment of the second transmission occasion is the end moment of the previous transmission occasion of the second transmission occasion in the K transmission occasions. Alternatively, the start moment of the second transmission occasion is later than the end moment of the previous transmission occasion of the second transmission occasion, and has a time offset with the end moment of the previous transmission occasion, where the time offset is configured or indicated by the network device or is predefined, or is determined based on slot boundary information or information that is about a time domain symbol not used to send the uplink data information and that is notified by the network device. For example, in the K transmission occasions, a start symbol of the $1^{st}$ transmission occasion located in the first slot is a symbol i', and a total of J' transmission occasions in the K transmission occasions are located in the first slot, where a time domain resource length of a $j'^{th}$ (j'=1, . . . , or J'−1) transmission occasion is L_j'. In this case, a start symbol of the second transmission occasion (namely, a $J'^{th}$ transmission occasion) is $$i' + \sum_{j'=1}^{J'-1} L\_j'.$$

The symbol i' may be a start symbol of the K data transmissions that is indicated by the SLIV field, or a start symbol of the $1^{st}$ transmission occasion in the J' transmission occasions that is in the first slot, for example, the $1^{st}$ symbol in the first slot. Further, time domain resource lengths L_j' of J'−1 transmission occasions other than the second transmission occasion are the same, or quantities of non-DMRS time domain symbols included in the J'−1 transmission occasions are the same.

Further, in the K transmission occasions (or the transmission occasions in the first slot that are in the K transmission occasions), a time domain resource length corresponding to a transmission occasion other than a transmission occasion (referred to as a short transmission occasion) whose time domain resource length is less than the time domain resource length that is of one transmission occasion and that is notified by using the control information is the time domain resource length that is of one transmission occasion and that is notified by using the control information. A time interval between a start moment of the short transmission occasion and an end boundary of a slot in which the short transmission occasion is located is less than the time domain resource length that is of one transmission occasion and that is notified by using the control information, and the short transmission occasion includes the second transmission occasion.

For example, for a transmission occasion, if a time interval between a start moment of the transmission occasion and the end boundary of the first slot is not less than the time domain resource length that corresponds to one transmission occasion and that is notified by using the control information, a length of the transmission occasion is equal to the time domain resource length that corresponds to one transmission occasion and that is notified by using the control information, and the transmission occasion is the first transmission occasion; or if a time interval between a start moment of the transmission occasion and the end boundary of the first slot is less than the time domain resource length that corresponds to one transmission occasion and that is notified by using the control information, a length of the transmission occasion is equal to the time interval between the start moment of the transmission occasion and the end boundary of the first slot, and the transmission occasion is the second transmission occasion.

In still another embodiment, the terminal device may adaptively determine whether the foregoing example 1 or example 2 is applicable to an orphan symbol, that is, adaptively determine whether the orphan symbol independently forms a short transmission occasion or forms a long transmission occasion together with a previous time domain resource.

On the one hand, if a code rate of a first reference TBS carried on a first candidate transmission occasion is not greater than (or less than) the code rate threshold, the second transmission occasion is the first candidate transmission occasion, and the target transmission occasion is the first transmission occasion. The time domain resource length corresponding to the first transmission occasion is the time domain resource length notified by using the control information, the first reference TBS is the TBS calculated based on the quantity of valid REs included in the first transmission occasion, a time interval between a start moment of the first candidate transmission occasion and the end boundary of the first slot is less than the time domain resource length notified by using the control information, and the first slot is a slot in which the first candidate transmission occasion is located. That is, assuming that the first reference TBS is calculated based on a quantity of valid REs included in a transmission occasion corresponding to the time domain resource length that is of one transmission occasion and that is notified by using the control information, if the first code rate obtained after the first reference TBS is carried on a short transmission occasion formed by an orphan time domain symbol (namely, a symbol included in the first candidate transmission occasion) is not greater than the code rate threshold, the orphan time domain symbol may form the short transmission occasion to carry the first data packet.

Alternatively, if the code rate of the first reference TBS carried on the first candidate transmission occasion is greater than (or not less than) the code rate threshold, and a modified code rate is not greater than (or less than) the code rate threshold, the second transmission occasion is the first candidate transmission occasion, and the target transmission occasion is the first transmission occasion. The modified code rate is a code rate of the first reference TBS carried on the first candidate transmission occasion and using a modified modulation order, and the modified modulation order is higher than the modulation order notified by using the control information. Determining of the modified code rate and the modified modulation order is described above, and details are not described again.

It should be understood that the first candidate transmission occasion may also be referred to as a first candidate time-frequency resource, in other words, a time-frequency resource corresponding to the first candidate transmission occasion is the first candidate time-frequency resource.

Further, an end moment of the first candidate transmission occasion is equal to the end boundary of the first slot.

It should be understood that a method for determining the start moment, a time domain resource length, and the end moment of the first candidate transmission occasion is similar to the method for determining the start moment, the time domain resource length, and the end moment of the second transmission occasion in the example 2. For example, the start moment of the first candidate transmission occasion is the start moment of the K transmission occasions that is notified by using the control information, or is determined based on an end moment of a previous transmission occasion of the first candidate transmission occasion in the K transmission occasions. Details are not described again.

It should be understood that, that a code rate of the first reference TBS carried on the first candidate transmission occasion is not greater than the code rate threshold may alternatively be described as that a code rate of the first reference TBS carried on the first candidate transmission occasion is less than the code rate threshold.

It should be understood that the code rate of the first reference TBS carried on the first candidate transmission occasion is specifically the first code rate of the first reference TBS carried on the first candidate transmission occasion and using the modulation order notified by using the control information.

On the other hand, if a code rate of the second reference TBS carried on a first candidate transmission occasion is greater than (or not less than) the code rate threshold, the first transmission occasion is a second candidate transmission occasion, the target transmission occasion is the second transmission occasion, and the time domain resource length corresponding to the second transmission occasion is the time domain resource length notified by using the control information. The second reference TBS is a TBS calculated based on the quantity of valid REs included in the second transmission occasion, a time interval between a start moment of the first candidate transmission occasion and the end boundary of the first slot is less than the time domain resource length notified by using the control information, the first slot is a slot in which the first candidate transmission occasion and the second candidate transmission occasion are located, a time-frequency resource corresponding to the second candidate transmission occasion includes a time-frequency resource corresponding to the first candidate transmission occasion, and a time interval between a start moment of the second candidate transmission occasion and the end boundary of the first slot is greater than the time domain resource length notified by using the control information. That is, assuming that the first reference TBS is calculated based on a quantity of valid REs included in a transmission occasion corresponding to the time domain resource length that corresponds to one transmission occasion and that is notified by using the control information, if the first code rate obtained after the first reference TBS is carried on a short transmission occasion formed by an orphan time domain symbol (namely, a symbol corresponding to a first candidate time-frequency resource) is greater than the code rate threshold, the orphan time domain symbol and a previous time domain resource corresponding to normal transmission occasion duration (namely, the time domain resource length that is of one transmission occasion and that is notified by using the control information) may form a long transmission occasion to carry the first data packet.

Alternatively, if a code rate of the second reference TBS carried on a first candidate transmission occasion is greater than (or not less than) the code rate threshold, and a modified code rate is greater than (or not less than) the code rate threshold, the first transmission occasion is a second candidate transmission occasion, and the target transmission occasion is the second transmission occasion. The modified code rate is a code rate of the second reference TBS carried on the first candidate transmission occasion and using a modified modulation order, and the modified modulation order is higher than the modulation order notified by using the control information. Determining of the modified code rate and the modified modulation order is described above, and details are not described again.

It should be understood that the second candidate transmission occasion is also referred to as a second candidate time-frequency resource, in other words, a time-frequency resource corresponding to the second candidate transmission occasion is the second candidate time-frequency resource.

Further, an end moment of the second candidate time-frequency resource is equal to the end boundary of the first slot.

Further, a time interval between a start moment of the second candidate time-frequency resource and the end boundary of the first slot is less than twice the time domain resource length that corresponds to one transmission occasion and that is notified by using the control information.

It should be understood that a method for determining the start moment, a time domain resource length, and the end moment of the second candidate transmission occasion is similar to the method for determining the start moment, the time domain resource length, and the end moment of the first transmission occasion in the example 1. For example, the start moment of the second candidate transmission occasion is the start moment of the K transmission occasions that is notified by using the control information, or is determined based on an end moment of a previous transmission occasion of the second candidate transmission occasion in the K transmission occasions. Details are not described again.

It should be understood that the time-frequency resource corresponding to the second candidate transmission occasion includes the time-frequency resource corresponding to the first candidate transmission occasion and a time-frequency resource corresponding to a third candidate transmission occasion. An end moment of the third candidate transmission occasion is equal to the start moment of the first candidate transmission occasion. Alternatively, the start moment of the first candidate transmission occasion is later than an end moment of the third candidate transmission occasion, and is separated from the end moment of the third candidate transmission occasion by an offset that is configured or indicated by the network device or is predefined.

Further, a time domain resource length of the third candidate transmission occasion corresponds to the time domain resource length that is of one transmission occasion and that is notified by using the control information.

Further, the end moment of the second candidate transmission occasion is equal to an end moment of the first candidate transmission occasion, and the start moment of the second candidate transmission occasion is equal to a start moment of the third candidate transmission occasion.

It should be understood that a time-frequency resource corresponding to any candidate transmission occasion (for example, the first candidate transmission occasion, the second candidate transmission occasion, or the third candidate transmission occasion) in this embodiment of this application is a time-frequency resource consecutive in terms of time, that is, any candidate transmission occasion corresponds to one or more time-consecutive time domain symbols in time domain.

It should be understood that a frequency domain resource corresponding to the any candidate transmission occasion is a frequency domain resource that corresponds to the K transmission occasions or any one of the K transmission occasions and that is notified by using the control information.

Figure 11:
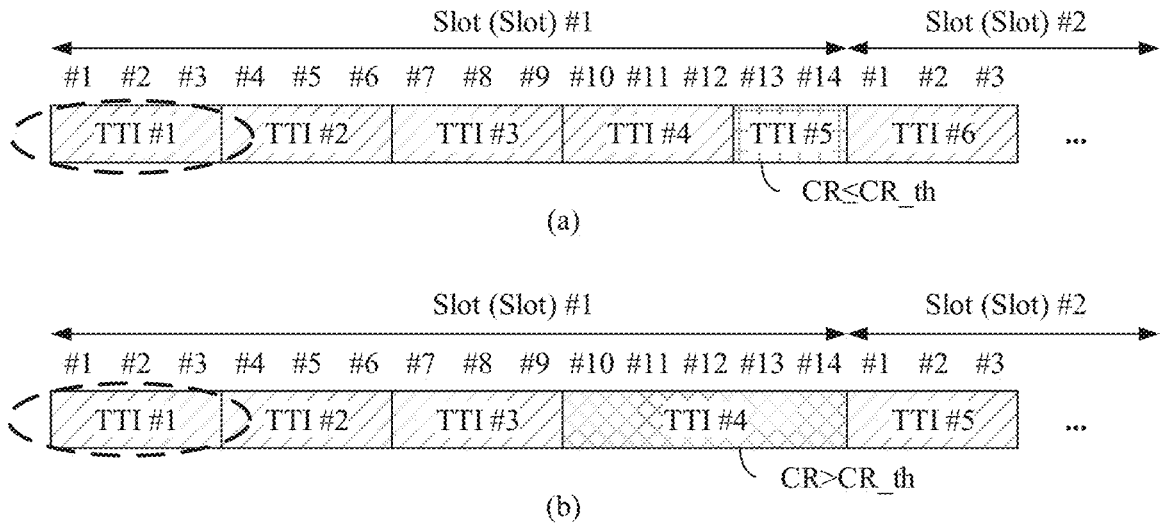
FIG. 11 is a schematic diagram in which an orphan symbol independently forms a short transmission occasion or forms a long transmission occasion together with a previous time domain resource according to an embodiment of this application.

For example, as shown in FIG. 11, a start symbol of the K transmission occasions is a symbol #1 in a slot #1, and the time domain resource length that is of one transmission occasion and that is notified by the network device is three symbols. In this case, a gap of two symbols is left after the first four transmission occasions and before a slot boundary. The target transmission occasion is a normal transmission occasion (for example, a transmission occasion corresponding to a TTI #1), and the first reference TBS (namely, the TBS of the first data packet) is a TBS calculated based on a quantity of valid REs included in a transmission occasion including three symbols. If the two symbols form a short transmission occasion, and a code rate of the first reference TBS carried on the short transmission occasion does not exceed the code rate threshold, the two symbols may form the short transmission occasion, and the first data packet is carried and sent on the short transmission occasion. As shown in (a) in FIG. 11, in this case, the short transmission occasion is the second transmission occasion, and the normal transmission occasion is the first transmission occasion. If a code rate of the first reference TBS carried on the short transmission occasion exceeds the code rate threshold, the two symbols and previous three symbols form a long transmission occasion, and the first data packet is carried and sent on the long transmission occasion. In this way, a code rate on the long transmission occasion is decreased. As shown in (b) in FIG. 11, in this case, the long transmission occasion is the first transmission occasion, and the normal transmission occasion is the second transmission occasion.

(3) In correspondence to the scenario 3, the time domain resource length corresponding to the first transmission occasion is greater than the time domain resource length corresponding to the second transmission occasion, and the first transmission occasion and the second transmission occasion are two adjacent transmission occasions in the K transmission occasions. The time-frequency resource for transmitting the first data packet includes a time-frequency resource crossing a slot boundary in time domain. The first transmission occasion corresponds to a time-frequency resource that is in the time-frequency resource crossing the slot boundary and that is located before the slot boundary, and the second transmission occasion corresponds to a time-frequency resource that is in the time-frequency resource crossing the slot boundary and that is located after the slot boundary. Alternatively, the first transmission occasion corresponds to a time-frequency resource that is in the time-frequency resource crossing the slot boundary and that is located after the slot boundary, and the second transmission occasion corresponds to a time-frequency resource that is in the time-frequency resource crossing the slot boundary and that is located before the slot boundary.

In terms of time domain, it may be understood as: The network device notifies, by using the control information, the time-frequency resource for transmitting the first data packet. The time-frequency resource for transmitting the first data packet includes the time-frequency resource crossing the slot boundary, the time-frequency resource crossing the slot boundary is divided by the slot boundary into two time domain sub-resources, and the two time domain sub-resources respectively carry two different transmission occasions, namely, the first transmission occasion and the second transmission occasion. A start point of the time domain resource may be a start point corresponding to the SLIV field of the control information, and a time domain resource length of the time domain resource may be a time domain resource length corresponding to the SLIV field of the control information.

It should be understood that the time-frequency resource that is for transmitting the first data packet and that is notified by using the control information may include the time-frequency resource crossing the slot boundary, or may include another time-frequency resource in addition to the time-frequency resource crossing the slot boundary. For example, the another time-frequency resource is used as a transmission occasion other than the first transmission occasion and the second transmission occasion, and is used by the terminal device to perform data transmission on the first data packet. In other words, a time domain resource length of the time-frequency resource that is for transmitting the first data packet and that is notified by using the control information may be equal to a time domain resource length of the time-frequency resource crossing the slot boundary, or may be greater than the time domain resource length of the time-frequency resource crossing the slot boundary.

It should be understood that a sum of the time domain resource lengths of the first transmission occasion and the second transmission occasion corresponds to the time domain resource length of the time-frequency resource crossing the slot boundary, in other words, the time-frequency resource crossing the slot boundary includes the time-frequency resources of the first transmission occasion and the second transmission occasion.

Optionally, the time-frequency resource crossing the slot boundary corresponds to a total time domain resource of the K transmission occasions in time domain (that is, the time domain resource length of the time-frequency resource that is for transmitting the first data packet and that is notified by using the control information is equal to the time domain resource length of the time-frequency resource crossing the slot boundary). In this case, a start moment of a time domain resource that is in the time-frequency resource crossing the slot boundary and that is located before the slot boundary is a start moment of the total time domain resource of the K transmission occasions that is notified by using the control information. For example, as shown in (a) in FIG. 5, the time-frequency resource that is for transmitting the first data packet and that is notified by using the control information corresponds to the total time domain resource of the K transmission occasions, and has a length of 14 symbols, and the start moment is located on a symbol #5 of a slot #1. Because the time domain resource crosses an end boundary of the slot #1, and the remaining four symbols fall in a start part of a slot #2, the 14 symbols notified by using the control information are divided by the end boundary of the slot #1 into K=2 transmission occasions. The first transmission occasion corresponds to symbols #5 to #14 of the slot #1, and the second transmission occasion corresponds to symbols #1 to #4 of the slot #2.

Optionally, the time-frequency resource crossing the slot boundary corresponds to a time domain resource of one of the K transmission occasions in time domain (that is, the time domain resource length of the time-frequency resource that is for transmitting the first data packet and that is notified by using the control information is greater than the time domain resource length of the time-frequency resource crossing the slot boundary, and the time domain resource length of the time-frequency resource crossing the slot boundary is a time domain resource length of one of the K transmission occasions). For example, as shown in (c) in FIG. 5, the time domain resource length that is of one transmission occasion and that is notified by using the control information is three symbols, and there are two orphan symbols, namely, a symbol #13 and a symbol #14, before an end boundary of a slot #1. The two orphan symbols form a transmission occasion that corresponds to a TTI #5. A symbol #1 of a slot #2 forms a transmission occasion that corresponds to a TTI #6. A sum of time domain resource lengths of the transmission occasion corresponding to the TTI #5 and the transmission occasion corresponding to the TTI #6 is equal to three symbols. In this case, the K transmission occasions may correspond to more than two quantities of valid REs. For example, quantities of valid REs included in transmission occasions corresponding to a TTI #1, a TTI #2, a TTI #3, a TTI #4, and a TTI #7 are all a first quantity of valid REs, a quantity of valid REs included in the transmission occasion corresponding to the TTI #5 is a second quantity of valid REs, and a quantity of valid REs included in the transmission occasion corresponding to the TTI #6 is a third quantity of valid REs. The first quantity of valid REs is greater than the second quantity of valid REs, and the second quantity of valid REs is greater than the third quantity of valid REs. In this case, a method for determining the start moment of the time domain resource that is in the time-frequency resource crossing the slot boundary and that is located before the slot boundary is similar to the method for determining the start moment of the second transmission occasion in the foregoing example 2. For example, the start moment of the time domain resource located before the slot boundary is the start moment of the K transmission occasions that is notified by using the control information. Alternatively, the start moment of the time domain resource located before the slot boundary is determined based on an end moment of a previous transmission occasion, in the K transmission occasions, of a transmission occasion corresponding to the time domain resource located before the slot boundary.

Figure 5:
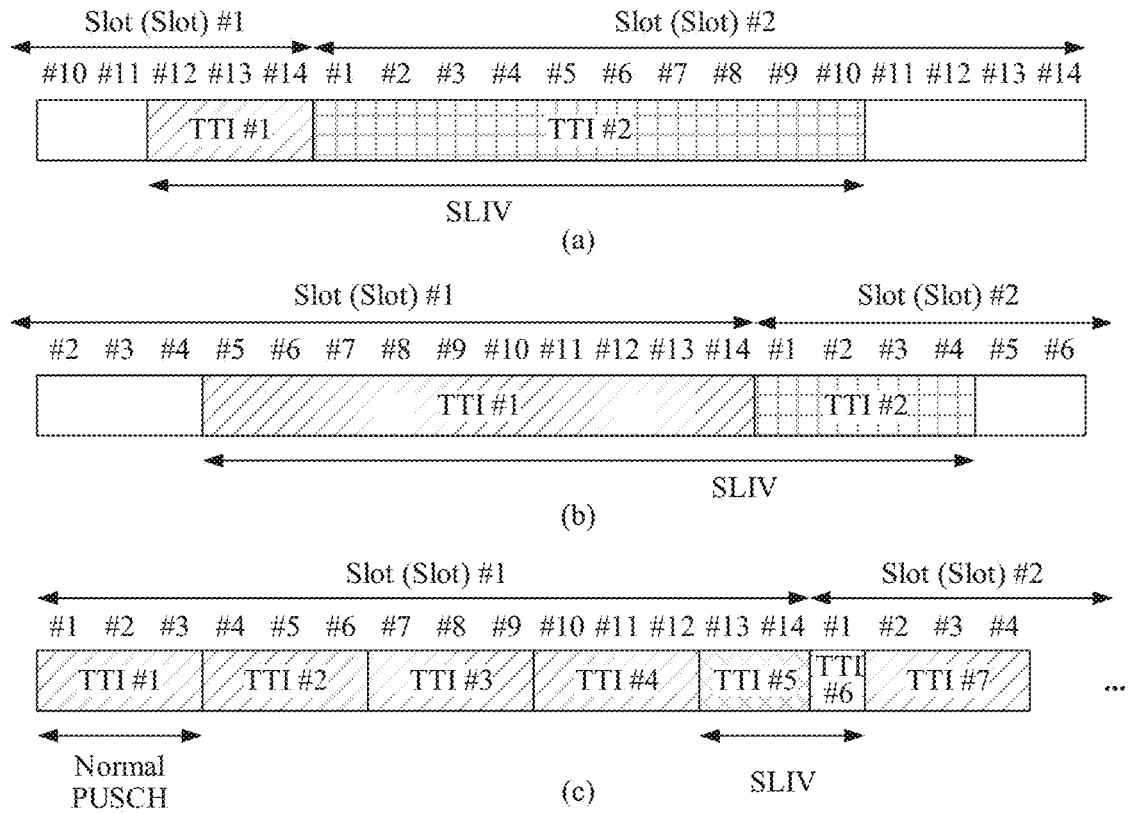
FIG. 5 is a schematic diagram of a scenario 3 according to an embodiment of this application.

Further, in an example, as shown in (c) in FIG. 5, the first transmission occasion may be the transmission occasion corresponding to the TTI #1 (or the TTI #2, the TTI #3, the TTI #4, or the TTI #7), and the second transmission occasion may be the transmission occasion corresponding to the TTI #6. That is, if the K transmission occasions correspond to more than two quantities of valid REs, the first transmission occasion may be a transmission occasion including a largest quantity of valid REs, and the second transmission occasion may be a transmission occasion including a smallest quantity of valid REs. Further, whether the target transmission occasion is the first transmission occasion or the second transmission occasion may be determined by using the method described above.

In another example, as shown in (c) in FIG. 5, the first transmission occasion may be the transmission occasion corresponding to the TTI #1 (or the TTI #2, the TTI #3, the TTI #4, or the TTI #7), and the second transmission occasion may be the transmission occasion corresponding to the TTI #5. Further, whether the target transmission occasion is the first transmission occasion or the second transmission occasion may be determined by using the method described above.

In another example, the first transmission occasion and the second transmission occasion are two adjacent transmission occasions in the K transmission occasions, and the first transmission occasion and the second transmission occasion are non-consecutive in time domain. Further, the first transmission occasion and the second transmission occasion are separated by at least one time domain symbol (also referred to as a non-uplink symbol) that is notified by the network device and that is not used to send the uplink data information. Still further, a symbol that is used for uplink transmission and that is notified by the network device, for example, an "uplink" symbol notified by the network device, does not exist between the first transmission occasion and the second transmission occasion. The time-frequency resource for transmitting the first data packet includes a time-frequency resource crossing an uplink/downlink symbol boundary in time domain, and the time-frequency resource crossing the uplink/downlink symbol boundary is a union set of a time domain resource corresponding to the first transmission occasion and a time domain resource corresponding to the second transmission occasion. The first transmission occasion corresponds to a time-frequency resource that is in the time-frequency resource crossing the uplink/downlink symbol boundary and that is located before the at least one non-uplink symbol, and the second transmission occasion corresponds to a time-frequency resource that is in the time-frequency resource crossing the uplink/downlink symbol boundary and that is located after the at least one non-uplink symbol. Alternatively, the first transmission occasion corresponds to a time-frequency resource that is in the time-frequency resource crossing the uplink/downlink symbol boundary and that is located after the at least one non-uplink symbol, and the second transmission occasion corresponds to a time-frequency resource that is in the time-frequency resource crossing the uplink/downlink symbol boundary and that is located before the at least one non-uplink symbol.

In this case, a time domain length of the first transmission occasion (or the quantity of valid REs included in the first transmission occasion) may be greater than, less than, or equal to a time domain length of the second transmission occasion (or the quantity of valid REs included in the second transmission occasion).

Optionally, the non-uplink symbol includes a "downlink" symbol or "flexible" symbol that is notified by the network device. Further, the non-uplink symbol includes a time interval for uplink-downlink switching.

In still another example, the K (or M) transmission occasions include at least one split transmission occasion. Further, a time domain length of any one of the at least one split transmission occasion is less than the time domain resource length that corresponds to one of the K (or M) transmission occasions and that is notified by using the control information.

Further, any transmission occasion (referred to as a first split transmission occasion) in the at least one split transmission occasion and a second split transmission occasion are non-consecutive in time domain. The second split transmission occasion is a previous (adjacent) transmission occasion or a subsequent (adjacent) transmission occasion of the first split transmission occasion in the K (or M) transmission occasions, or the first split transmission occasion is the 1$^{st}$ transmission occasion or the last transmission occasion in the K (or M) transmission occasions. Further, the first split transmission occasion and the second split transmission occasion are separated by at least one non-uplink symbol. Alternatively, the first split transmission occasion is the 1$^{st}$ transmission occasion in the K (or M) transmission occasions, and a start moment of the first split transmission occasion is adjacent to at least one non-uplink symbol. Alternatively, the first split transmission occasion is the last transmission occasion in the K (or M) transmission occasions, and an end moment of the first split transmission occasion is adjacent to at least one non-uplink symbol. That is, the first split transmission occasion is adjacent to the at least one non-uplink symbol in time domain. For example, the start moment of the first split transmission occasion is equal to an end moment of the at least one non-uplink symbol, or the end moment of the first split transmission occasion is equal to a start moment of the at least one non-uplink symbol.

Still further, a symbol that is used for uplink transmission and that is notified by the network device, for example, an "uplink" symbol notified by the network device, does not exist between the first split transmission occasion and the second split transmission occasion. It should be understood that the symbol that is used for uplink transmission and that is notified by the network device may be notified by using higher layer signaling and/or physical layer signaling. For example, the higher layer signaling includes a TDD-UL-DL-ConfigurationCommon or TDD-UL-DL-ConfigDedicated field, and the physical layer signaling is DCI corresponding to the format 2_0.

Further, the 1$^{st}$ transmission occasion in the at least one split transmission occasion is the 1$^{st}$ transmission occasion in the K (or M) transmission occasions, or there is no non-uplink symbol notified by the network device between the 1$^{st}$ transmission occasion in the at least one split transmission occasion and a previous transmission occasion of the 1$^{st}$ transmission occasion in the K (or M) transmission occasions, or the 1$^{st}$ transmission occasion in the at least one split transmission occasion is consecutive in terms of time with a previous transmission occasion of the 1$^{st}$ transmission occasion in the K (or M) transmission occasions. Similarly, the last transmission occasion in the at least one split transmission occasion is the last transmission occasion in the K (or M) transmission occasions, or there is no non-uplink symbol notified by the network device between the last transmission occasion in the at least one split transmission occasion and a subsequent transmission occasion of the last transmission occasion in the K (or M) transmission occasions, or the last transmission occasion in the at least one split transmission occasion is consecutive in terms of time with a subsequent transmission occasion of the last transmission occasion in the K (or M) transmission occasions.

It should be understood that any two adjacent transmission occasions in the at least one split transmission occasion are two adjacent transmission occasions in the K (or M) transmission occasions, that is, any two adjacent transmission occasions in the at least one split transmission occasion do not include another transmission occasion, for example, a transmission occasion whose time domain length is equal to the time domain resource length that corresponds to one of the K (or M) transmission occasions and that is notified by using the control information, in the K (or M) transmission occasions. The time-frequency resource for transmitting the first data packet includes a time-frequency resource crossing an uplink/downlink symbol boundary in time domain, and the time-frequency resource crossing the uplink/downlink symbol boundary is a union set of time domain resources corresponding to all transmission occasions included in the at least one split transmission occasion. For example, if a length of a remaining time domain resource that can be used for uplink transmission and that is before the at least one non-uplink symbol is less than the time domain resource length that corresponds to one of the K (or M) transmission occasions and that is notified by using the control information, the time domain resource used to transmit the first data packet is split by the non-uplink symbol, to form one transmission occasion in the at least one split transmission occasion, where the transmission occasion is referred to as a third split transmission occasion. For another example, one transmission occasion in the at least one split transmission occasion is formed after the at least one non-uplink symbol, where the transmission occasion is referred to as a fourth split transmission occasion.

It should be understood that the at least one split transmission occasion includes the third split transmission occasion.

It should be understood that the at least one split transmission occasion includes the fourth split transmission occasion.

Further, the at least one non-uplink symbol is a symbol that is consecutive in terms of time.

For example, an end moment of the third split transmission occasion is a start moment of the at least one non-uplink symbol. That is, the third split transmission occasion is a transmission occasion located before the at least one non-uplink symbol.

For another example, a start moment of the fourth split transmission occasion is an end moment of the at least one non-uplink symbol. Alternatively, a start moment of the fourth split transmission occasion is the slot boundary or the uplink/downlink symbol boundary, and a start moment of a previous transmission occasion adjacent to the fourth split transmission occasion in the K (or M) transmission occasions is an end moment of the at least one non-uplink symbol. That is, the fourth split transmission occasion is a transmission occasion located after the at least one non-uplink symbol.

For still another example, the at least one split transmission occasion includes the first transmission occasion and the second transmission occasion in the previous example.

Figure 17:
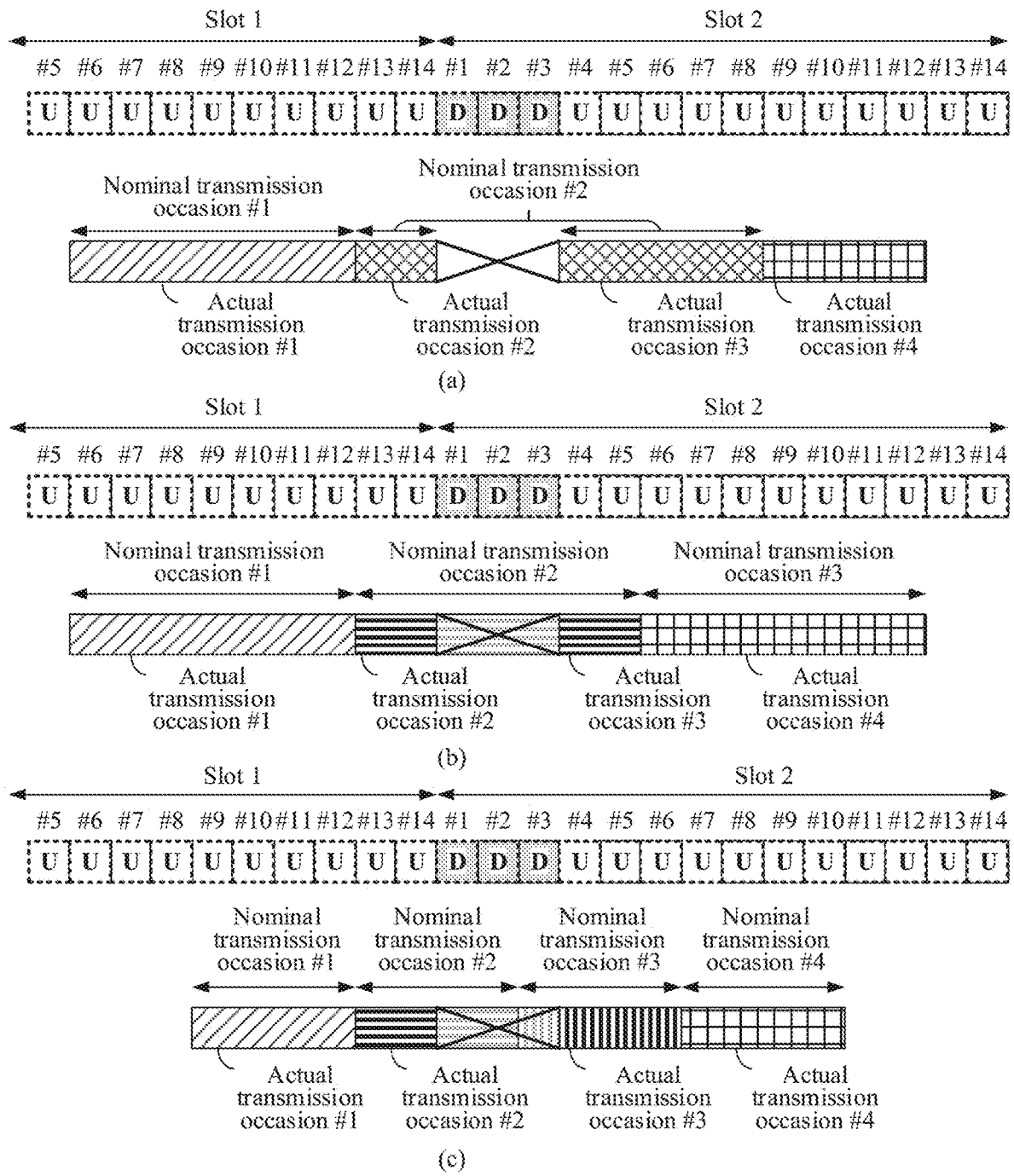
FIG. 17 is a schematic diagram in which a transmission occasion is split by a non-uplink symbol according to an embodiment of this application.

Optionally, a sum of time domain resource lengths of all transmission occasions included in the at least one split transmission occasion (or a sum of the time domain resource lengths of the first transmission occasion and the second transmission occasion) corresponds to the time domain resource length that corresponds to one of the K transmission occasions and that is notified by using the control information. In this case, a length of the time-frequency resource crossing the uplink/downlink symbol boundary is equal to the time domain resource length that corresponds to one of the K transmission occasions and that is notified by using the control information. For example, as shown in FIG. 17(a), a time domain resource notified by using the control information corresponds to three nominal transmission occasions, and a time domain length of each nominal transmission occasion is seven symbols. The at least one non-uplink symbol is a downlink symbol, and includes a symbol 1 to a symbol 3 in a slot 2. The $1^{st}$ nominal transmission occasion is not split, and therefore an actual transmission occasion #1 is formed. The $2^{nd}$ nominal transmission occasion is split by at least one non-uplink symbol. Therefore, the $2^{nd}$ nominal transmission occasion crosses the at least one non-uplink symbol, a symbol 13 and a symbol 14 in a slot 1 form an actual transmission occasion #2, a symbol 4 to a symbol 8 in the slot 2 form an actual transmission occasion #3, and a sum of time domain resources of the actual transmission occasion #2 and the actual transmission occasion #3 is equal to the time domain length of the nominal transmission occasion, namely, seven symbols. A symbol 9 to a symbol 12 in the slot 2 form an actual transmission occasion #4. In other words, the K transmission occasions include the actual transmission occasion #1 to the actual transmission occasion #4.

That is, if the at least one non-uplink symbol overlaps, in time domain, any nominal transmission occasion (referred to as a first nominal transmission occasion) notified by using the control information, an overlapping time in time domain is not counted towards a time domain resource corresponding to the first nominal transmission occasion. The nominal transmission occasion is described below. In other words, splitting of the K (or M) transmission occasions by the at least one non-uplink symbol affects determining an end moment of a transmission occasion (the fourth split transmission occasion) obtained after the splitting, in other words, the end moment of the fourth split transmission occasion is determined based on time domain resource information that is of the nominal transmission occasion and that is notified by using the control information and a time domain resource (including a time domain length and a time domain start point) of the at least one non-uplink symbol.

Optionally, a start moment of the third split transmission occasion in the at least one split transmission occasion is a time domain start point notified by using the control information, or a time interval between a start moment of the third split transmission occasion and a time domain start point notified by using the control information corresponds to a total time domain length of g nominal transmission occasions, where g is an integer greater than or equal to 1 and less than G. The end moment of the third split transmission occasion is determined based on the at least one non-uplink symbol. Specifically, the end moment of the third split transmission occasion is adjacent to the at least one non-uplink symbol, in other words, the end moment of the third split transmission occasion is the start moment of the at least one non-uplink symbol. Alternatively, a time interval between the end moment of the third split transmission occasion and the time domain start point notified by using the control information corresponds to a total time domain length of g+1 nominal transmission occasions.

Optionally, a time interval between the end moment of the fourth split transmission occasion in the at least one split transmission occasion and the time domain start point notified by using the control information corresponds to a total time domain length of g' nominal transmission occasions, where g' is an integer greater than or equal to 1 and less than or equal to G. The start moment of the fourth split transmission occasion is determined based on the at least one non-uplink symbol. Specifically, the start moment of the fourth split transmission occasion is adjacent to the at least one non-uplink symbol, in other words, the start moment of the fourth split transmission occasion is the end moment of the at least one non-uplink symbol. Alternatively, the start moment of the fourth split transmission occasion is the slot boundary or the uplink/downlink symbol boundary, and a start moment of a previous transmission occasion adjacent to the fourth split transmission occasion in the K (or M) transmission occasions is the end moment of the at least one non-uplink symbol. That is, the end moment of the fourth split transmission occasion is determined based on the time domain start point notified by using the control information and the time domain length that is of the nominal transmission occasion and that is notified by using the control information, but is not determined based on the time domain length or a time domain position of the at least one non-uplink symbol.

Specifically, the time domain start point notified by using the control information is also referred to as a time domain start point of the K (or M) transmission occasions that is notified by using the control information, or is referred to as a time domain start point that is of the nominal transmission occasion and that is notified by using the control information. More specifically, the time domain start point notified by using the control information is a time domain start point notified by using the Time domain resource assignment field in the control information.

That is, if the at least one non-uplink symbol overlaps, in time domain, any nominal transmission occasion (the first nominal transmission occasion) notified by using the control information, an overlapping time in time domain is counted towards a time domain resource corresponding to the first nominal transmission occasion. In other words, splitting of the K (or M) transmission occasions by the at least one non-uplink symbol does not affect determining an end moment of a transmission occasion (the fourth split transmission occasion) obtained after the splitting, and the end moment of the fourth split transmission occasion is still determined based on time domain resource information that is of the nominal transmission occasion and that is notified by using the control information.

For example, as shown in FIG. 17(b), a time domain resource notified by using the control information corresponds to three nominal transmission occasions, and a time domain length of each nominal transmission occasion is seven symbols. The at least one non-uplink symbol is a downlink symbol, and includes a symbol 1 to a symbol 3 in a slot 2. The $1^{st}$ nominal transmission occasion is not split, and therefore an actual transmission occasion #1 is formed. The $2^{nd}$ nominal transmission occasion is split by at least one non-uplink symbol, a symbol 13 and a symbol 14 in a slot 1 form an actual transmission occasion #2, and a symbol 4 and a symbol 5 in the slot 2 form an actual transmission occasion #3. A time interval between an end moment of the actual transmission occasion #3 and the time domain resource start point notified by using the control information is a total time domain length of two nominal transmission occasions, and is not affected by splitting (the end moment is equivalent to an end moment of a nominal transmission occasion #2 that is in a case without splitting). A symbol 6 to a symbol 12 in the slot 2 form an actual transmission occasion #4. In other words, the K transmission occasions include the actual transmission occasion #1 to the actual transmission occasion #4.

For another example, as shown in FIG. 17(c), a time domain resource notified by using the control information corresponds to four nominal transmission occasions, and a time domain length of each nominal transmission occasion is four symbols. The at least one non-uplink symbol is a downlink symbol, and includes a symbol 1 to a symbol 3 in a slot 2. The $1^{st}$ nominal transmission occasion is not split, and therefore an actual transmission occasion #1 is formed. The $2^{nd}$ nominal transmission occasion is split by at least one non-uplink symbol, and a symbol 13 and a symbol 14 in a slot 1 form an actual transmission occasion #2. The $3^{rd}$ nominal transmission occasion is split by at least one non-uplink symbol, and a symbol 4 to a symbol 6 in the slot 2 form an actual transmission occasion #3. A time interval between an end moment of the actual transmission occasion #3 and the time domain resource start point notified by using the control information is a total time domain length of three nominal transmission occasions, and is not affected by splitting (the end moment is equivalent to an end moment of a nominal transmission occasion #3 that is in a case without splitting). A symbol 7 to a symbol 10 in the slot 2 form an actual transmission occasion #4. In other words, the K transmission occasions include the actual transmission occasion #1 to the actual transmission occasion #4.

An advantage of the method is: Splitting of the K (or M) transmission occasions by the at least one non-uplink symbol does not affect a time domain start point and a time domain length of another transmission occasion that does not overlap the at least one non-uplink symbol in time domain and that is after the fourth split transmission occasion. For example, a time domain length of the actual transmission occasion #4 in FIG. 17(b) is still equal to the time domain length, namely, seven symbols, that is of the nominal transmission occasion and that is notified by using the control information. In this way, it can be better ensured that the time domain length of the another transmission occasion is not shortened due to impact of the splitting, so that transmission reliability is better ensured.

Specifically, the control information is used to notify the time domain resource information of the nominal transmission occasion (nominal TO or nominal PUSCH) (for example, the time domain resource information includes a time domain start point and a time domain length). Further, the network device notifies a quantity G of repetitions of the nominal transmission occasion, in other words, the time domain resource information of the nominal transmission occasion includes information about G, where G is a positive integer greater than or equal to 1. Further, G nominal transmission occasions are consecutive in time domain, and a length of each of the G nominal transmission occasions is the time domain resource length that is of one transmission occasion and that is notified by using the control information, and is referred to as a time domain resource length of the nominal transmission occasion. For descriptions of the nominal transmission occasion, refer to the following. A time domain start point of the $1^{st}$ nominal transmission occasion in the G nominal transmission occasions is the time domain start point that corresponds to the time domain resource of the nominal transmission occasion and that is notified by using the control information (for example, the Time domain resource assignment field in the control information). When the G nominal transmission occasions overlap, in time domain, the at least one non-uplink symbol notified by the network device, the G nominal transmission occasions are split by the at least one non-uplink symbol. A symbol in the G nominal transmission occasions that overlaps the at least one non-uplink symbol in time domain is not used to transmit the first data packet, and a remaining time domain resource (for example, a time domain resource in the G nominal transmission occasions that does not overlap any non-uplink symbol notified by the network device) in the G nominal transmission occasions forms the K transmission occasions. More specifically, for any nominal transmission occasion (referred to as the first nominal transmission occasion) in the G nominal transmission occasions, if the first nominal transmission occasion overlaps the at least one non-uplink symbol in time domain, and the first nominal transmission occasion includes a time domain resource that does not overlap the at least one non-uplink symbol, the non-overlapping time domain resource forms one transmission occasion, for example, the first split transmission occasion, in the at least one split transmission occasion, where the first split transmission occasion is used to perform one data transmission on the first data packet. If the first nominal transmission occasion overlaps the at least one non-uplink symbol in time domain, and the first nominal transmission occasion does not include a time domain resource that does not overlap the at least one non-uplink symbol, the first nominal transmission occasion is not counted towards the K transmission occasions. If the first nominal transmission occasion does not overlap the at least one non-uplink symbol in time domain, the first nominal transmission occasion is one transmission occasion, for example, the following fourth transmission occasion, in the K transmission occasions (in other words, is counted towards the K transmission occasions). Further, the first nominal transmission occasion is a transmission occasion included in the K transmission occasions and not included in the at least one split transmission occasion.

It should be understood that, in addition to the foregoing descriptions that "the target quantity of valid REs is an average quantity of valid REs included in each of the K transmission occasions, or is a quantity of valid REs included in the target transmission occasion in the K transmission occasions", there may be further the following two cases for the target quantity of valid REs:

Case 1: For a scenario in which the time-frequency resource crossing the slot boundary corresponds to the total time domain resource of the K transmission occasions in time domain, the target quantity of valid REs is an average quantity of valid REs that is obtained by averaging, by G, a total quantity of valid REs included in the K transmission occasions, where G is a positive integer, and G is not equal to K. Assuming that the total quantity of valid REs included in the K transmission occasions is N, the target quantity of valid REs is obtained according to N/G. For example, N/G is rounded up or rounded down. It is considered that when the total time domain resource length of the K transmission occasions is notified by using the control information, and the total time domain resource is divided by the slot boundary into a plurality of transmission occasions, if time domain resources of the first transmission occasion and the second transmission occasion that are obtained through division and that are on two sides of the slot boundary differ greatly, for example, if the quantity of valid REs in the first transmission occasion is much greater than the quantity of valid REs in the second transmission occasion, determining the TBS by using the average quantity of valid REs in the K transmission occasions or by using the quantity of valid REs in the first transmission occasion may cause a relatively large TBS, and determining the TBS by using the quantity of valid REs in the second transmission occasion may cause a relatively small TBS. Therefore, to balance a size of the TBS to achieve a compromise between transmission efficiency and reliability, the TBS of the first data packet may be determined based on the average quantity of valid REs that is obtained by averaging, by G virtual transmission occasions, the total quantity of valid REs included in the K transmission occasions. The network device may configure or indicate a value of G to obtain an appropriate TBS through adjustment. Specifically, G is a value configured or indicated by using other control information instead of the control information (namely, the control information used to notify the time-frequency resource for transmitting the first data packet). More specifically, G corresponds to a value configured by using the higher layer parameter aggregationFactorUL or repK. For example, as shown in (a) or (b) in FIG. 5, K=2, G configured by the network device by using the other control information instead of the control information is 4, and the quantities of valid REs included in the first transmission occasion and the second transmission occasion are respectively $N_1$ and $N_2$. In this case, the target quantity of valid REs is obtained according to $(N_1+N_2)/G$.

Case 2: For a scenario in which the time-frequency resource crossing the slot boundary corresponds to the total time domain resource of the K transmission occasions, or a scenario in which the length of the time-frequency resource crossing the slot boundary corresponds to the time domain resource length that corresponds to one of the K transmission occasions and that is notified by using the control information, the target quantity of valid REs is a sum of the quantity of valid REs included in the first transmission occasion and the quantity of valid REs included in the second transmission occasion (that is, the target quantity of valid REs is not equal to the quantity of valid REs included in the first transmission occasion, and is not equal to the quantity of valid REs included in the second transmission occasion either). In other words, the target quantity of valid REs is a quantity of valid REs included in the target transmission occasion, and a time domain resource length corresponding to the target transmission occasion is the time domain resource length that corresponds to one of the K transmission occasions and that is notified by using the control information (that is, the target transmission occasion is neither the first transmission occasion nor the second transmission occasion). Specifically, the K transmission occasions further include the fourth transmission occasion in addition to the first transmission occasion and the second transmission occasion, and a time domain resource length corresponding to the fourth transmission occasion is equal to the time domain resource length that corresponds to one transmission occasion and that is notified by using the control information. In other words, the fourth transmission occasion is the target transmission occasion. For example, in FIG. 5(c), the fourth transmission occasion is the transmission occasion corresponding to the TTI #1/2/3/4/7, the first transmission occasion is the transmission occasion corresponding to the TTI #5, and the second transmission occasion is the transmission occasion corresponding to the TTI #6. In this case, the quantity of valid REs included in the first transmission occasion may be greater than the quantity of valid REs included in the second transmission occasion, or may be equal to the quantity of valid REs included in the second transmission occasion. Further, a quantity of valid REs included in the fourth transmission occasion is greater than the quantity of valid REs included in the first transmission occasion and the quantity of valid REs included in the second transmission occasion.

It should be noted that, optionally, if the first transmission occasion is earlier than the second transmission occasion, as shown in (b) in FIG. 5, the end moment of the first transmission occasion is equal to the slot boundary, and is equal to the start moment of the second transmission occasion; or the end moment of the first transmission occasion is earlier than or equal to the slot boundary, and the slot boundary is earlier than or equal to the start moment of the second transmission occasion. If the end moment of the first transmission occasion is earlier than the slot boundary, a time interval between the end moment and the slot boundary is configured or indicated by the network device or is predefined. If the slot boundary is earlier than the start moment of the second transmission occasion, a time interval between the slot boundary and the start moment is configured or indicated by the network device or is predefined. Optionally, the slot boundary is an end boundary of the slot in which the first transmission occasion is located, and the start moment of the first transmission occasion is equal to a start boundary of the slot, or the start moment of the first transmission occasion is equal to the start moment of the total time domain resource of the K transmission occasions that is notified by using the control information. The end moment of the second transmission occasion is equal to an end boundary of a next slot adjacent to the slot, or the end moment of the second transmission occasion is equal to an end moment of the total time domain resource of the K transmission occasions that is notified by using the control information.

Optionally, if the second transmission occasion is earlier than the first transmission occasion, as shown in (a) in FIG. 5, the end moment of the second transmission occasion is equal to the slot boundary, and is equal to the start moment of the first transmission occasion. Alternatively, the end moment of the second transmission occasion is earlier than or equal to the slot boundary, and the slot boundary is earlier than or equal to the start moment of the first transmission occasion. If the end moment of the second transmission occasion is earlier than the slot boundary, a time interval between the end moment and the slot boundary is configured or indicated by the network device or is predefined. If the slot boundary is earlier than the start moment of the first transmission occasion, a time interval between the slot boundary and the start moment is configured or indicated by the network device or is predefined. Optionally, the slot boundary is an end boundary of the slot in which the second transmission occasion is located, and the start moment of the second transmission occasion is equal to a start boundary of the slot, or the start moment of the second transmission occasion is equal to the start moment of the total time domain resource of the K transmission occasions that is notified by using the control information. The end moment of the first transmission occasion is equal to an end boundary of a next slot of the slot, or the end moment of the first transmission occasion is equal to an end moment of the total time domain resource of the K transmission occasions that is notified by using the control information.

It should be noted that, for the scenario in which the time domain resource length corresponding to the target transmission occasion is the time domain resource length that corresponds to one of the K transmission occasions and that is notified by using the control information or the scenario in which the target transmission occasion is equal to the fourth transmission occasion, the quantity of valid REs included in the target transmission occasion is greater than the sum of the quantity of valid REs included in the first transmission occasion and the quantity of valid REs included in the second transmission occasion. For example, a time domain resource crossing the slot boundary or crossing the uplink/downlink symbol boundary includes the first transmission occasion and the second transmission occasion. A sum of the time domain resource lengths of the first transmission occasion and the second transmission occasion is equal to the time domain resource length that corresponds to one of the K transmission occasions and that is notified by using the control information, the first transmission occasion and the second transmission occasion each include D DMRS symbols, and the target transmission occasion may include only D DMRS symbols, where D is a positive integer, and for example, is equal to 1. Therefore, DMRS overheads of the target transmission occasion are less than a sum of DMRS overheads of the first transmission occasion and DMRS overheads of the second transmission occasion. As a result, the quantity of valid REs in the target transmission occasion is greater than the sum of the quantity of valid REs in the first transmission occasion and the quantity of valid REs in the second transmission occasion. Similarly, for a scenario in which the time-frequency resource crosses the uplink/downlink symbol boundary, because more DMRSs are used by the at least one split transmission occasion, the quantity of valid REs in the target transmission occasion is greater than a sum of quantities of valid REs included in all of the at least one split transmission occasion.

Further, the network device notifies, by using the control information or second control information different from the control information, information that is about a quantity of repetitions (repetition number or number of repetitions) and that corresponds to the time-frequency resource (namely, the time-frequency resource for transmitting the first data packet). Specifically, the second control information is physical layer control information or higher layer signaling. For example, a Time domain resource assignment field, a number of repetitions field, or a nominal number of repetitions field in the control information or the second control information is used to notify the information about the quantity of repetitions. For another example, the second control information is the higher layer signaling, and an aggregationFactorUL or repK field included in the second control information is used to notify the information about the quantity of repetitions. Specifically, the quantity of repetitions corresponds to G described above. It should be understood that the quantity of repetitions is a quantity of repetitions that is notified by using the control information or the second control information, and is also referred to as a nominal quantity of repetitions (nominal number of repetitions). The quantity of repetitions may be equal to a quantity of transmission occasions actually used to transmit the first data packet, or may not be equal to a quantity of transmission occasions actually used to transmit the first data packet. For example, when the K (or M) transmission occasions cross the slot boundary or cross the uplink/downlink symbol boundary, one nominal transmission occasion may form a plurality of actual transmission occasions. In other words, the quantity of repetitions may be equal to K (or M), or may not be equal to K (or M).

It should be understood that the time domain resource length that corresponds to one of the K transmission occasions and that is notified by using the control information may also be referred to as a time domain resource length that is of one transmission occasion and that is notified by using the control information, or may be referred to as a time domain resource length that is of one transmission occasion used to perform data transmission on the first data packet and that is notified by using the control information, or may be referred to as a time domain resource length that is of a nominal transmission occasion and that is notified by using the control information.

For example, the time domain resource length of the nominal transmission occasion is a time domain resource length that corresponds to one transmission occasion and that is notified by using a Time domain resource assignment field in the control information.

It should be understood that a time domain resource that corresponds to one of the K transmission occasions and that is notified by using the control information may also be referred to as a time domain resource that is of one transmission occasion and that is notified by using the control information, or may be referred to as a time domain resource that is of one transmission occasion used to perform data transmission on the first data packet and that is notified by using the control information, or may be referred to as a time domain resource that is of a nominal transmission occasion and that is notified by using the control information, or may be referred to as a time domain resource of the $1^{st}$ nominal transmission occasion in the G nominal transmission occasions.

In other words, the time domain resource (including a time domain start point and a time domain length) of the nominal transmission occasion is also determined based on the control information. For example, the time domain start point of the nominal transmission occasion is also determined based on the Time domain resource assignment field in the control information.

Further, time domain resources of the G nominal transmission occasions are determined based on the information about the quantity of repetitions and the time domain resource that is of the nominal transmission occasion and that is notified by using the control information. Specifically, a time domain start point of the $1^{st}$ nominal transmission occasion in the G nominal transmission occasions is the time domain start point notified by using the control information. A time domain start point of a $(g+1)^{th}$ nominal transmission occasion is a time domain end point of a $g^{th}$ nominal transmission occasion or is determined based on the time domain end point of the $g^{th}$ nominal transmission occasion, where g is an integer greater than or equal to 1 and less than G. More specifically, a time domain resource length of each of the G nominal transmission occasions corresponds to the time domain resource length that is of the nominal transmission occasion and that is notified by using the control information. For example, if the time domain start point notified by using the control information is a symbol i, and the time domain resource length that is of the nominal transmission occasion and that is notified by using the control information is L symbols, a time domain start point of the $g^{th}$ nominal transmission occasion is a symbol i+g*L, and a time domain length is L symbols.

It should be understood that the time domain resource length that corresponds to one of the K transmission occasions and that is notified by using the control information is used to determine a time domain resource pattern of the K transmission occasions. However, the time domain resource pattern of the K transmission occasions is further determined based on other factors such as the slot boundary and the uplink/downlink symbol boundary. Therefore, the time domain resource length that corresponds to one of the K transmission occasions and that is notified by using the control information may be equal to a time domain resource length of at least one of the K transmission occasions, or may not be equal to a time domain resource length of any one of the K transmission occasions.

In an example, the target quantity of valid REs is a quantity of valid REs included in a virtual target transmission occasion, and a time domain resource length corresponding to the virtual target transmission occasion is the time domain resource length that corresponds to one of the K transmission occasions and that is notified by using the control information. In this case, the virtual target transmission occasion is not a transmission occasion actually used by the terminal device to transmit the first data packet. In other words, the virtual target transmission occasion does not correspond to any one of the K transmission occasions or a transmission occasion actually used to send the data packet, but is used to determine the target quantity of valid REs. That is, even if the K transmission occasions do not include a transmission occasion whose time domain length is equal to the time domain resource length that corresponds to one of the K transmission occasions and that is notified by using the control information (for example, all the K transmission occasions are short transmission occasions obtained through splitting because the time-frequency resource crosses the slot boundary or crosses the uplink/downlink symbol boundary, and a time domain length of any short transmission occasion is less than the time domain length of the virtual target transmission occasion), the terminal device still determines the TBS of the first data packet based on the virtual target transmission occasion corresponding to the time domain resource length that corresponds to one transmission occasion and that is notified by using the control information, instead of determining the TBS of the first data packet based on a quantity of valid REs included in a transmission occasion actually included in the K transmission occasions. A method for determining the quantity of valid REs included in the virtual target transmission occasion is similar to the method for determining the quantity of valid REs in the first transmission occasion, the second transmission occasion, the third transmission occasion, or the fourth transmission occasion, and details are not described again.

It should be understood that the virtual target transmission occasion is also referred to as the nominal transmission occasion.

Further, the quantity of repetitions is less than or equal to a first quantity-of-repeat-transmissions threshold (for example, the first quantity-of-repeat-transmissions threshold is 1); or the K transmission occasions do not include a transmission occasion other than the first transmission occasion and the second transmission occasion; or the K transmission occasions include the first transmission occasion and the second transmission occasion but do not include any fourth transmission occasion; or time domain resource lengths of the K transmission occasions are all less than the time domain resource length that corresponds to one transmission occasion and that is notified by using the control information. The fourth transmission occasion is a transmission occasion whose time domain resource length is equal to the time domain resource length that corresponds to one transmission occasion and that is notified by using the control information. That is, in any one of the foregoing cases, the target quantity of valid REs is the quantity of valid REs included in the virtual target transmission occasion.

It should be understood that a quantity of PRBs in the virtual target transmission occasion is equal to a quantity of PRBs that corresponds to the K transmission occasions. It should be understood that the valid REs in the virtual target transmission occasion do not include an RE notified as an overhead RE by the network device. When the overhead RE includes an RE used to carry a DMRS, a quantity of REs that corresponds to the DMRS in the virtual target transmission occasion may be determined based on information notified by the network device, such as information about a quantity of DMRSs and DMRS pattern information. When the overhead RE includes an RE used for other overheads, a quantity of other overhead REs in the virtual target transmission occasion may be determined based on overhead RE information notified by the network device by using higher layer signaling xOverhead.

Optionally, the target quantity of valid REs is a quantity of valid REs included in a reference target transmission occasion. The reference target transmission occasion is a transmission occasion used to transmit another data packet different from the first data packet, or the reference target transmission occasion is a transmission occasion corresponding to another HARQ process number different from a HARQ process number of the first data packet, or the reference target transmission occasion is a transmission occasion in another GF periodicity different from a GF periodicity in which the K transmission occasions are located, where both the GF periodicity in which the K transmission occasions are located and the another GF periodicity are GF periodicities notified by using the control information. Further, the reference target transmission occasion is determined according to a predefined or preconfigured criterion. For example, the reference target transmission occasion is a transmission occasion that is notified by using the control information and that includes a smallest quantity of valid REs or includes a largest quantity of valid REs in all the transmission occasions.

In another example, the terminal device determines the target quantity of valid REs based on the information that is about the quantity of repetitions and that is notified by the network device or based on the time domain resource information of the K transmission occasions. In other words, the target quantity of valid REs is associated with the information about the quantity of repetitions or the time domain resource information of the K transmission occasions. Specifically, the time domain resource information of the K transmission occasions includes information about a quantity of transmission occasions included in the K transmission occasions, and/or information about the time domain resource lengths of the K transmission occasions. Specifically, the information about the time domain resource lengths of the K transmission occasions includes: information about a time domain resource length of a specific transmission occasion included in the K transmission occasions, or information about the time domain resource length of each transmission occasion. The information about the time domain resource length of the specific transmission occasion included in the K transmission occasions includes, for example, whether the K transmission occasions include any fourth transmission occasion, where the fourth transmission occasion is a transmission occasion whose time domain resource length corresponds to the time domain resource length that corresponds to one transmission occasion and that is notified by using the control information; or includes, for example, that the specific transmission occasion included in the K transmission occasions is a transmission occasion with a longest time domain length in the K transmission occasions.

Optionally, when the quantity of repetitions is less than or equal to the first quantity-of-repeat-transmissions threshold (for example, the first quantity-of-repeat-transmissions threshold is 1), or when the K transmission occasions do not include a transmission occasion other than the first transmission occasion and the second transmission occasion, or when the K transmission occasions include the first transmission occasion and the second transmission occasion but do not include any fourth transmission occasion, or when the time domain resource lengths of the K transmission occasions are all less than (or a time domain resource length of the transmission occasion with the longest time domain length included in the K transmission occasions is less than) the time domain resource length that corresponds to one transmission occasion and that is notified by using the control information, the target quantity of valid REs is the sum of the quantity of valid REs included in the first transmission occasion and the quantity of valid REs included in the second transmission occasion, or the target quantity of valid REs is a sum of the quantities of valid REs included in the K transmission occasions. For example, if all the K transmission occasions are transmission occasions obtained through splitting because the time-frequency resource crosses the slot boundary or crosses the uplink/downlink symbol boundary, a time domain length of any one of the K transmission occasions is less than the time domain resource length that corresponds to one transmission occasion and that is notified by using the control information, and the sum of the quantities of valid REs included in the K transmission occasions may also be less than a sum of quantities of valid REs included in transmission occasions (for example, virtual target transmission occasions) corresponding to the time domain resource length that corresponds to one transmission occasion and that is notified by using the control information. Therefore, determining the TBS by using the sum of the quantities of valid REs included in the K transmission occasions can prevent the TBS from being excessively large and ensure reliability.

Alternatively, when the quantity of repetitions is less than or equal to the first quantity-of-repeat-transmissions threshold (for example, the first quantity-of-repeat-transmissions threshold is 1), or when the K transmission occasions do not include a transmission occasion other than the first transmission occasion and the second transmission occasion, or when the K transmission occasions include the first transmission occasion and the second transmission occasion but do not include any fourth transmission occasion, or when the time domain resource lengths of the K transmission occasions are all less than (or a time domain resource length of the transmission occasion with the longest time domain length included in the K transmission occasions is less than) the time domain resource length that corresponds to one transmission occasion and that is notified by using the control information, the target quantity of valid REs is the quantity of valid REs included in the target transmission occasion, and the target transmission occasion is the first transmission occasion or the second transmission occasion. For example, when the quantity of valid REs included in the first transmission occasion is greater than the quantity of valid REs included in the second transmission occasion, the target transmission occasion is the first transmission occasion. Similarly, if all the K transmission occasions are transmission occasions obtained through splitting because the time-frequency resource crosses the slot boundary or crosses the uplink/downlink symbol boundary, determining the TBS by using a quantity of valid REs included in one target transmission occasion included in the K transmission occasions can prevent the TBS from being excessively large and ensure reliability.

The fourth transmission occasion is a transmission occasion whose time domain resource length is equal to the time domain resource length that corresponds to one transmission occasion and that is notified by using the control information.

It should be understood that the time domain length of the fourth transmission occasion is equal to the time domain length of the nominal transmission occasion. The fourth transmission occasion may also be referred to as the nominal transmission occasion.

Optionally, when the quantity of repetitions is greater than the first quantity-of-repeat-transmissions threshold, or when the K transmission occasions include a transmission occasion (for example, the fourth transmission occasion) other than the first transmission occasion and the second transmission occasion, or when the K transmission occasions include at least one transmission occasion whose time domain resource length is greater than or equal to (or a time domain resource length of the transmission occasion with the longest time domain length included in the K transmission occasions is greater than or equal to) that of the fourth transmission occasion, the target quantity of valid REs is the quantity of valid REs included in the target transmission occasion, and the time domain resource length corresponding to the target transmission occasion is the time domain resource length that corresponds to one of the K transmission occasions and that is notified by using the control information, in other words, the target transmission occasion is the fourth transmission occasion. Further, the foregoing case further includes: The K transmission occasions further include at least one transmission occasion (for example, the first transmission occasion and/or the second transmission occasion) whose time domain resource length is less than that of the fourth transmission occasion. For example, if the K transmission occasions include at least one fourth transmission occasion, and a time domain resource length of the fourth transmission occasion is equal to the time domain resource length that corresponds to one transmission occasion and that is notified by using the control information, determining the TBS by using the quantity of valid REs included in the fourth transmission occasion whose time domain resource length is larger can ensure self-decoding, to improve transmission efficiency as much as possible while ensuring reliability.

In this embodiment of this application, in addition to the foregoing method 1 to method 3, the method for determining the target quantity of valid REs may further include the following method:

Method 4: Determine the target quantity of valid REs based on RV information on the K transmission occasions. In other words, the target quantity of valid REs is associated with the RV information on the K transmission occasions. Specifically, the target quantity of valid REs is the quantity of valid REs included in the target transmission occasion in the K transmission occasions or a sum of quantities of valid REs included in V transmission occasions in the K transmission occasions. The target transmission occasion or the V transmission occasions is/are determined based on the RV information on the K transmission occasions, in other words, the target transmission occasion or the V transmission occasions is/are associated with the RV information on the K transmission occasions.

In an example, the target quantity of valid REs is the quantity of valid REs included in the target transmission occasion in the K transmission occasions, and the target transmission occasion is a transmission occasion in the K transmission occasions that corresponds to a target RV. The target RV is an RV that is preconfigured by the network device or is predefined. For example, the target RV is an RV 0. In this case, the RV information on the K transmission occasions is represented as a correspondence between the target RV and the target transmission occasion. That the target transmission occasion corresponds to the target RV is notified by the network device to the terminal device. The RV preconfigured by the network device is also referred to as an RV configured by using signaling.

Considering that generally, the RV 0 is an RV in all RVs that includes a largest quantity of system information bits, determining the transmission occasion corresponding to the RV 0 as the target transmission occasion can ensure that the target transmission occasion corresponding to the RV 0 can be self-decoded. Further, the K transmission occasions can also be jointly self-decoded, thereby ensuring reliability. In comparison, if a transmission occasion corresponding to another RV is used as the target transmission occasion, a determined TBS of the first data packet may be excessively large. Consequently, the transmission occasion corresponding to the RV 0 cannot be self-decoded because a part of the system information bits are lost, and reliability of the K transmission occasions is affected.

Further, when a plurality of transmission occasions included in the K transmission occasions correspond to the target RV, the terminal device determines, based on a preconfiguration of the network device or a predefinition, one of the plurality of transmission occasions as the target transmission occasion. For example, the target transmission occasion is a transmission occasion that is in the plurality of transmission occasions corresponding to the target RV and that includes a smallest quantity of valid REs or includes a largest quantity of valid REs.

In another example, the target quantity of valid REs is the sum of the quantities of valid REs included in the V transmission occasions in the K transmission occasions, where V is a positive integer greater than or equal to 1 and less than or equal to K (or M). The V transmission occasions are determined based on an RV pattern (also referred to as an RV sequence) corresponding to the K transmission occasions, in other words, are associated with an RV pattern corresponding to the K transmission occasions. The RV pattern corresponding to the K transmission occasions may be a set of RVs corresponding to all the transmission occasions in the K transmission occasions. That is, the K (or M) transmission occasions correspond to K (or M) RVs, and the RV pattern is a set including the K (or M) RVs. Alternatively, the RV pattern corresponding to the K transmission occasions may be an RV sequence notified by the network device (for example, by using higher layer signaling repK-RV), where a quantity of RVs included in the RV sequence may be equal to or not equal to K (or M). In this case, the RV information on the K transmission occasions is represented as the RV pattern corresponding to the K transmission occasions. The RV pattern corresponding to the K transmission occasions is notified by the network device to the terminal device.

Optionally, when the RV pattern corresponding to the K transmission occasions is a first RV pattern, the target quantity of valid REs is a quantity of valid REs included in one target transmission occasion in the K transmission occasions, or the target quantity of valid REs is a sum of quantities of valid REs included in V1 transmission occasions in the K transmission occasions, where V1 is a positive integer greater than or equal to 1 and less than K (or M). Specifically, a determining criterion of a value of V1 or the V1 transmission occasions may be preconfigured by the network device or may be predefined. Specifically, a method for determining the target transmission occasion in the K transmission occasions is described above, and details are not described again.

Further, the first RV pattern does not include a non-self-decoding RV. Specifically, the first RV pattern includes the RV 0 but does not include another RV, or the first RV pattern includes the RV 0 and an RV 3 but does not include another RV. For example, the first RV pattern is RVs 0000 or RVs 0303.

Optionally, when the RV pattern corresponding to the K transmission occasions is a second RV pattern, the target quantity of valid REs is the sum of the quantities of valid REs included in the K transmission occasions, or the target quantity of valid REs is a sum of quantities of valid REs included in V2 transmission occasions in the K transmission occasions, where V2 is a positive integer greater than V1 and less than or equal to K (or M). Specifically, a determining criterion of a value of V2 or the V2 transmission occasions may be preconfigured by the network device or may be predefined.

Further, the second RV pattern includes a non-self-decoding RV. Specifically, the second RV pattern includes an RV other than the RV 0, or the second RV pattern includes an RV other than the RV 0 and an RV 3 (for example, includes an RV 2 and/or an RV 1). For example, the second RV pattern is RVs 0303 or RVs 0231.

It is considered that for the second RV pattern including the non-self-decoding RV, even if one transmission occasion (for example, a transmission occasion corresponding to the RV 0) in the K transmission occasions cannot carry all the system information bits, the system information bits can be recovered by using another transmission occasion corresponding to another RV, so that the network device correctly receives all the system information bits. Therefore, the TBS of the first data packet may be determined based on the sum of the quantities of valid REs included in the K transmission occasions or the sum of the quantities of valid REs included in V2 transmission occasions, to improve transmission efficiency and reliability, where V2 is larger. On the other hand, for the first RV pattern that does not include the non-self-decoding RV, if the TBS of the first data packet is determined based on the sum of the quantities of valid REs included in the K transmission occasions or a sum of quantities of valid REs included in a relatively large quantity of transmission occasions, the TBS may be excessively large. Consequently, one transmission occasion (for example, a transmission occasion corresponding to the RV 0) in the K transmission occasions cannot carry all the system information bits, that is, a part of the system information bits are lost, and another transmission occasion does not include the lost system information bits or does not include encoded bits for the lost system information bits (for example, the another transmission occasion also corresponds to the RV 0, and therefore the same system information bits are lost). Consequently, all the system information bits cannot be recovered. Therefore, for the first RV pattern, the TBS may be determined based on one target transmission occasion or V1 transmission occasions, to avoid reliability deterioration caused by an excessively large calculated TBS, where V1 is smaller. For example, determining the TBS by using one target transmission occasion can ensure that the target transmission occasion can be self-decoded. Further, the K transmission occasions can also be jointly self-decoded, thereby ensuring reliability.

In addition to determining the TBS of the first data packet, the method in this embodiment of this application may be further used to determine other transport format information, for example, frequency hopping information or RV pattern information of the K transmission occasions, as described in a method 5.

Method 5: The network device configures an association relationship between a time domain resource pattern and transport format information, where the association relationship is used to determine a transport format for data transmission of the first data packet. The transport format information includes a transmission occasion set used to determine the TBS corresponding to the first data packet, and/or a transmission occasion set on which frequency hopping is to be performed and that is in the K transmission occasions, and/or the RV pattern corresponding to the K transmission occasions.

It should be understood that the association relationship is also referred to as a mapping relationship.

Optionally, the terminal device receives first configuration information sent by the network device, where the first configuration information is used to configure a first association relationship, and the first association relationship includes an association relationship between a time domain resource pattern of a transmission occasion used to perform data transmission on a data packet and a transmission occasion set used to determine a TBS. The target quantity of valid REs is a sum of quantities of valid REs included in P transmission occasions in the K transmission occasions, where P is a positive integer greater than or equal to 1 and less than or equal to K (or M). The P transmission occasions are determined based on the first association relationship and the time domain resource information that is notified by the network device and that is of the transmission occasion used to perform data transmission on the first data packet.

It should be understood that, that the target quantity of valid REs is a sum of quantities of valid REs included in P transmission occasions in the K transmission occasions, where P is a positive integer greater than or equal to 1 and less than or equal to K (or M) may also be referred to as: The target quantity of valid REs is a quantity of valid REs included in the target transmission occasion, the target transmission occasion is the P transmission occasions in the K transmission occasions, and the quantity of valid REs included in the target transmission occasion is a sum of quantities of valid REs included in the target transmission occasions, where P is a positive integer less than or equal to K (or M).

It should be understood that, that the terminal device receives first configuration information sent by the network device is also referred to as: The terminal device receives the first configuration information from the network device.

It should be understood that the time domain resource information that is notified by the network device and that is of the transmission occasion used to perform data transmission on the first data packet is also referred to as time domain resource information that is notified by using signaling and that is of the transmission occasion used to perform data transmission on the first data packet.

It should be understood that, that the P transmission occasions are determined based on the first association relationship and the time domain resource information that is notified by the network device and that is of the transmission occasion used to perform data transmission on the first data packet is also referred to as: The P transmission occasions correspond to the first association relationship and the time domain resource information that is notified by using the signaling and that is of the transmission occasion used to perform data transmission on the first data packet.

Correspondingly, the network device sends the first configuration information to the terminal device.

Further, the first association relationship includes association relationships between a plurality of time domain resource patterns of transmission occasions used to perform data transmission on a data packet and a plurality of transmission occasion sets used to determine a TBS, and any one of the plurality of time domain resource patterns of the transmission occasions used to perform data transmission on a data packet corresponds to one of the plurality of transmission occasion sets used to determine a TBS. That the P transmission occasions are determined based on the first association relationship and the time domain resource information that is notified by the network device and that is of the transmission occasion used to perform data transmission on the first data packet includes: The time domain resource information of the transmission occasion used to perform data transmission on the first data packet corresponds to a first time domain resource pattern in the plurality of time domain resource patterns of the transmission occasions used to perform data transmission on a data packet, and the P transmission occasions are a transmission occasion set that corresponds to the first time domain resource pattern and that is in the plurality of transmission occasion sets used to determine a TBS.

It should be understood that the P transmission occasions are also referred to as a transmission occasion set used to determine the TBS corresponding to the first data packet.

Correspondingly, the network device sends the first configuration information to the terminal device.

Specifically, the first configuration information is higher layer signaling.

Optionally, the terminal device receives second configuration information sent by the network device, where the second configuration information is used to configure a second association relationship, and the second association relationship includes an association relationship between a time domain resource pattern of a transmission occasion used to perform data transmission on a data packet and a transmission occasion set on which frequency hopping (frequency hopping) is to be performed. The terminal device determines, based on the second association relationship and the time domain resource information that is notified by the network device and that is of the transmission occasion used to perform data transmission on the first data packet, the transmission occasion set on which frequency hopping is to be performed and that is in the K transmission occasions.

It should be understood that, that the terminal device receives second configuration information sent by the network device is also referred to as: The terminal device receives the second configuration information from the network device.

It should be understood that, that the terminal device determines, based on the second association relationship and the time domain resource information that is notified by the network device and that is of the transmission occasion used to perform data transmission on the first data packet, the transmission occasion set on which frequency hopping is to be performed and that is in the K transmission occasions is also referred to as that the transmission occasion set on which frequency hopping is to be performed and that is in the K transmission occasions corresponds to the second association relationship and the time domain resource information that is notified by the network device and that is of the transmission occasion used to perform data transmission on the first data packet; or is referred to as that the transmission occasion set on which frequency hopping is to be performed and that is in the K transmission occasions is obtained by using the second association relationship and the time domain resource information that is notified by the network device and that is of the transmission occasion used to perform data transmission on the first data packet.

It should be understood that, that the second association relationship includes an association relationship between a time domain resource pattern of a transmission occasion used to perform data transmission on a data packet and a transmission occasion set on which frequency hopping is to be performed may alternatively be replaced with that the second association relationship includes an association relationship between a time domain resource pattern of a transmission occasion used to transmit uplink information and a transmission occasion set on which frequency hopping is to be performed.

It should be understood that the time domain resource information that is notified by the network device and that is of the transmission occasion used to perform data transmission on the first data packet may alternatively be replaced with time domain resource information that is notified by the network device and that is of a transmission occasion used to transmit first uplink information.

Correspondingly, the network device sends the second configuration information to the terminal device.

Further, the second association relationship includes association relationships between a plurality of time domain resource patterns of transmission occasions used to perform data transmission on a data packet and a plurality of transmission occasion sets on which frequency hopping is to be performed, and any one of the plurality of time domain resource patterns of the transmission occasions used to perform data transmission on a data packet corresponds to one of the plurality of transmission occasion sets on which frequency hopping is to be performed. That the terminal device determines, based on the second association relationship and the time domain resource information that is notified by the network device and that is of the transmission occasion used to perform data transmission on the first data packet, the transmission occasion set on which frequency hopping is to be performed and that is in the K transmission occasions includes: The time domain resource information of the transmission occasion used to perform data transmission on the first data packet corresponds to a second time domain resource pattern in the plurality of time domain resource patterns of the transmission occasions used to perform data transmission on a data packet, and the transmission occasion set on which frequency hopping is to be performed and that is in the K transmission occasions is a transmission occasion set corresponding to the second time domain resource pattern in the plurality of transmission occasion sets on which frequency hopping is to be performed.

It should be understood that the transmission occasion set on which frequency hopping is to be performed and that is in the K transmission occasions is also referred to as a frequency hopping transmission occasion set.

Further, the terminal device performs frequency hopping processing when performing data transmission on the first data packet on any transmission occasion in the frequency hopping transmission occasion set. Correspondingly, data transmission that is performed by the terminal device on the first data packet and that is received by the network device on the any transmission occasion in the frequency hopping transmission occasion set is frequency hopping data transmission.

Correspondingly, the network device sends the second configuration information to the terminal device.

Specifically, the second configuration information is higher layer signaling.

It should be understood that the frequency hopping or frequency hopping processing herein is intra-transmission-occasion frequency hopping, which is also referred to as intra-PUSCH frequency hopping (Intra-PUSCH frequency hopping) or intra-slot frequency hopping (Intra-slot frequency hopping). In other words, for any transmission occasion in the frequency hopping transmission occasion set, information on a first part of a time domain resource included in the transmission occasion is sent on a first frequency domain resource, and information on a second part of the time domain resource included in the transmission occasion is sent on a second frequency domain resource. A physical resource corresponding to the first part of the time domain resource and the first frequency domain resource is referred to as a first hop, and a physical resource corresponding to the second part of the time domain resource and the second frequency domain resource is referred to as a second hop. Further, the first part of the time domain resource is a time domain resource consecutive in terms of time, and the second part of the time domain resource is a time domain resource consecutive in terms of time. It should be understood that the first frequency domain resource is different from the second frequency domain resource. For example, the first frequency domain resource and the second frequency domain resource do not overlap or do not completely overlap in frequency domain. For another example, a frequency domain start point (namely, a start PRB) of the first frequency domain resource is different from a start point (namely, a start PRB) of the second frequency domain resource.

It should be understood that frequency hopping is not performed on any transmission occasion other than the frequency hopping transmission occasion set in the K transmission occasions. Herein, that frequency hopping is not performed on the transmission occasion means that all time domain resources included in the transmission occasion correspond to a same frequency domain resource.

Optionally, the terminal device receives third configuration information sent by the network device, where the third configuration information is used to configure a third association relationship, and the third association relationship includes an association relationship between a time domain resource pattern of a transmission occasion used to perform data transmission on a data packet and an RV pattern corresponding to the transmission occasion. The terminal device determines, based on the third association relationship and the time domain resource information that is notified by the network device and that is of the transmission occasion used to perform data transmission on the first data packet, an RV pattern (referred to as a target RV pattern) corresponding to the K transmission occasions.

It should be understood that, that the terminal device receives third configuration information sent by the network device is also referred to as: The terminal device receives the third configuration information from the network device.

It should be understood that, that the terminal device determines, based on the third association relationship and the time domain resource information that is notified by the network device and that is of the transmission occasion used to perform data transmission on the first data packet, an RV pattern corresponding to the K transmission occasions is also referred to as that the RV pattern corresponding to the K transmission occasions corresponds to the third association relationship and the time domain resource information that is notified by the network device and that is of the transmission occasion used to perform data transmission on the first data packet; or is referred to as that the RV pattern corresponding to the K transmission occasions is obtained by using the third association relationship and the time domain resource information that is notified by the network device and that is of the transmission occasion used to perform data transmission on the first data packet.

Correspondingly, the network device sends the third configuration information to the terminal device.

Further, the third association relationship includes association relationships between a plurality of time domain resource patterns of transmission occasions used to perform data transmission on a data packet and a plurality of RV patterns, and any one of the plurality of time domain resource patterns of the transmission occasions used to perform data transmission on a data packet corresponds to one of the plurality of RV patterns. That the terminal device determines, based on the third association relationship and the time domain resource information that is notified by the network device and that is of the transmission occasion used to perform data transmission on the first data packet, an RV pattern corresponding to the K transmission occasions includes: The time domain resource information of the transmission occasion used to perform data transmission on the first data packet corresponds to a third time domain resource pattern in the plurality of time domain resource patterns of the transmission occasions used to perform data transmission on a data packet, and the RV pattern corresponding to the K transmission occasions is an RV pattern corresponding to the third time domain resource pattern in the plurality of RV patterns.

Further, when performing data transmission on the first data packet on any transmission occasion in the K transmission occasions, the terminal device uses an RV that corresponds to the transmission occasion and that is in the RV pattern. Correspondingly, an RV used by the network device to receive, on any transmission occasion in the K transmission occasions, data transmission performed by the terminal device on the first data packet is an RV that corresponds to the transmission occasion and that is in the RV pattern. In other words, the network device receives, on at least one of the K transmission occasions, the first data packet sent by the terminal device, where the at least one of the K transmission occasions corresponds to the target RV pattern.

It should be understood that the RV pattern corresponding to the K transmission occasions is also referred to as an RV corresponding to each of the K transmission occasions.

Correspondingly, the network device sends the third configuration information to the terminal device.

Specifically, the third configuration information is higher layer signaling.

It should be understood that any two of the first configuration information, the second configuration information, and the third configuration information may be same configuration information, or may be different configuration information.

Further, the time domain resource pattern of the transmission occasion used to perform data transmission on the data packet corresponds to one of the following plurality of pieces of information or a combination of at least two pieces of information:

(1) Time Domain Resource Information of the Transmission Occasion

Specifically, the time domain resource information of the transmission occasion includes a time domain resource of one transmission occasion (including a time domain start point and a time domain length of the transmission occasion) or time domain resources of a plurality of transmission occasions (including a time domain start point and a time domain length of each of the plurality of transmission occasions) used to perform data transmission on one data packet. In this way, the terminal device may determine, based on the time domain resource information of the transmission occasion, a time domain resource pattern of one or more transmission occasions for repeatedly transmitting one data packet, where the time domain resource pattern includes a time domain start point and a time domain length of each of the one or more transmission occasions. It should be understood that the time domain resource of one transmission occasion is also referred to as the time domain resource of the nominal transmission occasion.

Further, when the time domain resource information of the transmission occasion includes the time domain resource of one transmission occasion, the time domain resource information of the transmission occasion further includes the quantity of repetitions. In this way, the terminal device may determine, based on the time domain resource of one transmission occasion and the quantity of repetitions, a time domain resource pattern of one or more transmission occasions for repeatedly transmitting one data packet. A definition of the quantity of repetitions is described above.

Specifically, the time domain resource information of the transmission occasion is configured by using higher layer signaling (for example, a pusch-TimeDomainAllocationList field). For example, a table is configured by using the higher layer signaling, and the table includes at least one row. Each of the at least one row represents a time domain resource of one transmission occasion (including a time domain start point and a time domain length of the time domain resource of the transmission occasion) or time domain resources of a plurality of transmission occasions (including a time domain start point and a time domain length of the time domain resource of each of the plurality of transmission occasions) used to perform data transmission on one data packet.

(2) GF Periodicity Information

Specifically, the GF periodicity information includes a length of a GF periodicity and/or start moment information of the GF periodicity. For example, a start moment of the GF periodicity includes a start boundary of the GF periodicity and/or a relative start moment that is of a GF resource in the GF periodicity and that is in the GF periodicity. It is considered that when the K transmission occasions are configured by the network device to be used to perform data transmission in a GF mode, the terminal device determines an available time domain resource based on the GF periodicity information notified by the network device. For example, a time domain resource that can be used for data transmission repeatedly appears in each periodicity, and starts from the start moment of the GF periodicity.

(3) Uplink/Downlink Symbol Direction Information

Specifically, the uplink/downlink symbol direction information is specifically used to notify a time domain symbol. Specifically, an uplink/downlink symbol direction may be "downlink", "uplink", or "flexible". It should be understood that the network device may notify the uplink/downlink symbol direction information by using higher layer signaling and/or physical layer signaling. For example, the higher layer signaling includes the TDD-UL-DL-Configuration-Common or TDD-UL-DL-ConfigDedicated field, and the physical layer signaling is DCI corresponding to the format 2_0. Considering that a time domain symbol used by the terminal device to send uplink information cannot be a time domain symbol notified as "downlink" or "flexible" by the network device, when the terminal device determines the time domain resource pattern of the K transmission occasions, in addition to (1) and/or (2) above, the uplink/downlink symbol direction notified by the network device is further considered. For example, when a transmission occasion determined based on (1) and/or (2) collides with a "downlink" or "flexible" symbol notified by the network device, the transmission occasion on which the collision occurs is dropped. Alternatively, when the time domain resources corresponding to the K transmission occasions are determined, a "downlink" or "flexible" symbol notified by the network device is skipped.

For example, the time domain resource pattern of the transmission occasion used to perform data transmission on the data packet corresponds to (1), (2), or (3) above.

For another example, the time domain resource pattern of the transmission occasion used to perform data transmission on the data packet corresponds to a combination of at least two of the foregoing pieces of information, including: a combination of (1) and (2), a combination of (1) and (3), a combination of (2) and (3), or a combination of (1), (2), and (3).

It should be understood that, because the information in (1), (2), or (3) above may be used to notify a plurality of different statuses, one piece of information in (1), (2), and (3) or a combination of at least two pieces of information in (1), (2), and (3) may correspond to a plurality of time domain resource patterns (namely, a plurality of time domain resource patterns of transmission occasions used to perform data transmission on a data packet). In this way, for each of the plurality of time domain resource patterns, the network device may configure a transmission occasion set used to determine a TBS (for example, a transmission occasion that includes valid REs whose quantity is used to determine the TBS or transmission occasions that include valid REs whose total quantity is used to determine the TBS), namely, the first association relationship; or configure a transmission occasion set on which frequency hopping is to be performed (for example, a transmission occasion/transmission occasions on which frequency hopping processing is to be performed), namely, the second association relationship; or configure an RV pattern corresponding to the transmission occasion, namely, the third association relationship.

Further, for any one of the foregoing plurality of time domain resource patterns, the transmission occasion set that is configured by the network device and that is used to determine the TBS is a subset of a transmission occasion set determined based on the time domain resource pattern. Similarly, for any one of the foregoing plurality of time domain resource patterns, the transmission occasion set that is configured by the network device and on which frequency hopping is to be performed is a subset of a transmission occasion set determined based on the time domain resource pattern.

Correspondingly, after the terminal device receives the time domain resource information that is notified by the network device and that is of the transmission occasion used to perform data transmission on the first data packet, the time domain resource information may be mapped to a specific time domain resource pattern in the foregoing plurality of time domain resource patterns. Optionally, the time domain resource information is associated by using the specific time domain resource pattern in the foregoing plurality of time domain resource patterns (by using the first association relationship) with a specific transmission occasion set used to determine the TBS of the data packet. Therefore, the terminal device may obtain, through index, the transmission occasion set used to determine the TBS corresponding to the first data packet. Optionally, the time domain resource information is associated by using the specific time domain resource pattern in the foregoing plurality of time domain resource patterns (by using the second association relationship) with a specific transmission occasion set on which frequency hopping is to be performed. Therefore, the terminal device may obtain, through index, the transmission occasion set on which frequency hopping is to be performed and that is in the K transmission occasions. Optionally, the time domain resource information is associated by using the specific time domain resource pattern in the foregoing plurality of time domain resource patterns (by using the third association relationship) with a specific RV pattern. Therefore, the terminal device may obtain, through index, the RV pattern corresponding to the K transmission occasions.

Similarly, the time domain resource information that is notified by the network device and that is of the transmission occasion used to perform data transmission on the first data packet includes one of the following plurality of pieces of information or a combination of at least two pieces of information, for example, (i), (ii), (iii), a combination of (i) and (ii), a combination of (i) and (iii), a combination of (ii) and (iii), or a combination of (i), (ii), and (iii):

(i) Time Domain Resource Information that is Notified by Using the Control Information and that is of the Transmission Occasion Used to Transmit the First Data Packet It should be understood that the time domain resource information that is notified by using the control information and that is of the transmission occasion used to transmit the first data packet includes time domain resource information that is of one transmission occasion and that is notified by using the control information (including a time domain start point and a time domain length of the transmission occasion) or time domain resource information that is notified by using the control information and that is of a plurality of transmission occasions (including a time domain start point and a time domain length of each of the plurality of transmission occasions) used to perform data transmission on the first data packet. Specifically, a time domain resource of the one transmission occasion or time domain resources of the plurality of transmission occasions used to perform data transmission on the first data packet is/are notified by using a field in the control information, for example, a Time domain resource assignment field in physical layer signaling, or a time Domain Allocation field in higher layer signaling.

It should be understood that the time domain resources corresponding to the K transmission occasions are obtained by using the time domain resource information that is of one transmission occasion and that is notified by using the control information or the time domain resource information that is notified by using the control information and that is of the plurality of transmission occasions used to perform data transmission on the first data packet. For example, the time domain resources corresponding to the K transmission occasions correspond to a time domain resource that is of one transmission occasion and that is notified by using the control information, or correspond to time domain resources notified by using the control information that are of the plurality of transmission occasions used to perform data transmission on the first data packet. Alternatively, the time domain resources corresponding to the K transmission occasions are obtained by using a time domain resource that is of one transmission occasion and that is notified by using the control information, or by using time domain resources notified by using the control information that are of the plurality of transmission occasions used to perform data transmission on the first data packet. For example, the time domain resources corresponding to the K transmission occasions are further obtained based on (ii) and/or (iii).

(ii) GF periodicity information notified by the network device. For a specific notification method, refer to the descriptions in (2).

(iii) Uplink/downlink symbol direction information notified by the network device. For a specific notification method, refer to the descriptions in (3).

It should be understood that the first association relationship, the second association relationship, or the third association relationship may be represented as a table configured by the network device. Specifically, the network device configures a table. The table includes at least one row, and any row in the at least one row represents a time domain resource pattern of a transmission occasion used to perform data transmission on a data packet, and for example, may be one piece of information in (1), (2), and (3) or a combination of at least two pieces of information. The row is used to obtain, through index, a transmission occasion set used to determine a TBS, and/or the row is used to obtain, through index, a transmission occasion set on which frequency hopping is to be performed, and/or the row is used to obtain, through index, an RV pattern.

For example, the table is a table configured by the network device by using a pusch-TimeDomainAllocation-List field in higher layer signaling.

For example, any one of the at least one row included in the table includes the information in (1), and the network device notifies, by using (i), the time domain resource information of the transmission occasion used to perform data transmission on the first data packet. Specifically, an index number is notified by using the control information, and is used to obtain one row in the table through index. The terminal device determines, based on the index number, a transmission occasion set that is of a TBS and that corresponds to the row in the table, and/or a transmission occasion set that corresponds to the row and on which frequency hopping is to be performed, and/or an RV pattern corresponding to the row.

For another example, any one of the at least one row included in the table includes the information in (1), (2), and (3). The network device notifies, by using (i), (ii), and (iii), the time domain resource information of the transmission occasion used to perform data transmission on the first data packet. Therefore, after receiving the notification information in (i), (ii), and (iii), the terminal device may correspondingly determine a row in the table, to obtain, through index, a transmission occasion set that is of a TBS and that corresponds to the row, and/or a transmission occasion set that corresponds to the row and on which frequency hopping is to be performed, and/or an RV pattern corresponding to the row.

More specifically, anytime domain resource pattern of a transmission occasion used to perform data transmission on a data packet includes time domain resource information of one or more transmission occasions. Optionally, a reference transmission occasion in the one or more transmission occasions corresponds to a first mark, and the first mark is used to mark whether the reference transmission occasion is counted towards a transmission occasion set used to determine a TBS. Specifically, when the first mark is a first target mark value, the reference transmission occasion is counted towards the transmission occasion set used to determine the TBS. For example, the first target mark value is "1". When the first mark is "1", it indicates that the reference transmission occasion corresponding to the mark is counted towards the transmission occasion set used to determine the TBS. When the first mark is "0", it indicates that the reference transmission occasion corresponding to the mark is not counted towards the transmission occasion set used to determine the TBS. Optionally, the reference transmission occasion corresponds to a second mark, and the second mark is used to mark whether the reference transmission occasion is counted towards a transmission occasion set on which frequency hopping is to be performed. Specifically, when the second mark is a second target mark value, the reference transmission occasion is counted towards the transmission occasion set on which frequency hopping is to be performed. For example, the second target mark value is "1". When the second mark is "1", it indicates that the reference transmission occasion corresponding to the mark is counted towards the transmission occasion set on which frequency hopping is to be performed. When the second mark is "0", it indicates that the reference transmission occasion corresponding to the mark is not counted towards the transmission occasion set on which frequency hopping is to be performed. Further, the reference transmission occasion is any one of the one or more transmission occasions. After determining, by using one piece of information in (i), (ii), and (iii) or a combination of at least two pieces of information, the time domain resource pattern of the transmission occasion used to perform data transmission on the first data packet, the terminal device may determine, based on a first mark corresponding to each of the one or more transmission occasions, the transmission occasion set (including all transmission occasions whose first marks are the first target mark value in the one or more transmission occasions) used to determine the TBS of the first data packet; or determine, based on a second mark corresponding to each of the one or more transmission occasions, the transmission occasion set (including all transmission occasions whose second marks are the second target mark value in the one or more transmission occasions) on which frequency hopping is to be performed.

Further, the table is further used to notify the time domain resource information of the K transmission occasions. Specifically, the table includes at least one row, and any one of the at least one row represents a time domain resource pattern of a transmission occasion used to perform data transmission on a data packet, and the time domain resource pattern may be used to determine time domain resources of one or more transmission occasions for data transmission of one data packet. For example, the table is a table configured by the network device by using a pusch-TimeDomainAllocationList field in higher layer signaling. The network device notifies one row in the table by using the field (for example, the Time domain resource assignment field or the time Domain Allocation field) in the control information, so that the terminal device may determine, based on a time domain resource pattern corresponding to the row, the time domain resources corresponding to the K transmission occasions, and obtain the transmission occasion set in the K transmission occasions that is used to determine the TBS corresponding to the first data packet, and/or the transmission occasion set on which frequency hopping is to be performed and that is in the K transmission occasions, and/or the RV pattern corresponding to the K transmission occasions.

That is, the time domain resource information corresponding to the K transmission occasions and information about the transmission occasion set used to determine the TBS corresponding to the first data packet are jointly encoded into a same control information field; and/or the time domain resource information corresponding to the K transmission occasions and information about the transmission occasion set on which frequency hopping is to be performed and that is in the K transmission occasions are jointly encoded into a same control information field; and/or the time domain resource information corresponding to the K transmission occasions and information about the RV pattern corresponding to the K transmission occasions are jointly encoded into a same control information field. For example, the same control information field is the Time domain resource assignment field or the time Domain Allocation field in the control information.

For example, Table 1 is a table configured by the network device by using higher layer signaling, and includes four rows. Each row in the table includes information about time domain resources (also referred to as SLIVs, including time domain start points and time domain lengths) corresponding to one or more transmission occasions. In addition, each of one or more transmission occasions represented by any row in the table corresponds to one first mark, and the first mark is used to notify whether the transmission occasion is counted towards the transmission occasion set used to determine the TBS. For example, for an index number 1, a transmission occasion TO #1 is included, and a first mark "1" represents that the TO #1 is counted towards the transmission occasion set used to determine the TBS. For an index number 2, two transmission occasions, namely, a TO #1 and a TO #2, are included, a first mark "1" of the TO #1 represents that the TO #1 is counted towards the transmission occasion set used to determine the TBS, and a first mark "o" of the TO #2 represents that the TO #2 is not counted towards the transmission occasion set used to determine the TBS. If the control information is used to notify that an index number is 3, the terminal device may obtain, through index, the time domain resource pattern of the K transmission occasions used to perform data transmission on the first data packet, namely, time domain resources of a TO #1 to a TO #4. The terminal device may repeatedly transmit the first data packet for four times on the four TOs. On the other hand, the index number is further used to obtain, through index, the transmission occasion set used to determine the TBS corresponding to the first data packet, where the transmission occasion set includes {TO #1, TO #4}. Therefore, the terminal device determines, based on a sum of quantities of valid REs in the TO #1 and the TO #4, the TBS corresponding to the first data packet, then generates the first data packet, and repeatedly transmits the first data packet for four times on the four TOs.

TABLE 1

| Index number | Time domain resources of one or more TOs | First mark |
| --- | --- | --- |
| 1 | TO #1: S = 1, L = 8 | TO #1: 1 |
| 2 | TO #1: S = 1, L = 4; TO #2: S = 5, L = 2 | TO #1: 1; TO #2: 0 |
| 3 | TO #1: S = 1, L = 2; TO #2: S = 3, L = 2; TO #3: S = 5, L = 2; TO #4: S = 7, L = 2 | TO #1: 1; TO #2: 0; TO #3: 0; TO #4: 1 |
| 4 | TO #1: S = 1, L = 4; TO #2: S = 5, L = 8 | TO #1: 1; TO #2: 1 |

In addition, steps 601 to 603 may alternatively be replaced with the following steps:

Step 601a (replacing step 601): The network device sends control information to the terminal device. Correspondingly, step 602a (replacing step 602): The terminal device receives the control information from the network device. The control information is used to notify information about a time-frequency resource for transmitting a first data packet, the time-frequency resource includes K transmission occasions, and each of the K transmission occasions is used to perform one data transmission on the first data packet.

Step 603a (replacing step 603): The terminal device determines a TBS corresponding to the first data packet.

Further, the terminal device determines, based on a target quantity of valid resource elements REs, the TBS corresponding to the first data packet, where the target quantity of valid REs is a quantity of valid REs included in at least one of the K transmission occasions.

Further, the target quantity of valid REs is a quantity of all valid REs included in the K transmission occasions; or the target quantity of valid REs is a quantity of all valid REs included in P transmission occasions in the K transmission occasions, where P is a positive integer less than K; or the target quantity of valid REs is an average quantity of valid REs included in each of the K transmission occasions; or the target quantity of valid REs is a quantity of valid REs included in a target transmission occasion in the K transmission occasions; or the target quantity of valid REs is a quantity of valid REs included in a virtual target transmission occasion; or the target quantity of valid REs is a quantity of valid REs included in a reference target transmission occasion.

In addition, steps 601 to 605 may alternatively be replaced with the following steps:

Step 601b (replacing step 601): The network device sends control information to the terminal device. Correspondingly, step 602b (replacing step 602): The terminal device receives the control information from the network device. The control information is used to notify information about a time-frequency resource for transmitting first uplink information, the time-frequency resource includes K transmission occasions, and each of the K transmission occasions is used to transmit the first uplink information. Step 603b (replacing step 603): The terminal device determines the first uplink information on which information transmission is to be performed on at least one of the K transmission occasions.

Step 604b (replacing step 604): The terminal device transmits the first uplink information on the at least one of the K transmission occasions.

Step 605b (replacing step 605): The network device receives, on the at least one of the K transmission occasions, the first uplink information sent by the terminal device.

The first uplink information may include the first data packet, or may include the UCI but not include the UL-SCH information.

The foregoing mainly describes, from the perspective of interaction between the network device and the terminal device, the solutions provided in the embodiments of this application. It may be understood that, to implement the foregoing functions, the network device or the terminal device may include corresponding hardware structures and/or software modules for performing the functions. A person skilled in the art should be easily aware that, in combination with units and algorithm steps of the examples described in the embodiments disclosed in this specification, the embodiments of this application may be implemented by hardware or a combination of hardware and computer software. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of this application.

Figure 12:
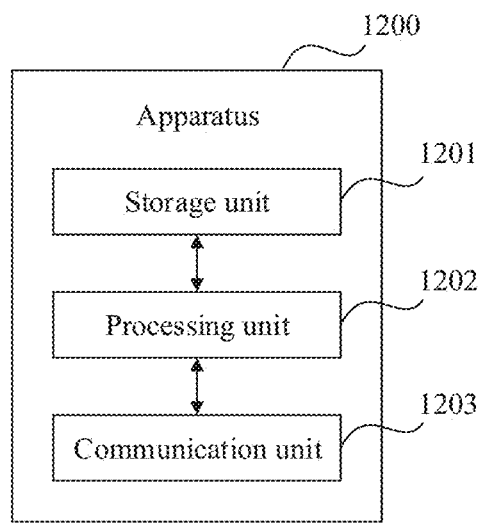
FIG. 12 is a possible example block diagram of an apparatus according to an embodiment of this application.

When an integrated unit (module) is used, FIG. 12 is a possible example block diagram of an apparatus according to an embodiment of this application. The apparatus 1200 may exist in a form of software. The apparatus 1200 may include a processing unit 1202 and a communication unit 1203. The processing unit 1202 is configured to control and manage an action of the apparatus 1200. The communication unit 1203 is configured to support the apparatus 1200 in communicating with another network entity. Optionally, the communication unit 1203 is also referred to as a transceiver unit, and may include a receiving unit and/or a sending unit, which are respectively configured to perform a receiving operation and a sending operation. The apparatus 1200 may further include a storage unit 1201, configured to store program code and/or data of the apparatus 1200.

The processing unit 1202 may be a processor or a controller, and may implement or execute various examples of logical blocks, modules, and circuits described with reference to content disclosed in the embodiments of this application. The communication unit 1203 may be a communication interface, a transceiver, a transceiver circuit, or the like, where the communication interface is a general name, and may include a plurality of interfaces in a specific implementation. The storage unit 1201 may be a memory.

The apparatus 1200 may be the terminal device in any one of the foregoing embodiments, or may be a semiconductor chip disposed in the terminal device. The processing unit 1202 may support the apparatus 1200 in performing actions of the terminal device in the foregoing method examples. Alternatively, the processing unit 1202 mainly performs internal actions of the terminal in the method examples, and the communication unit 1203 may support communication between the apparatus 1200 and a network device. For example, the processing unit 1202 is configured to perform step 603, step 603a, or step 603b in FIG. 6. The communication unit 1202 is configured to perform step 602 (or step 602a or step 602b) and step 604 (or step 604b) in FIG. 6.

Specifically, in an embodiment, the communication unit (which may be specifically the receiving unit) is configured to receive control information from the network device, where the control information is used to notify information about a time-frequency resource for transmitting a first data packet, the time-frequency resource includes K transmission occasions, each of the K transmission occasions is used to perform one data transmission on the first data packet, and a quantity of valid resource elements REs included in a first transmission occasion in the K transmission occasions is greater than a quantity of valid REs included in a second transmission occasion in the K transmission occasions, where K is an integer greater than 1.

The processing unit is configured to determine, based on a target quantity of valid resource elements REs, a TBS corresponding to the first data packet, where the target quantity of valid REs is an average quantity of valid REs included in each of the K transmission occasions, or the target quantity of valid REs is a quantity of valid REs included in a target transmission occasion in the K transmission occasions.

In a possible design, the target transmission occasion is the second transmission occasion.

In a possible design, the second transmission occasion is a transmission occasion in the K transmission occasions that includes a smallest quantity of valid REs, or the second transmission occasion is a transmission occasion in the K transmission occasions that includes a smallest quantity of time domain symbols.

In a possible design, the target transmission occasion is the first transmission occasion.

In a possible design, the first transmission occasion is a transmission occasion in the K transmission occasions that includes a largest quantity of valid REs, or the first transmission occasion is a transmission occasion in the K transmission occasions that includes a largest quantity of time domain symbols.

In a possible design, if a first code rate of a first reference TBS carried on the second transmission occasion is greater than a code rate threshold, the target transmission occasion is the second transmission occasion.

The first reference TBS is a TBS calculated based on the quantity of valid REs included in the first transmission occasion.

In a possible design, if a first code rate of a first reference TBS carried on the second transmission occasion is greater than a code rate threshold, and a modified code rate is greater than the code rate threshold, the target transmission occasion is the second transmission occasion.

The first reference TBS is a TBS calculated based on the quantity of valid REs included in the first transmission occasion, the modified code rate is a code rate of the first reference TBS carried on the second transmission occasion and using a modified modulation order, the control information is further used to notify a modulation order for transmitting the first data packet, and the modified modulation order is higher than the modulation order notified by using the control information.

In a possible design, if a first code rate of a first reference TBS carried on the second transmission occasion is not greater than a code rate threshold, the target transmission occasion is the first transmission occasion.

The first reference TBS is a TBS calculated based on the quantity of valid REs included in the first transmission occasion.

In a possible design, if a first code rate of a first reference TBS carried on the second transmission occasion is greater than a code rate threshold, and a modified code rate is not greater than the code rate threshold, the target transmission occasion is the first transmission occasion, where the first reference TBS is a TBS calculated based on the quantity of valid REs included in the first transmission occasion, the modified code rate is a code rate of the first reference TBS carried on the second transmission occasion and using a modified modulation order, the control information is further used to notify a modulation order for transmitting the first data packet, and the modified modulation order is higher than the modulation order notified by using the control information.

The communication unit (which may be specifically the sending unit) is further configured to send the first data packet on the second transmission occasion by using the modified modulation order and the modified code rate.

In a possible design, the communication unit (which may be specifically the sending unit) is further configured to: if a first code rate of a first reference TBS carried on the second transmission occasion is greater than a code rate threshold, drop the second transmission occasion when sending the first data packet, where the first reference TBS is a TBS calculated based on the quantity of valid REs included in the first transmission occasion.

In a possible design, the communication unit (which may be specifically the sending unit) is further configured to: if a first code rate of a first reference TBS carried on the second transmission occasion is greater than a code rate threshold, sending a part of system information of the first data packet on the second transmission occasion, where the first reference TBS is a TBS calculated based on the quantity of valid REs included in the first transmission occasion.

In a possible design, that a quantity of valid REs included in a first transmission occasion is greater than a quantity of valid REs included in a second transmission occasion includes: the first transmission occasion is a transmission occasion that does not include a demodulation reference signal DMRS, and the second transmission occasion is a transmission occasion that includes a DMRS; or the first transmission occasion is a transmission occasion that includes a DMRS, the second transmission occasion is a transmission occasion that does not include a DMRS, a time domain symbol that carries the DMRS and that is in the first transmission occasion is further used to carry data information, and a length of a time domain resource that is not used to carry the DMRS and that is in the first transmission occasion is equal to a length of a time domain resource that is not used to carry a DMRS and that is in the second transmission occasion.

In a possible design, that a quantity of valid REs included in a first transmission occasion is greater than a quantity of valid REs included in a second transmission occasion includes: a time domain resource length corresponding to the first transmission occasion is greater than a time domain resource length corresponding to the second transmission occasion.

In a possible design, the time-frequency resource that is notified by using the control information and that is used to transmit the first data packet includes a time-frequency resource crossing a slot boundary in time domain.

The first transmission occasion and the second transmission occasion are two adjacent transmission occasions in the K transmission occasions.

The first transmission occasion corresponds to a time-frequency resource that is in the time-frequency resource crossing the slot boundary and that is located before the slot boundary, and the second transmission occasion corresponds to a time-frequency resource that is in the time-frequency resource crossing the slot boundary and that is located after the slot boundary. Alternatively, the first transmission occasion corresponds to a time-frequency resource that is in the time-frequency resource crossing the slot boundary and that is located after the slot boundary, and the second transmission occasion corresponds to a time-frequency resource that is in the time-frequency resource crossing the slot boundary and that is located before the slot boundary.

The apparatus 1200 may alternatively be the network device in any one of the foregoing embodiments, or may be a semiconductor chip disposed in the network device. The processing unit 1202 may support the apparatus 1200 in performing actions of the network device in the foregoing method examples. Alternatively, the processing unit 1202 mainly performs internal actions of the network device in the method examples, and the communication unit 1203 may support communication between the apparatus 1200 and a terminal device. For example, the communication unit 1202 is configured to perform step 601 (or step 601*a* or step 601*b*) and step 605 (or step 605*b*) in FIG. 6.

Specifically, in an embodiment, the communication unit (which may be specifically the sending unit) is configured to send control information to the terminal device, where the control information is used to notify information about a time-frequency resource for transmitting a first data packet, the time-frequency resource includes K transmission occasions, each of the K transmission occasions is used to perform one data transmission on the first data packet, and a quantity of valid resource elements REs included in a first transmission occasion in the K transmission occasions is greater than a quantity of valid REs included in a second transmission occasion in the K transmission occasions, where K is an integer greater than 1. The communication unit (which may be specifically the receiving unit) is configured to receive, on at least one of the K transmission occasions, the first data packet sent by the terminal device, where a TBS corresponding to the first data packet is determined based on a target quantity of valid resource elements REs, and the target quantity of valid REs is an average quantity of valid REs included in each of the K transmission occasions, or the target quantity of valid REs is a quantity of valid REs included in a target transmission occasion in the K transmission occasions.

In a possible design, the target transmission occasion is the second transmission occasion.

In a possible design, the second transmission occasion is a transmission occasion in the K transmission occasions that includes a smallest quantity of valid REs, or the second transmission occasion is a transmission occasion in the K transmission occasions that includes a smallest quantity of time domain symbols.

In a possible design, the target transmission occasion is the first transmission occasion.

In a possible design, the first transmission occasion is a transmission occasion in the K transmission occasions that includes a largest quantity of valid REs, or the first transmission occasion is a transmission occasion in the K transmission occasions that includes a largest quantity of time domain symbols.

In a possible design, if a first code rate of a first reference TBS carried on the second transmission occasion is greater than a code rate threshold, the target transmission occasion is the second transmission occasion.

The first reference TBS is a TBS calculated based on the quantity of valid REs included in the first transmission occasion.

In a possible design, if a first code rate of a first reference TBS carried on the second transmission occasion is greater than a code rate threshold, and a modified code rate is greater than the code rate threshold, the target transmission occasion is the second transmission occasion.

The first reference TBS is a TBS calculated based on the quantity of valid REs included in the first transmission occasion, the modified code rate is a code rate of the first reference TBS carried on the second transmission occasion and using a modified modulation order, the control information is further used to notify a modulation order for transmitting the first data packet, and the modified modulation order is higher than the modulation order notified by using the control information.

In a possible design, if a first code rate of a first reference TBS carried on the second transmission occasion is not greater than a code rate threshold, the target transmission occasion is the first transmission occasion.

The first reference TBS is a TBS calculated based on the quantity of valid REs included in the first transmission occasion.

In a possible design, if a first code rate of a first reference TBS carried on the second transmission occasion is greater than a code rate threshold, and a modified code rate is not greater than the code rate threshold, the target transmission occasion is the first transmission occasion, where the first reference TBS is a TBS calculated based on the quantity of valid REs included in the first transmission occasion, the modified code rate is a code rate of the first reference TBS carried on the second transmission occasion and using a modified modulation order, the control information is further used to notify a modulation order for transmitting the first data packet, and the modified modulation order is higher than the modulation order notified by using the control information.

The communication unit (which may be specifically the receiving unit) is specifically configured to receive, on the second transmission occasion, the first data packet sent by the terminal device by using the modified modulation order and the modified code rate.

In a possible design, if a first code rate of a first reference TBS carried on the second transmission occasion is greater than a code rate threshold, a transmission occasion in the K transmission occasions that is used by the terminal device to send the first data packet does not include the second transmission occasion, where the first reference TBS is a TBS calculated based on the quantity of valid REs included in the first transmission occasion.

In a possible design, the communication unit (which may be specifically the receiving unit) is specifically configured to:

if a first code rate of a first reference TBS carried on the second transmission occasion is greater than a code rate threshold, receiving, on the second transmission occasion, a part of system information that is of the first data packet and that is sent by the terminal device, where the first reference TBS is a TBS calculated based on the quantity of valid REs included in the first transmission occasion.

In a possible design, that a quantity of valid REs included in a first transmission occasion is greater than a quantity of valid REs included in a second transmission occasion includes: the first transmission occasion is a transmission occasion that does not include a demodulation reference signal DMRS, and the second transmission occasion is a transmission occasion that includes a DMRS; or the first transmission occasion is a transmission occasion that includes a DMRS, the second transmission occasion is a transmission occasion that does not include a DMRS, a time domain symbol that carries the DMRS and that is in the first transmission occasion is further used to carry data information, and a length of a time domain resource that is not used to carry the DMRS and that is in the first transmission occasion is equal to a length of a time domain resource that is not used to carry a DMRS and that is in the second transmission occasion.

In a possible design, that a quantity of valid REs included in a first transmission occasion is greater than a quantity of valid REs included in a second transmission occasion includes: a time domain resource length corresponding to the first transmission occasion is greater than a time domain resource length corresponding to the second transmission occasion.

In a possible design, the time-frequency resource that is notified by using the control information and that is used to transmit the first data packet includes a time-frequency resource crossing a slot boundary in time domain.

The first transmission occasion and the second transmission occasion are two adjacent transmission occasions in the K transmission occasions.

The first transmission occasion corresponds to a time-frequency resource that is in the time-frequency resource crossing the slot boundary and that is located before the slot boundary, and the second transmission occasion corresponds to a time-frequency resource that is in the time-frequency resource crossing the slot boundary and that is located after the slot boundary. Alternatively, the first transmission occasion corresponds to a time-frequency resource that is in the time-frequency resource crossing the slot boundary and that is located after the slot boundary, and the second transmission occasion corresponds to a time-frequency resource that is in the time-frequency resource crossing the slot boundary and that is located before the slot boundary.

It should be noted that, in the embodiments of this application, division into units (modules) is an example, and is merely division into logical functions. In an actual implementation, another division manner may be used. Functional modules in the embodiments of this application may be integrated into one processing module, or each of the modules may exist alone physically, or two or more modules may be integrated into one module. The integrated module may be implemented in a form of hardware, or may be implemented in a form of a software functional module.

When the integrated module is implemented in the form of a software functional module and sold or used as an independent product, the integrated module may be stored in a computer-readable storage medium. Based on such an understanding, the technical solutions of the embodiments of this application essentially, or the part contributing to the conventional technology, or all or some of the technical solutions may be implemented in a form of a software product. The computer software product is stored in a storage medium, and includes several instructions for instructing a computer device (which may be a personal computer, a server, a network device, or the like) or a processor to perform all or some of the steps of the methods in the embodiments of this application. The foregoing storage medium may be any medium that can store program code, such as a memory.

Figure 13:
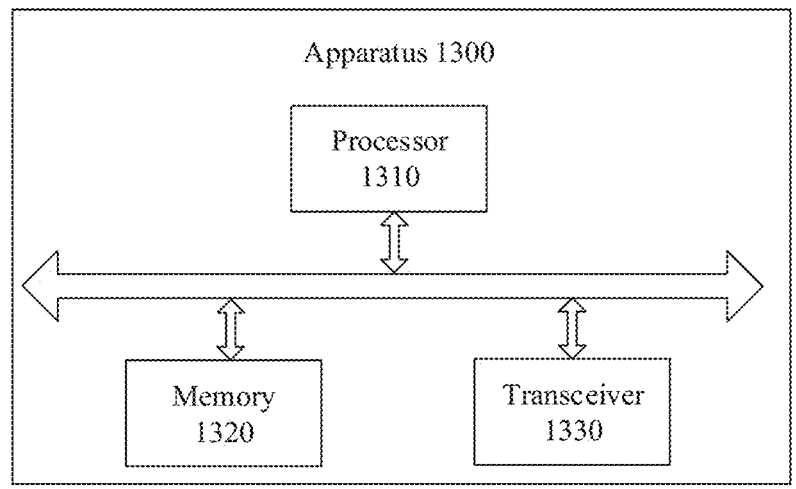
FIG. 13 is a schematic diagram of a communication apparatus according to an embodiment of this application.

FIG. 13 is a schematic structural diagram of an apparatus. The apparatus 1300 includes a processor 1310, a memory 1320, and a transceiver 1330. In an example, the apparatus 1300 may implement functions of the apparatus 1200 shown in FIG. 12. Specifically, the transceiver may implement the function of the communication unit 1203 shown in FIG. 12, the processor may implement the function of the processing unit 1202, and the memory may implement the function of the storage unit 1201. In another example, the apparatus 1300 may be the network device in the method embodiments, or may be the terminal device in the foregoing method embodiments. The apparatus 1300 may be configured to implement the method that corresponds to the network device or the terminal device and that is described in the foregoing method embodiments. For details, refer to the descriptions in the foregoing method embodiments.

Figure 14:
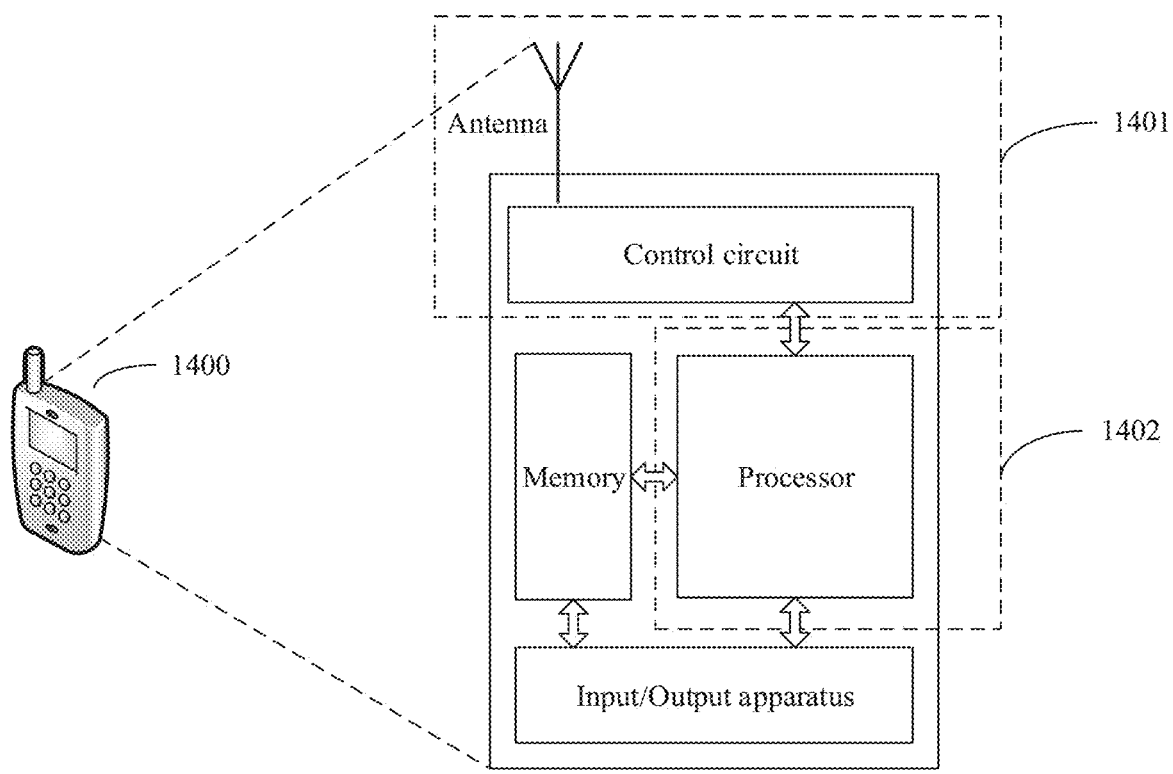
FIG. 14 is a schematic structural diagram of a terminal device according to an embodiment of this application.

FIG. 14 is a schematic structural diagram of a terminal device 1400 according to an embodiment of this application. For ease of description, FIG. 14 shows only main components of the terminal device. As shown in FIG. 14, the terminal device 1400 includes a processor, a memory, a control circuit, an antenna, and an input/output apparatus. The terminal device 1400 may be used in the system architecture shown in FIG. 1, and perform the functions of the terminal device in the foregoing method embodiments.

The processor is mainly configured to process a communication protocol and communication data, control the entire terminal device, execute a software program, and process data of the software program, for example, configured to control the terminal device to perform the actions described in the foregoing method embodiments. The memory is mainly configured to store the software program and data. The control circuit is mainly configured to: perform conversion between a baseband signal and a radio frequency signal, and process the radio frequency signal. A combination of the control circuit and the antenna may also be referred to as a transceiver that is mainly configured to send and receive a radio frequency signal in an electromagnetic wave form. The input/output apparatus, for example, a touchscreen, a display, or a keyboard, is mainly configured to: receive data entered by a user, and output data to the user.

After the terminal device is powered on, the processor may read the software program in the storage unit, interpret and execute instructions of the software program, and process the data of the software program. When data needs to be sent in a wireless manner, after performing baseband processing on the to-be-sent data, the processor outputs a baseband signal to a radio frequency circuit. After performing radio frequency processing on the baseband signal, the radio frequency circuit sends a radio frequency signal to the outside through the antenna in an electromagnetic wave form. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that for ease of description, FIG. 14 shows only one memory and one processor. An actual terminal device may have a plurality of processors and a plurality of memories. The memory may also be referred to as a storage medium, a storage device, or the like. This is not limited in the embodiments of this application.

In an optional implementation, the processor may include a baseband processor and a central processing unit. The baseband processor is mainly configured to process the communication protocol and the communication data. The central processing unit is mainly configured to: control the entire terminal device, execute the software program, and process the data of the software program. The processor in FIG. 14 integrates functions of the baseband processor and the central processing unit. A person skilled in the art may understand that the baseband processor and the central processing unit may be processors independent of each other, and are interconnected by using technologies such as a bus. A person skilled in the art may understand that the terminal device may include a plurality of baseband processors to adapt to different network standards, the terminal device may include a plurality of central processing units to improve a processing capability of the terminal device, and components of the terminal device may be connected by using various buses. The baseband processor may also be referred to as a baseband processing circuit or a baseband processing chip. The central processing unit may also be referred to as a central processing circuit or a central processing chip. The function of processing the communication protocol and the communication data may be built in the processor, or may be stored in the storage unit in a form of a software program. The processor executes the software program, to implement a baseband processing function.

For example, if the apparatus 1200 shown in FIG. 12 is a terminal device, in the embodiment of FIG. 14, the antenna and the control circuit that have sending and receiving functions may be considered as the communication unit of the apparatus 1200, and the processor having a processing function may be considered as the processing unit of the apparatus 1200. As shown in FIG. 14, the terminal device 1400 includes a communication unit 1401 and a processing unit 1402. The communication unit 1401 may also be referred to as a transceiver, a transceiver apparatus, or the like. Optionally, a component that is in the communication unit 1401 and that is configured to implement the receiving function may be considered as a receiving unit, and a component that is in the communication unit 1401 and that is configured to implement the sending function may be considered as a sending unit. In other words, the communication unit 1401 includes the receiving unit and the sending unit. For example, the receiving unit may also be referred to as a receiver, a receiver, a receive circuit, or the like, and the sending unit may be referred to as a transmitter, a transmitter, a transmit circuit, or the like.

The terminal device 1400 shown in FIG. 14 can implement the processes related to the terminal device in the method embodiment in FIG. 6. The operations and/or the functions of the modules in the terminal device 1400 are respectively used to implement corresponding procedures in the foregoing method embodiments. For details, refer to the descriptions in the foregoing method embodiments. To avoid repetition, detailed descriptions are properly omitted herein.

Figure 15:
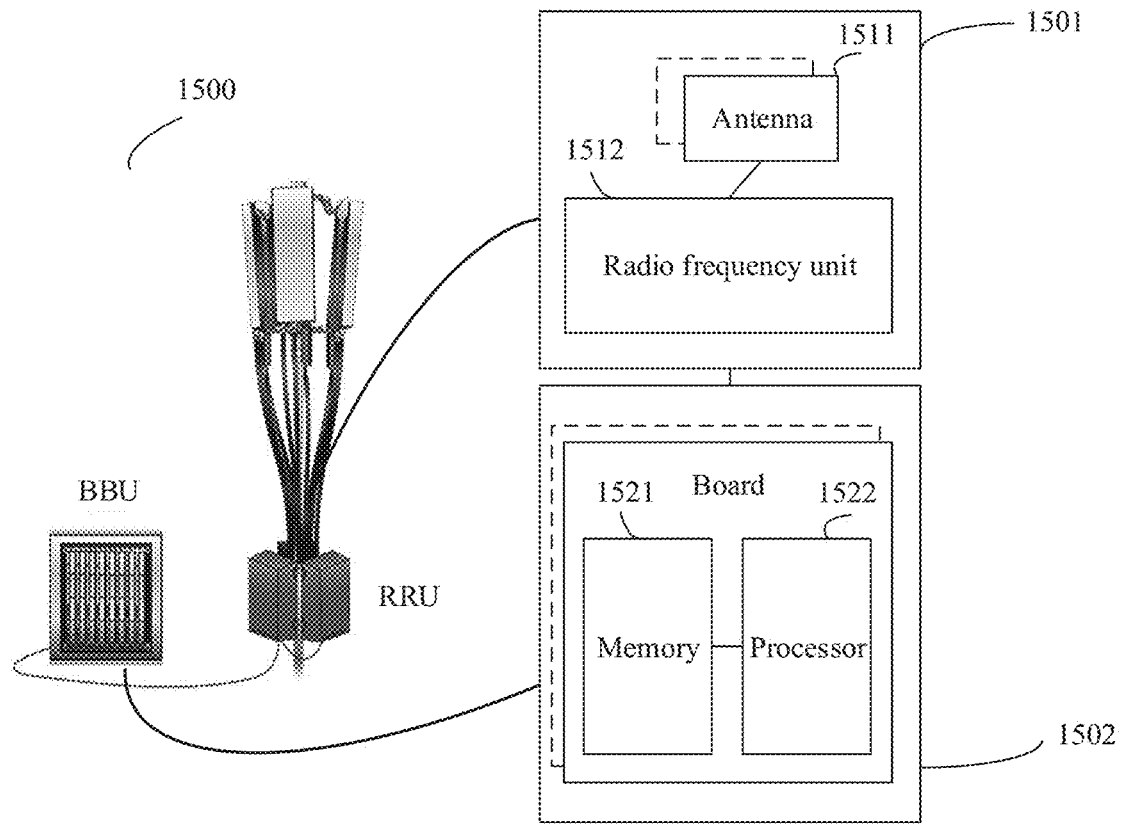
FIG. 15 is a schematic structural diagram of a network device according to an embodiment of this application.

FIG. 15 is a schematic structural diagram of a network device according to an embodiment of this application, and for example, may be a schematic structural diagram of a base station. As shown in FIG. 15, the network device 1500 may be used in the system architecture shown in FIG. 1, and perform functions of the network device in the foregoing method embodiments.

The network device 1500 may include one or more radio frequency units, such as a remote radio unit (RRU) 1501 and one or more baseband units (BBU) (which may also be referred to as digital units (DU)) 1502.

The RRU 1501 may be referred to as a transceiver unit, a transceiver, a transceiver circuit, a transceiver, or the like, and may include at least one antenna 1511 and a radio frequency unit 1512. The RRU 1501 is mainly configured to perform sending and receiving of a radio frequency signal and conversion between a radio frequency signal and a baseband signal, for example, configured to send the control information in the foregoing method embodiments. The RRU 1501 and the BBU 1502 may be physically disposed together; or may be physically disposed separately, in other words, in a distributed base station.

The BBU 1502 is a control center of the base station, may also be referred to as a processing unit, and is mainly configured to complete a baseband processing function, for example, channel coding, multiplexing, modulation, or spreading. For example, the BBU (processing unit) 1502 may be configured to control the base station to perform an operation procedure related to the network device in the method embodiments.

In an embodiment, the BBU 1502 may include one or more boards. A plurality of boards may jointly support a radio access network (such as an LTE network) of a single access standard, or may separately support radio access networks (such as an LTE network, a 5G network, or another network) of different access standards. The BBU 1502 further includes a memory 1521 and a processor 1522. The memory 1521 is configured to store necessary instructions and data. The processor 1522 is configured to control the base station to perform a necessary action, for example, configured to control the base station to perform the operation procedure related to the network device in the foregoing method embodiments. The memory 1521 and the processor 1522 may serve one or more boards. In other words, a memory and a processor may be independently disposed on each board, or a plurality of boards may share a same memory and a same processor. In addition, a necessary circuit may be further disposed on each board.

It should be understood that, the network device 1500 shown in FIG. 15 can implement the processes related to the network device in FIG. 6. The operations and/or functions of the modules in the network device 1500 are respectively configured to implement corresponding procedures in the foregoing method embodiments. For details, refer to the descriptions in the foregoing method embodiments. To avoid repetition, detailed descriptions are properly omitted herein.

In an implementation process, the steps of the methods provided in the embodiments may be performed by using a hardware integrated logic circuit in the processor, or by using instructions in a form of software. The steps of the methods disclosed with reference to the embodiments of this application may be directly performed by a hardware processor, or may be performed by using a combination of hardware in the processor and a software module.

It should be noted that the processor in the embodiments of this application may be an integrated circuit chip, and has a signal processing capability. In an implementation process, the steps in the foregoing method embodiments may be performed by using a hardware integrated logic circuit in the processor, or by using instructions in a form of software. The processor may be a general-purpose central processing unit (CPU), a general-purpose processor, digital signal processor (DSP), an application-specific integrated circuit (ASIC), a field programmable gate array (FPGA), another programmable logic device, a transistor logic device, a hardware component, or any combination thereof; or may be a combination of processors implementing a computing function, for example, a combination of one or more microprocessors or a combination of a DSP and a microprocessor. The general-purpose processor may be a microprocessor, or the processor may be any conventional processor or the like.

It may be understood that the memory or storage unit in the embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. By way of example and not limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memories in the systems and methods described in this specification include but are not limited to these memories and any memory of another suitable type.

All or some of the foregoing embodiments may be implemented by using software, hardware, firmware, or any combination thereof. When the software is used to implement the embodiments, the embodiments may be implemented completely or partially in a form of a computer program product. The computer program product includes one or more computer programs or instructions. When the computer programs or the instructions are loaded and executed on a computer, all or some of procedures or functions in the embodiments of this application are performed. The computer may be a general-purpose computer, a special-purpose computer, a computer network, or another programmable apparatus. The computer programs or instructions may be stored in a computer-readable storage medium, or may be transmitted via the computer-readable storage medium. The computer-readable storage medium may be any usable medium accessible by a computer, or a data storage device such as a server integrating one or more usable media. The usable medium may be a magnetic medium, for example, a floppy disk, a hard disk, or a magnetic tape; or may be an optical medium, for example, a DVD; or may be a semiconductor medium, for example, a solid-state drive (SSD).

The various illustrative logical units and circuits described in the embodiments of this application may implement or operate the described functions through a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors in combination with a digital signal processor core, or any other similar configuration.

Steps of the methods or algorithms described in the embodiments of this application may be directly embedded into hardware, a software unit executed by a processor, or a combination thereof. The software unit may be stored in a RAM, a flash memory, a ROM, an EPROM, an EEPROM, a register, a hard disk, a removable magnetic disk, a CD-ROM, or a storage medium of any other form in the art. For example, the storage medium may be connected to the processor, so that the processor can read information from the storage medium and write information to the storage medium. Optionally, the storage medium may alternatively be integrated into the processor. The processor and the storage medium may be arranged in the ASIC, and the ASIC may be arranged in a terminal device. Optionally, the processor and the storage medium may alternatively be arranged in different components of the terminal device.

The computer program instructions may alternatively be loaded onto a computer or another programmable data processing device, so that a series of operations and steps are performed on the computer or another programmable device, to generate computer-implemented processing. Therefore, the instructions executed on the computer or another programmable device provide steps for implementing a specified function in one or more procedures in the flowcharts and/or in one or more blocks in the block diagrams.

Although the embodiments of this application are described with reference to specific features, it is clear that various modifications and combinations may be made to them without departing from the scope of the embodiments of this application. Correspondingly, the specification and accompanying drawings are merely example descriptions of the embodiments of this application that are defined by the appended claims, and are considered to cover any or all of modifications, variations, combinations, or equivalents in the scope of the embodiments of this application.

What is claimed is:

1. A method, comprising:
receiving control information from a network device, the control information comprising information about a time-frequency resource for transmitting a first data packet, the time-frequency resource comprising K transmission occasions;
sending the first data packet to the network device on at least one of the K transmission occasions, each of the K transmission occasions performing one data transmission on the first data packet, a quantity of valid resource elements (REs) comprised in a first transmission occasion in the K transmission occasions is greater than or equal to a quantity of valid REs comprised in a second transmission occasion in the K transmission occasions, K is an integer greater than 1, the time-frequency resource comprises a time-frequency resource crossing a slot boundary in time domain, and a time domain resource length corresponding to the time-frequency resource crossing the slot boundary corresponds to a time domain resource length that is of a single transmission occasion and that is notified by using the control information; and
the first transmission occasion corresponds to a time-frequency resource that is in the time-frequency resource crossing the slot boundary and that is located before the slot boundary, and the second transmission occasion corresponds to a time-frequency resource that is in the time-frequency resource crossing the slot boundary and that is located after the slot boundary; or
the first transmission occasion corresponds to a time-frequency resource that is in the time-frequency resource crossing the slot boundary and that is located after the slot boundary, and the second transmission occasion corresponds to a time-frequency resource that is in the time-frequency resource crossing the slot boundary and that is located before the slot boundary, wherein
a transport block size (TBS) corresponding to the first data packet is determined based on a target quantity of valid (REs), and the target quantity of valid REs is a quantity of valid REs comprised in a target transmission occasion.

2. The method according to claim 1, wherein a time domain resource length corresponding to the target transmission occasion is equal to the time domain resource length corresponding to the time-frequency resource crossing the slot boundary.

3. The method according to claim 1, wherein the K transmission occasions further comprise a fourth transmission occasion, and a time domain resource length corresponding to the fourth transmission occasion is equal to the time domain resource length that is of one transmission occasion and that is notified by using the control information.

4. The method according to claim 1, wherein the first transmission occasion is an earliest transmission occasion in the K transmission occasions.

5. The method according to claim 1, wherein the target transmission occasion is the second transmission occasion, and the second transmission occasion is a transmission occasion in the K transmission occasions that comprises a smallest quantity of valid REs, or the second transmission occasion is a transmission occasion in the K transmission occasions that comprises a smallest quantity of time domain symbols.

6. The method according to claim 1, wherein the target transmission occasion is the first transmission occasion, and the first transmission occasion is a transmission occasion in the K transmission occasions that comprises a largest quantity of valid REs, or the first transmission occasion is a transmission occasion in the K transmission occasions that comprises a largest quantity of time domain symbols.

7. An apparatus comprising:
one or more processors; and
a non-transitory computer readable medium storing a program to be executed by the one or more processors, the program comprises instructions for:

sending control information to a terminal device, wherein the control information comprises information about a time-frequency resource for transmitting a first data packet, the time-frequency resource comprises K transmission occasions; and receiving, on at least one of the K transmission occasions, the first data packet from the terminal device, each of the K transmission occasions performing one data transmission on the first data packet, a quantity of valid resource elements (REs) comprised in a first transmission occasion in the K transmission occasions is greater than or equal to a quantity of valid REs comprised in a second transmission occasion in the K transmission occasions, K is an integer greater than 1, the time-frequency resource comprises a time-frequency resource crossing a slot boundary in time domain, and a time domain resource length corresponding to the time-frequency resource crossing the slot boundary corresponds to a time domain resource length that is of a single transmission occasion and that is notified by using the control information; and the first transmission occasion corresponds to a time-frequency resource that is in the time-frequency resource crossing the slot boundary and that is located before the slot boundary, and the second transmission occasion corresponds to a time-frequency resource that is in the time-frequency resource crossing the slot boundary and that is located after the slot boundary; or the first transmission occasion corresponds to a time-frequency resource that is in the time-frequency resource crossing the slot boundary and that is located after the slot boundary, and the second transmission occasion corresponds to a time-frequency resource that is in the time-frequency resource crossing the slot boundary and that is located before the slot boundary, wherein a transport block size (TBS) corresponding to the first data packet is determined based on a target quantity of valid resource elements (REs), and the target quantity of valid REs is a quantity of valid REs comprised in a target transmission occasion.

8. The apparatus according to claim 7, wherein a time domain resource length corresponding to the target transmission occasion is equal to the time domain resource length corresponding to the time-frequency resource crossing the slot boundary.

9. The apparatus according to claim 7, wherein the K transmission occasions further comprise a fourth transmission occasion, and a time domain resource length corresponding to the fourth transmission occasion is equal to the time domain resource length that is of one transmission occasion and that is notified by using the control information.

10. The apparatus according to claim 7, wherein the first transmission occasion is an earliest transmission occasion in the K transmission occasions.

11. The apparatus according to claim 7, wherein the target transmission occasion is the second transmission occasion, and the second transmission occasion is a transmission occasion in the K transmission occasions that comprises a smallest quantity of valid REs, or the second transmission occasion is a transmission occasion in the K transmission occasions that comprises a smallest quantity of time domain symbols.

12. The apparatus according to claim 7, wherein the target transmission occasion is the first transmission occasion, and the first transmission occasion is a transmission occasion in the K transmission occasions that comprises a largest quantity of valid REs, or the first transmission occasion is a transmission occasion in the K transmission occasions that comprises a largest quantity of time domain symbols.

13. An apparatus comprising:

one or more processors; and a non-transitory computer readable medium storing a program to be executed by the one or more processors, the program comprises instructions for:

receiving control information from a network device, wherein the control information comprises information about a time-frequency resource for transmitting a first data packet, the time-frequency resource comprises K transmission occasions; and sending the first data packet to the network device on at least one of the K transmission occasions, each of the K transmission occasions performing one data transmission on the first data packet, a quantity of valid resource elements (REs) comprised in a first transmission occasion in the K transmission occasions is greater than or equal to a quantity of valid REs comprised in a second transmission occasion in the K transmission occasions, K is an integer greater than 1, the time-frequency resource comprises a time-frequency resource crossing a slot boundary in time domain, and a time domain resource length corresponding to the time-frequency resource crossing the slot boundary corresponds to a time domain resource length that is of a single transmission occasion and that is notified by using the control information; and the first transmission occasion corresponds to a time-frequency resource that is in the time-frequency resource crossing the slot boundary and that is located before the slot boundary, and the second transmission occasion corresponds to a time-frequency resource that is in the time-frequency resource crossing the slot boundary and that is located after the slot boundary; or the first transmission occasion corresponds to a time-frequency resource that is in the time-frequency resource crossing the slot boundary and that is located after the slot boundary, and the second transmission occasion corresponds to a time-frequency resource that is in the time-frequency resource crossing the slot boundary and that is located before the slot boundary, wherein a transport block size (TBS) corresponding to the first data packet is determined based on a target quantity of valid (REs), and the target quantity of valid REs is a quantity of valid REs comprised in a target transmission occasion.

14. The apparatus according to claim 13, wherein a time domain resource length corresponding to the target transmission occasion is equal to the time domain resource length corresponding to the time-frequency resource crossing the slot boundary.

15. The apparatus according to claim 13, wherein the K transmission occasions further comprise a fourth transmission occasion, and a time domain resource length corresponding to the fourth transmission occasion is equal to the time domain resource length that is of one transmission occasion and that is notified by using the control information.

16. The apparatus according to claim 13, wherein the first transmission occasion is an earliest transmission occasion in the K transmission occasions.

17. The apparatus according to claim 13, wherein the target transmission occasion is the second transmission occasion, and wherein the second transmission occasion is a transmission occasion in the K transmission occasions that comprises a smallest quantity of valid REs.

18. The apparatus according to claim 13, wherein the target transmission occasion is the first transmission occasion, and wherein the first transmission occasion is a transmission occasion in the K transmission occasions that comprises a largest quantity of valid REs.

19. The apparatus according to claim 13, wherein the target transmission occasion is the second transmission occasion, and wherein the second transmission occasion is a transmission occasion in the K transmission occasions that comprises a smallest quantity of time domain symbols.

20. The apparatus according to claim 13, wherein the target transmission occasion is the first transmission occasion, and wherein the first transmission occasion is a transmission occasion in the K transmission occasions that comprises a largest quantity of time domain symbols.

* * * * *